US012499729B2

(12) United States Patent
Rye et al.

(10) Patent No.: US 12,499,729 B2
(45) Date of Patent: Dec. 16, 2025

(54) GAMING MACHINE CABINET

(71) Applicant: AGS LLC, Las Vegas, NV (US)

(72) Inventors: Ryan Patrick Rye, Suwanee, GA (US); James Ely Tillery, Tucker, GA (US); Kevin Hohman, North Las Vegas, NV (US); Parry Staley, Decatur, GA (US); Mark Brandau, Johns Creek, GA (US)

(73) Assignee: AGS LLC, Las Vegas, NV (US)

( * ) Notice: Subject to any disclaimer, the term of this patent is extended or adjusted under 35 U.S.C. 154(b) by 148 days.

(21) Appl. No.: 18/228,486

(22) Filed: Jul. 31, 2023

(65) Prior Publication Data

US 2024/0013611 A1 Jan. 11, 2024

Related U.S. Application Data

(63) Continuation-in-part of application No. 18/136,207, filed on Apr. 18, 2023.

(60) Provisional application No. 63/355,035, filed on Jun. 23, 2022, provisional application No. 63/332,605, filed on Apr. 19, 2022.

(51) Int. Cl.
*G07F 17/32* (2006.01)

(52) U.S. Cl.
CPC ...... *G07F 17/3213* (2013.01); *G07F 17/3216* (2013.01)

(58) Field of Classification Search
None
See application file for complete search history.

(56) References Cited

U.S. PATENT DOCUMENTS 7,267,613 B2 * 9/2007 Cole .................. G07F 17/3216 463/20
7,387,572 B2 * 6/2008 Hanchar ............ G07F 17/3216 361/679.61
7,540,806 B2 * 6/2009 Tastad ................ G07F 17/3213 273/145 E
7,985,139 B2 * 7/2011 Lind ...................... G07F 17/32 463/46
8,371,946 B2 * 2/2013 Rodriguez .......... G07F 17/3211 463/31
9,573,050 B2 2/2017 Thompson et al.
10,417,860 B2 9/2019 Lewis et al.
10,502,360 B2 12/2019 Castro et al.
10,943,428 B2 3/2021 Ambrecht et al.
11,151,833 B2 10/2021 Hemerick et al.
11,568,708 B2 1/2023 Ambrecht et al.
11,587,389 B2 * 2/2023 Barbour ............... F16M 11/041
2008/0055491 A1 * 3/2008 Gordon ............... G07F 17/3216 463/20
2008/0113821 A1 * 5/2008 Beadell ............... G07F 17/3216 463/46
2009/0124395 A1 5/2009 O'Keene et al.
2009/0176568 A1 7/2009 Reddy et al.
2019/0102983 A1 * 4/2019 Gallagher ........... G07F 17/3211

* cited by examiner

*Primary Examiner* — Sunit Pandya
(74) *Attorney, Agent, or Firm* — Snell & Wilmer LLP

(57) ABSTRACT

Examples of the disclosure comprise a gaming machine, such as configured to present one or more wager-based games, a cabinet or housing for a gaming machine, and individual features of such a gaming machine or cabinet thereof, as well as combinations of such features, and methods of assembling, using and servicing a gaming machine and/or cabinet thereof.

19 Claims, 44 Drawing Sheets

FIG. 11Y
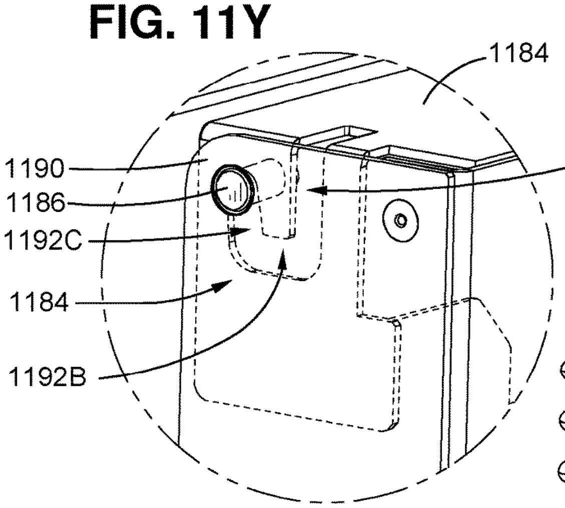
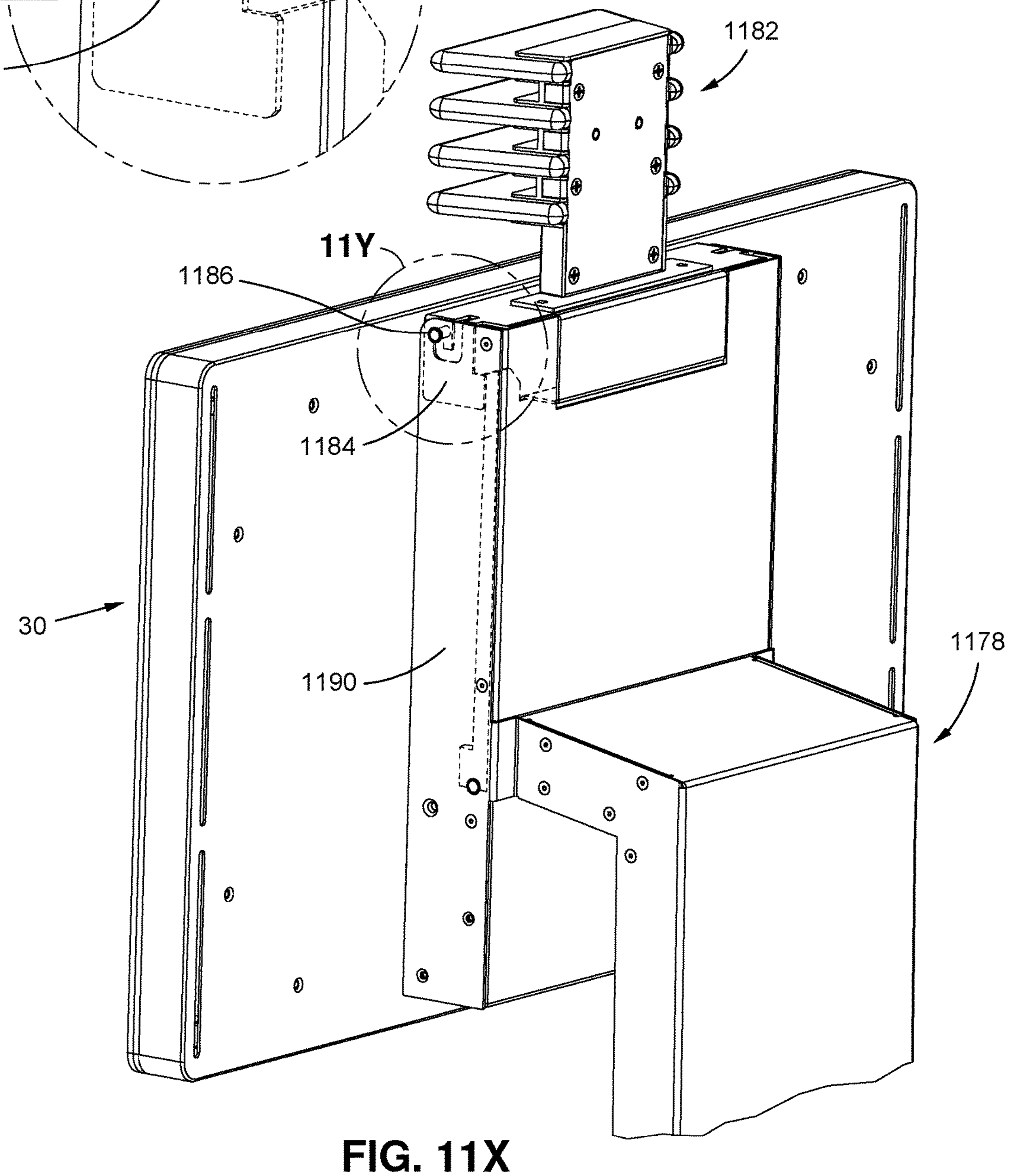
FIG. 11X

GAMING MACHINE CABINET

RELATED APPLICATION DATA

The present application is a continuation-in-part of U.S. application Ser. No. 18/136,207, filed Apr. 18, 2023, and claims priority to U.S. Provisional Application Ser. No. 63/332,605, filed Apr. 19, 2022, and U.S. Provisional Application Ser. No. 63/355,035, filed Jun. 23, 2022, which prior applications are incorporated by reference herein in their entirety.

FIELD

The present disclosure relates to cabinets or housings for gaming machines and associated features thereof.

BACKGROUND

Many styles of gaming machines are known for presenting wager-based games. Unlike cabinets for non-wagering gaming devices, such as arcade-style gaming devices, the cabinets or housings for wager-based gaming devices must address a number of unique issues. For example, because wager-based gaming machines offer winnings for winning game outcomes, the gaming machine must be very fault tolerant to as to prevent a failure of the gaming machine. Such a failure might, for example, cause an erroneous winning outcome.

Thus, wager-based gaming machines have cabinets which are access controlled (to prevent tampering), must withstand heat, electrical shock and address a wide variety of other problems. At the same time, it is desirable for the gaming machine cabinet to be durable for use over a long period of time, easy to service, and be ergonomic, while at the same time being relatively inexpensive to manufacture.

An improved gaming machine cabinet which addresses these and other issues is desired.

SUMMARY

Examples of the disclosure comprise a gaming machine, such as configured to present one or more wager-based games, a gaming cabinet, and individual features of such a gaming machine or cabinet, and combinations of such features, as well as methods of assembling, using and servicing a gaming machine.

In some examples, aspects of the disclosure comprise an illumination diffuser, such as may be located at the periphery of a video display of a gaming machine; a door closing mechanism for a housing of a gaming machine; a media printer mounting configuration for a gaming machine; a mounting and support configuration for a glass panel of a button deck or console of a gaming machine; a convertible footrest of a gaming machine; an access panel or door switch mount for a gaming machine; a release mechanism for a video display panel mount; a video display mounting configuration; a video display supporting configuration; a pivot mount for a video display of a gaming machine; a gaming machine exterior panel configuration; a modular configuration for a gaming machine cabinet; and a cable or wire management feature for a gaming machine, among other features.

Further objects, features, and advantages of the present disclosure over the prior art will become apparent from the detailed description of the drawings which follows, when considered with the attached figures.

DETAILED DESCRIPTION

In the following description, numerous specific details are set forth in order to provide a more thorough description of the present disclosure. It will be apparent, however, to one skilled in the art, that the present disclosure may be practiced without these specific details. In other instances, well-known features have not been described in detail so as not to obscure the disclosure.

Examples of the disclosure comprise an improved gaming machine, an improved gaming machine cabinet or housing, and various features of such a machine or housing.

Figure 1A:
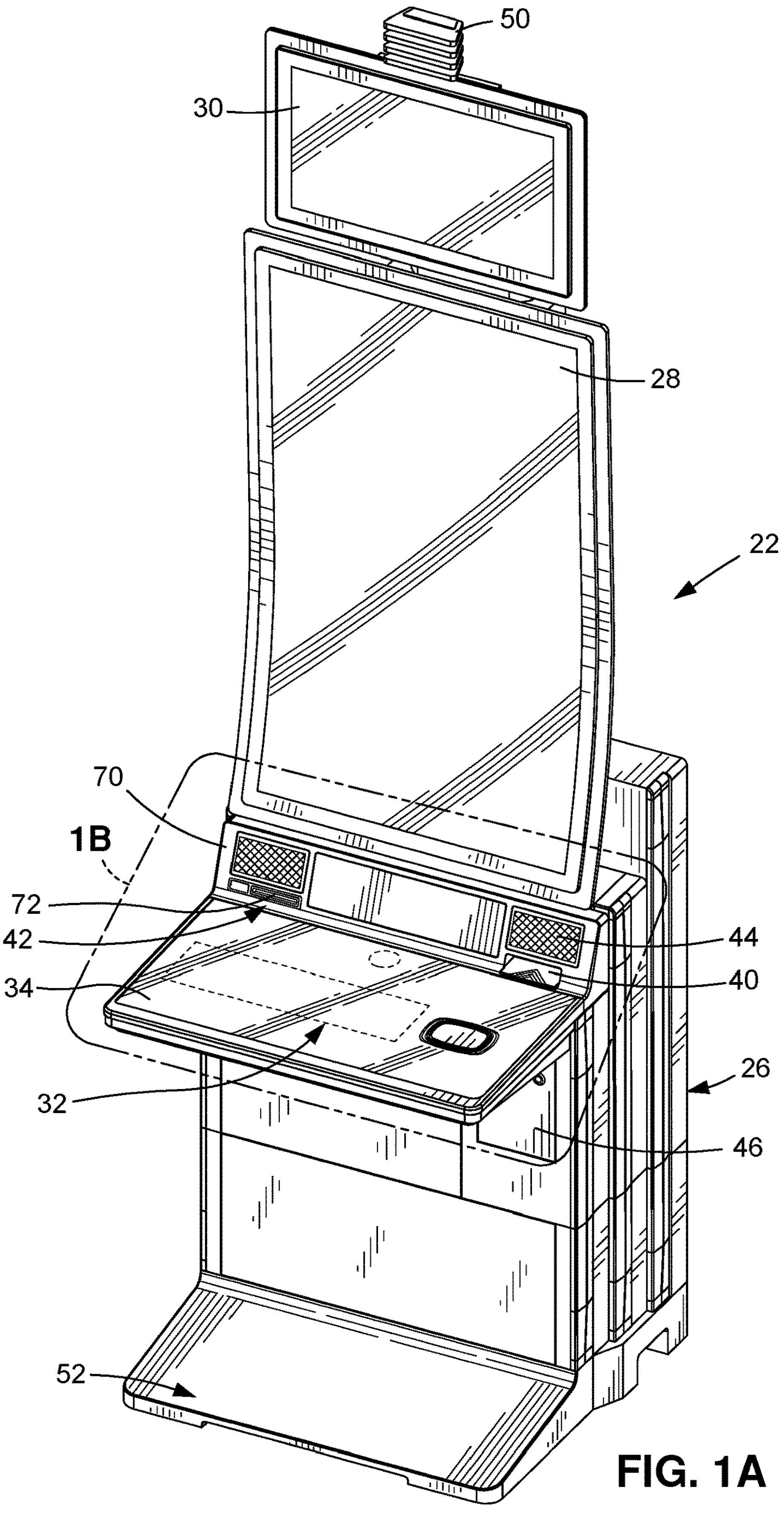
FIGS. 1A-C illustrate one example of a gaming machine in accordance with the disclosure.
Figure 1B:
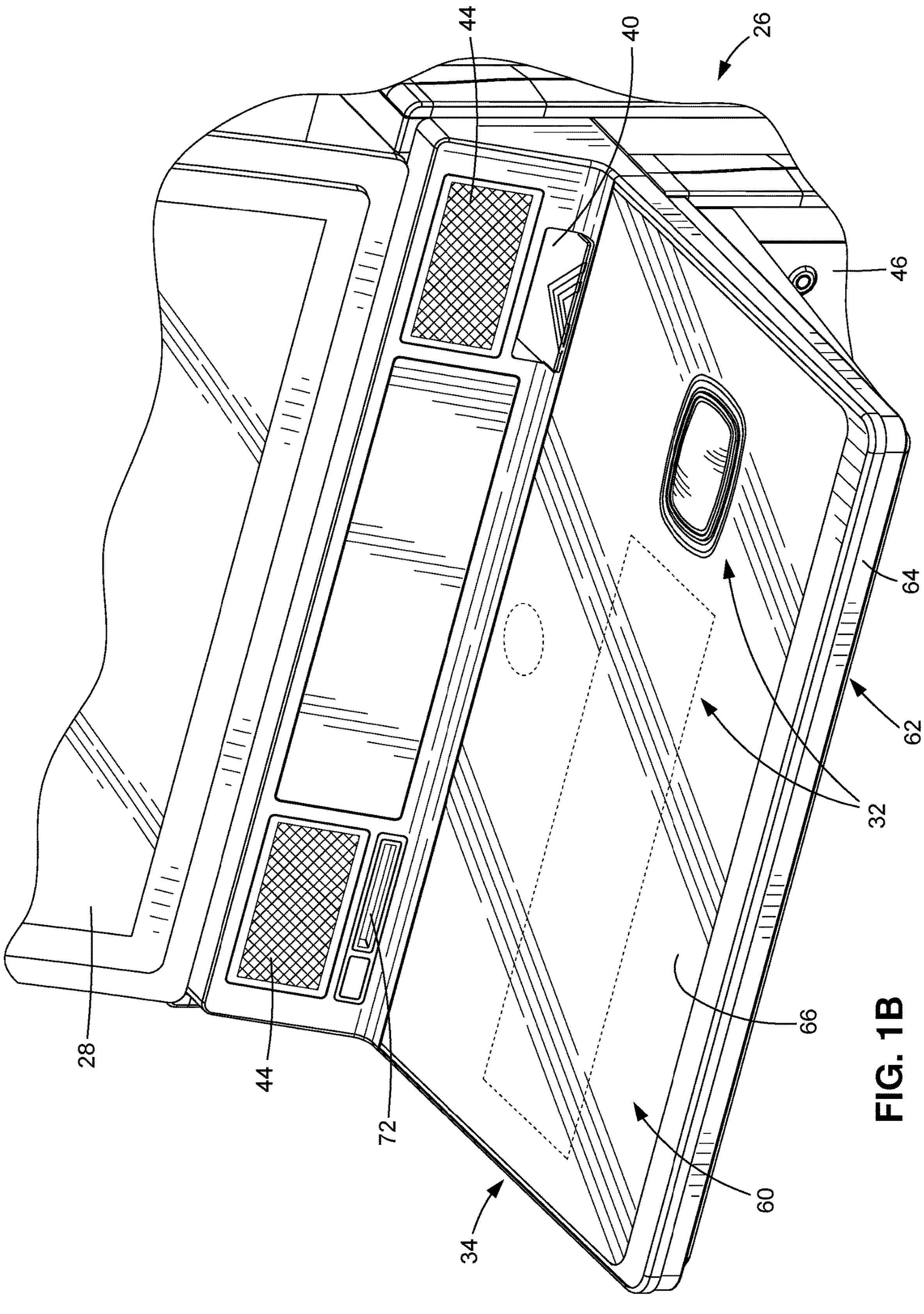
Figure 1C:
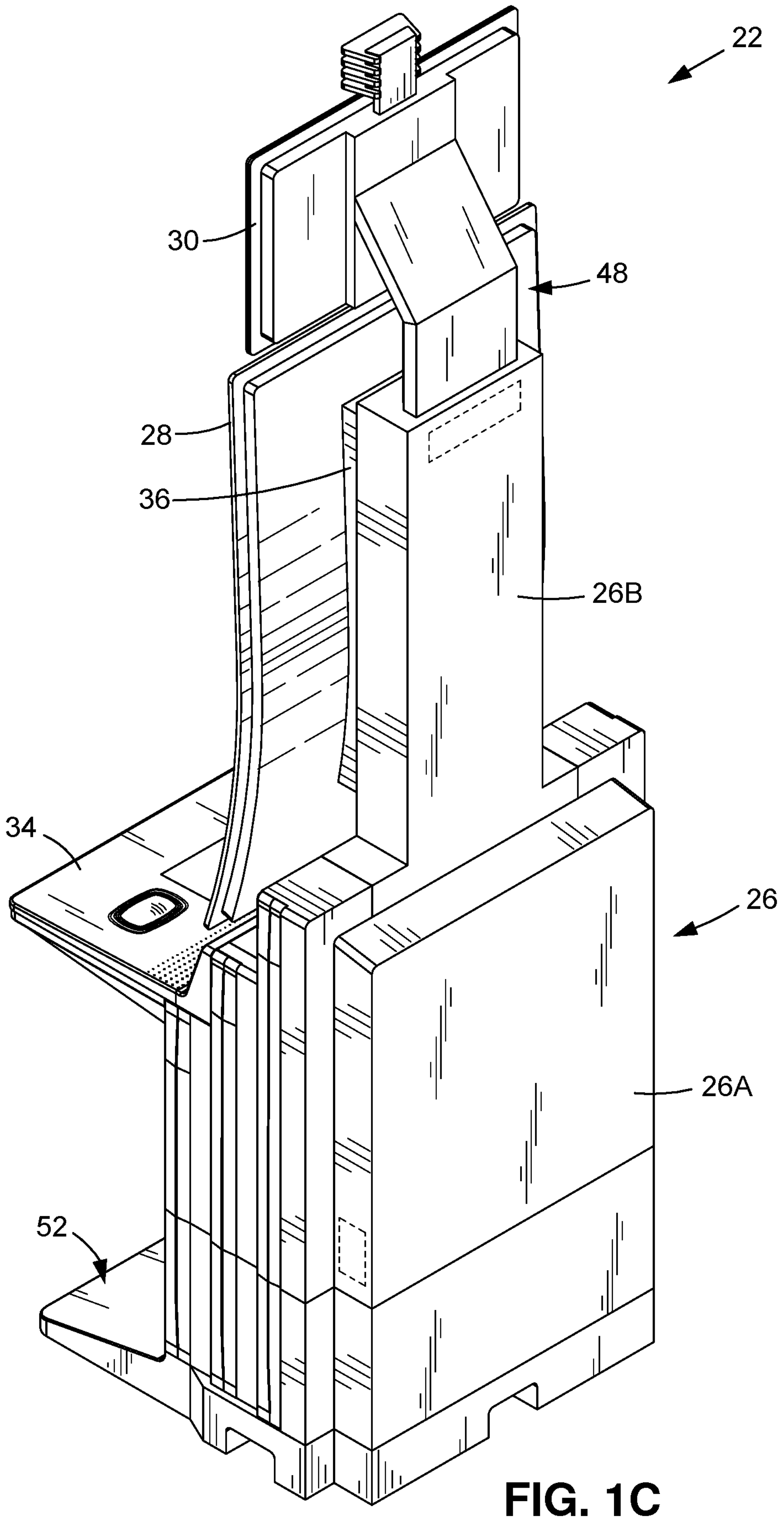

FIGS. 1A-C illustrate one example of a gaming machine 22 having features in accordance with the disclosure. The gaming machine 22 may be located at a casino (and as such may be referred to as a "casino gaming machine"). The gaming machine may be part of a gaming system, such as a casino gaming system which links two or more of the gaming machines or one or more gaming machines with other devices, such as one or more table games, kiosks, accounting systems or servers, progressive systems or servers, player tracking systems or servers or the like.

As illustrated, the gaming machine 22 generally comprises a housing or cabinet 26 for supporting and/or enclosing various components required for operation of the gaming machine. The housing or cabinet 26 may have various shapes and sizes. In one example, as best illustrated in FIG. 1C, the housing or cabinet 26 generally has a lower portion 26A and an upper portion 26B. The lower portion 26A may house a number of the components of the gaming machine 22, as described below. The upper portion 26B may extend upwardly from the lower portion 26B and may, for example, support one or more display devices (as described below) or other elements of the gaming machine 22.

As described in more detail below, the housing 26 may include one or more doors or panels capable of being moved between an open position which allows access to one or more interior areas, and a closed position in which access to the one or more interior areas is generally prevented. For example, the gaming machine 22 may have a button deck or console 34 as detailed below. This button deck or console 34 may be moveable between a closed position, such as illustrated in FIGS. 1A and 1B, and an open position (illustrated in FIG. 4A). When the button deck or console 34 is in the open position, access is provided to the interior of the housing 26 and one or more components of the gaming machine 22 therein. As illustrated in FIG. 1A, the housing 26 may also include one or more access panels 46, such as for accessing other portions of the interior of the housing 26. Such panels 46 may comprise, for example, a hinged door or the like.

In one example, access may be provided to the top portion 26A of the housing 26, such as via a tower access panel 36. Additional details of this panel 36 are provided below.

In one example, the various panels, doors or the like may be access controlled, such as via one or more locks. Further, security elements such as intrusion switches or sensors may be used to detect the opening and/or closing thereof.

In one example, the gaming machine 22 generally has a front, which the player faces when playing the machine, an opposing rear, and two sides. As indicated, the configuration of the gaming machine 22 may vary. In the example illustrated, the gaming machine 22 has an "upright" configuration. However, the gaming machine 22 could have other configurations, shapes or dimensions (such as being of a "slant"-type, "bar-top" or other configuration as is well known to those of skill in the art).

The gaming machine 22 preferably includes at least one first or main display 28 configured to display game information. The first or main display 28 may comprise an electronic video display such as a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g. 4:3, widescreen or the like). The first or main display 28 may be capable of projecting or displaying a wide variety of information, including images, symbols and other indicia or information associated with game play, game promotion or other events.

While the gaming machine 22 might include a single display device, in the illustrated example, the gaming machine 22 includes a first or main display 28 and a secondary display 30. In this example, the first or main display 28 is generally located at the front of the housing 26, such as being mounted to the top portion 26A of thereof, while the second display 30 is positioned above the housing 26 and the first display 28. As illustrated in FIG. 1C, the second display may thus be referred to as a top display, as it may be mounted to the top portion 26A of the housing 26, such as via a display support 48. Both displays 28,30 are generally located at the front of the gaming machine 22 and are oriented so that they face a player thereof. In this example, the first or main display 28 is a curved screen display. However, in the main or first display 28 might have other configurations, as detailed below.

While the illustrated gaming machine 22 has two displays 28,30, the gaming machine 22 might have additional displays, such as three or more. For example, the gaming machine 22 might include side displays (such as mounted to the exterior of the housing 26) and might include multiple displays of differing sizes and the display devices might be arranged in various orientations. For example, as illustrated in FIG. 1A, the first display device 28 may be generally rectangular (such as having a 4:3 aspect ratio) and be arranged in "portrait" orientation (longest dimension in the vertical direction). The second display 30 might have an aspect ratio of 16:9 and be arranged in landscape orientation. However, the first and second displays 28,30 may have various configurations and be mounted in different orientations (for example, for a "slant-type" gaming machine, the first or main display 28 might be arranged in landscape orientation).

While the display devices may comprise one or more video displays, in another example, the gaming machine 22 may include one or more physical reels capable of displaying game information, such as slot symbols. In such a configuration, means are provided for rotating the physical reels. In one or more examples, the means may comprise a mechanical linkage associated with a spin arm, with movement of the spin arm (a "pull") by a user causing the reels to spin. In such an arrangement, the reels are generally allowed to free-wheel and then stop. In another example, electronically controlled mechanisms are arranged to rotate and stop each reel. Such mechanisms are well known to those of skill in the art. In this arrangement, actuation of the spin arm or depression a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. The principal of such an arrangement is described in U.S. Pat. No. 4,448,419 to Telnaes, which is incorporated herein by reference. For example, the main display 28 might comprise one or more sets of rotating reels, including one or more rotating reels set within a video display.

As described in more detail below, the gaming machine 22 is preferably configured to present one or more games upon a player making a monetary payment or wager. In this regard, as described in more detail below, the gaming machine 22 includes mechanism or means for accepting monetary value.

In one example, certain game outcomes (but preferably not all game outcomes) may be designated as winning outcomes (the non-winning outcomes may be referred to as losing outcomes). Prizes or awards may be provided for winning outcomes, such as monetary payments (or representations thereof, such as prize of credits), or promotional awards as detailed herein. As detailed below, the gaming machine 22 preferably includes a mechanism or means for returning unused monetary funds and/or dispensing winnings to a player.

The gaming machine 22 preferably includes one or more player input devices 32 (such as input buttons, plunger mechanisms, a touch-screen display, joystick, touch-pad or the like). These one or more devices 32 may be utilized by the player to facilitate game play, such as by providing input or instruction to the gaming machine 22. For example, such input devices 32 may be utilized by a player to place a wager, cause the gaming machine 22 to initiate a game, to initiate a reel spin, to "cash out" of the gaming machine, or to provide various other inputs. One or more of these input devices 32 may be associated with a button deck or console 34, such as which extends outwardly from the front of the gaming machine 22 towards the player. As described below, while one or more of the player input devices 32 may comprise physically movable elements, such as actuatable buttons, the player input devices might comprise touch-type buttons, such as associated with a portion of the deck or console 34.

In one example, the gaming machine 22 includes at least one microprocessor or controller (not shown) for controlling the gaming machine, including receiving player input and sending output signals for controlling the various components or peripheral devices of the machine 22 (such as generating game information for display by the displays 28,30). The controller may be arranged to receive information regarding funds provided by a player to the gaming machine 22, receive input such as a purchase/bet signal when a purchase/bet button is depressed, and receive other inputs from a player. The controller may be arranged to generate information regarding a game, such as generating game information for display by the at least one display 28,30, for determining winning or losing game outcomes and for displaying information regarding awards for winning game outcomes, among other things.

The controller may be configured to execute machine readable code or "software" or otherwise process information, such as obtained from a remote server. Software or other instructions may be stored at a memory or data storage device, e.g. in a fixed or non-transitory configuration. The memory may also store other information or data, such as data stored in tables or other forms (including, but not limited to look-up tables, pay tables and other information including tracked game play information). The gaming machine 22 may also include one or more random number generators for generating random numbers (such as implemented by a random number generator software module stored in the memory and executable by the processor), such as for use in selecting game elements and for presenting the game in a random fashion (e.g. whereby the game is presented in a manner in which the player cannot control the outcome) or pseudo-random fashion (e.g. such as where the game includes a skill component which can affect the outcome of the game). The controller and associated memory are preferably securely located in the housing 26, such as the lower portion 26A thereof.

The gaming machine 22 may be configured to generate and present games in a stand-alone manner or it may be in communication with one or more external devices or systems at one or more times. The gaming machine 22 might communicate with one or more of such external devices or systems via one or more communication ports or other interface devices. These ports or interface devices may be configured to implement various communication protocols (including proprietary protocols) and communicate via wireless, wired or other communication link. For example, the gaming machine 22 may be configured as a server based device and obtain game code or game outcome information from a remote game server (in which event the gaming machine controller may receive game information from the server, such as game outcome information, and use that server-generated information to present the game at the gaming machine).

As indicated, the gaming machine 22 is configured to present one or more wagering games. The gaming machines 22 is preferably configured to accept value, such as in the form of coins, tokens, paper currency, cards, or other elements or devices representing value such as monetary funds. Thus, as indicated above, the gaming machine 22 preferably includes a mechanism or means for accepting monetary value. For example, the gaming machine 22 might include a coin acceptor for accepting coins. Of course, associated coin reading/verifying devices and coin storage devices may be associated with the gaming machine 22 if it is configured to accept coins. Likewise, as illustrated in FIG. 1A, the gaming machine 22 might include a media reader 40. Such a reader may be configured to accept and read/verify paper currency and/or other media such as tickets. Of course, in such event the gaming machine 22 may further be configured with one or more paper currency or ticket storage devices, such as cash boxes, and other paper currency or media handling devices (including transport devices).

The gaming machine 22 might also be configured to read FOB s, magnetic stripe cards or other media having data associated therewith and via which value or funds may be associated with the gaming machine 22. The mechanism for accepting monetary value might also comprise hardware and/or software which allows a player to transfer (such as electronically) funds from an account, such as a casino wagering account, or a bank or other financial institution account. Such a mechanism might include a communication interface which permits the gaming machine to communicate with a mobile phone, PDA, tablet or other electronic device of the player (such as via a physical interface or wired or wireless communications, such as to enable the transfer of funds from the player to the gaming machine or system.

When the player associates funds with the gaming machine or an associated system, a credit balance may be generated. The credit balance may comprise a plurality of monetary value credits. The player may wager some or all of the associated monetary value, such as by wagering one or more of the credits associated with the credit balance. For example, the player might provide input via one or more of the player input devices 32 to wager a certain number of credits (such as "Bet 1 Credit", "Bet 5 Credits", "Bet Maximum Credits" or other options). In one example, when the player's wager is received, the player's credit balance is reduced by the number of wagered credits. The player might then provide a separate input to begin the game. In other example, the player might select a "play game" input, such as by pressing a "spin" button, which input is taken to comprise both an instruction to place a wager (such as of a pre-set or pre-selected number of credits) and to start the game. Of course, other configurations may be implemented for accepting monetary value from the player and for allowing the player to place a wager from the associated monetary value.

In one example, the gaming machine 22 is configured to award winnings for one or more winning wagering game outcomes. Such winnings may be represented as credits, points or the like. In one example, the player may "cash out" and thus remove previously associated funds and any awarded winnings or such may otherwise be paid to the player. These winnings may be associated with the player's credit balance, thus increasing the player's credit balance.

In one example, the player may provide an input to the gaming machine 22 to indicate their desire to cash out, such as by selecting a “cash out” button or touch screen feature or providing other input. In response, a monetary value represented by the player’s credit balance or the like is preferably paid, transferred or otherwise provided to the player. For example, upon an award or at cash-out, associated funds may be paid to the player by the gaming machine 22 dispensing coins to a coin tray. In another example, funds may be issued by dispensing paper currency or other media. In yet another example, a player may be issued a media, such as a printed ticket, which ticket represents the value which was paid or cashed out of the machine. The aspects of gaming machine “ticketing” systems are well known. One such system is described in U.S. Pat. No. 6,048,269 to Burns, which is incorporated herein in its entirety by reference. In yet another example, the cash-out might result in the dispensing of a card or other media which stores or represents the cashed-out funds, such as by writing funds information to a magnetic stripe of a card which is inserted into a media writer of the gaming machine or dispensed from the machine. In this regard, the gaming machine 22 may include one or more media printers or writers 42. In other examples, the cash-out mechanism may result in the funds value being transferred to an external device or account, such as a player’s casino account (such as associated with a casino server), an electronic wallet, a remote bank or other financial account, or an electronic device such as a player’s phone, PDA or tablet.

The gaming machine 22 may also include a player tracking device, such as a card reader and/or an associated keypad or other input device (such as a touch screen display). Such player tracking devices are well known and may permit the game operator to track the players of the gaming machine. The tracked play may be utilized to offer player bonuses or awards.

The gaming machine 22 may include other features, such as one or more audio generating devices. For example, the gaming machine 22 may include one or more speakers 44 for generating sound. A sound card or the like might be used to generate an output to the speakers 44.

As another example, the gaming machine 22 may include a tower light or candle 50. The tower light or candle 50 may include one or more illumination or display devices (lights, video displays, etc.) for providing visual indications or information, and/or have other features. The tower light or candle 50 may extend upwardly from the top or second display 30, such as via connection thereto or to the upper portion 26B of the housing 26 (whereby the tower light or candle 50 may comprise or define the top-most portion of the gaming machine 22).

As detailed below, the gaming machine 22 may include a footrest 52. The footrest 52 may extend outwardly from the lower portion 26B of the housing 26 from the front thereof towards a player thereof.

The main game controller or processor may communicate with several of the peripheral devices (e.g. media printer/writer 42, displays 28,30, player input devices 32, etc.) via one or more intermediary controllers. For example, some of the peripheral devices might comprise USB type or enabled devices which are controlled by an intermediary USB controller.

A casino may have numerous such gaming machines 22, such as located on a casino floor or in other locations. Of course, such gaming machines 22 might be used in other environments, such as an airport, a bar or tavern or other locations.

It will be appreciated that the gaming machine illustrated in Figures IA-C is only exemplary of one example of a gaming machine. For example, it is possible for the gaming machine to have various other configurations, including different shapes and styles and having different components than as just described.

Figure 1D:
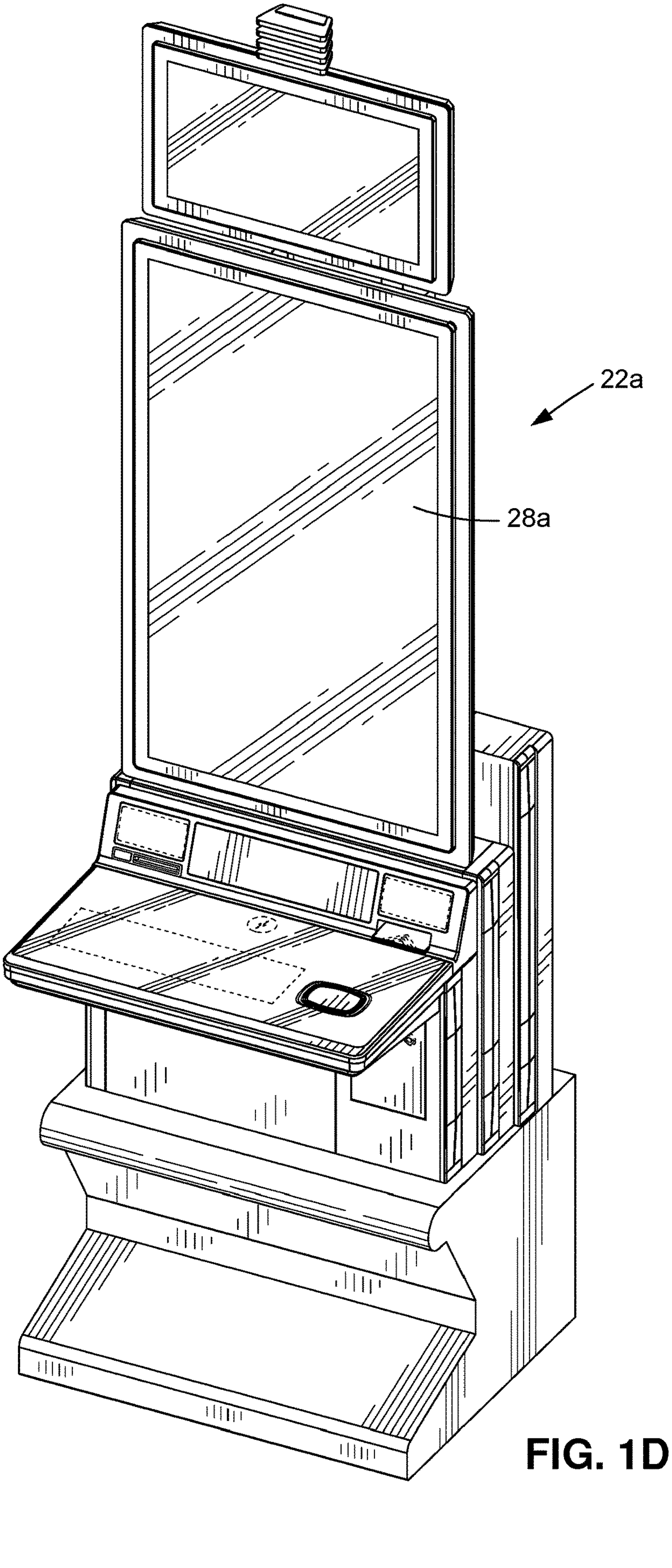
FIG. 1D illustrates another example of a gaming machine in accordance with the disclosure.

FIG. 1D shows another example of a gaming machine 22*a* in accordance with the disclosure. This example gaming machine 22*a* is similar to that described above, except that the main display 28*a* is generally planar instead of being non-planar as in the example illustrated in FIG. 1A.

The gaming machine of the disclosure may, as noted above, be part of a system which includes other devices. For example, the gaming machine may communicate with one or more casino systems, such as a player tracking server or system, an accounting system or server, a ticketing system, a bonusing system, a tournament system, other gaming machines, and external devices.

Additional aspects of the disclosure, including features of the gaming machine, will now be described in more detail. In particular, aspects of the disclosure comprise improvements to a gaming machine and a gaming machine having one or more of such improvements, such as one or more features which are applicable to such a gaming machine.

Illumination Diffuser

Figure 2A:
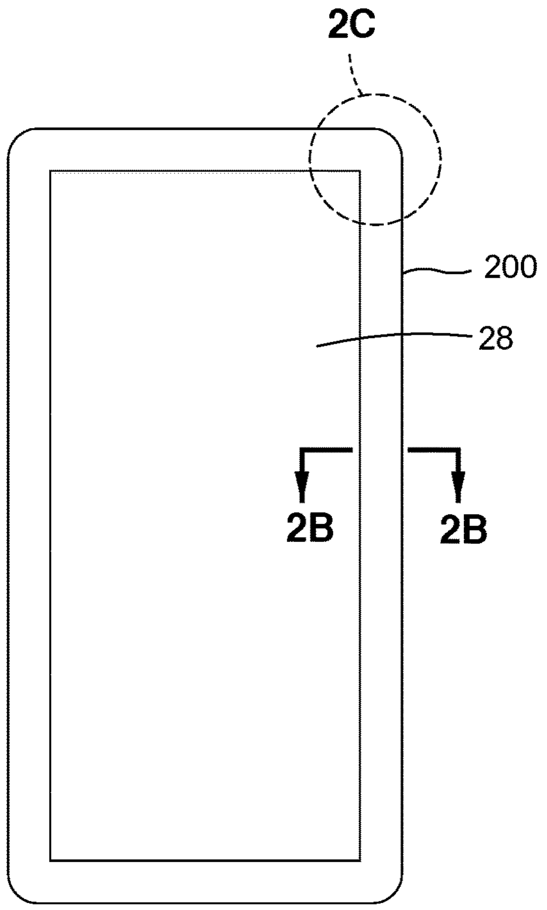
FIGS. 2A-C illustrate an example of an illumination diffuser in accordance with an example of the disclosure.
Figure 2C:
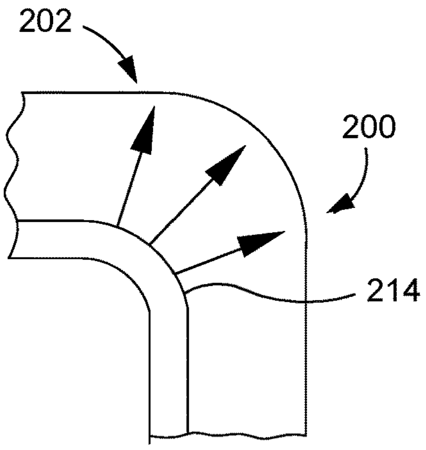
Figure 2B:
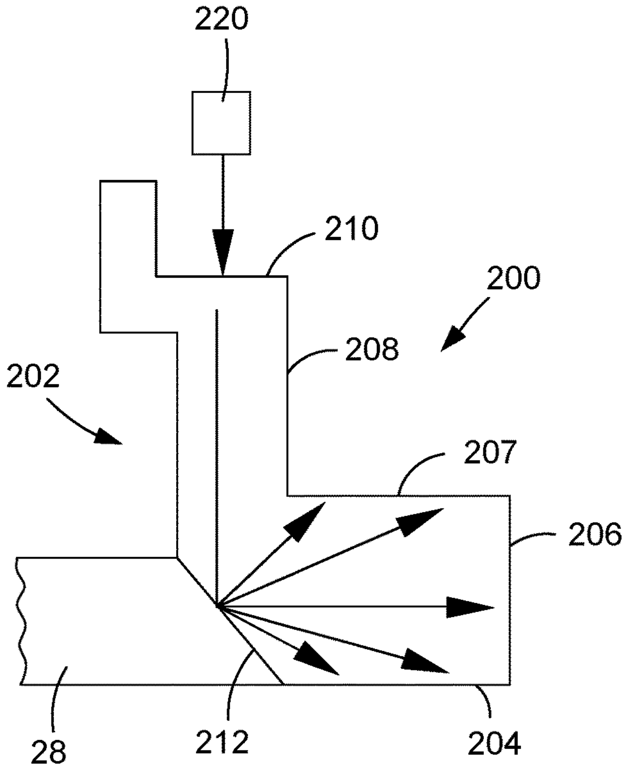

FIGS. 2A-C illustrate an illumination diffuser 200 in accordance with an example of the disclosure. In general, the illumination diffuser 200 may comprises an element that may be illuminated.

As indicated above, the gaming machine 22 may have one or more displays, such as the first or main display 28. In one example, an illumination diffuser 200 is associated with the display 28. The illumination diffuser 200 is located at a periphery of the display 28. In one configuration, it extends around the entire periphery, but it might extend along or around only portions thereof. In a configuration in which is extends entirely around the display 28, it may define a central opening in which the display 28 is located. The illumination diffuser 200 may be located directly adjacent to the periphery of the display 28, so that it appears to be a part thereof, such as to appear as an illuminated body, frame or other peripheral portion of the display 28.

In one configuration, the illumination diffuser 200 is configured to transmit or emit light from one or more portions thereof, such as a front, rear and an edge portion thereof, whereby when a viewer looks at the display 28 from either the front, rear or a side thereof, the peripheral portion of the display 28 is illuminated.

In one example, as illustrated in FIG. 2B, the illumination diffuser 200 comprises a body 202 which may be located at the periphery of the display 28, such as around a frame thereof. The body 202 defines a front face 204, a side edge 206 and a rear face 207. An extension 208 of the body 202 extends rearwardly from the rear face 207, such as to a receiver or receiving face 210. The body 202 is preferably constructed from a transparent or generally transparent material which permits light to pass therethrough.

In one example, one or more light emitting elements 220, such as one or more LEDs or other lights, are configured to project light towards the receiver 210. The light emitting elements 220 may be spaced around/along the illumination diffuser 200, where the number of such elements 220 may be selected so as to generate a desired brightness and uniform pattern of illumination.

As illustrated in FIG. 2B, this light is transmitted forwardly through the body 202. As illustrated in FIG. 2B, the body 202 defines a directing surface 212. This directing surface 212 is configured to reflect or redirected the projected light towards other portions of the body 202, such as the front face 204, the edge 206 and the rear face 207. As illustrated, the directing surface 212 is preferably angled, sloped or otherwise shaped so as to redirect the light from a first direction to a plurality of directions offset from the first direction.

As illustrated in FIG. 2C, in one example, at corners of the display 28, the body 202 may be curved so as to define an arcuate surface 214 which again causes light which is projected by the one or more light emitting elements 220 to be distributed to the front face 204, the side edge 206 and the rear face 207 at the corner 214. In one configuration, the arcuate surface 214 is conical, such as where the corner has a width greater than the height, so as to effectively redirect light in multiple planes.

In one example, the receiver 210 comprises a portion of the body 202. However, in other configurations, the receiver 210 might comprise other light transmitting elements, such as optic fiber or light reflecting elements which direct light from the emitter(s) 220 to the directing surface 212.

An advantage of the disclosure is that the illumination diffuser 200 is configured to generate an illuminated front face, rear face and side edge for viewing by a viewer. In one example, the illumination of those portions is generally uniform.

Further, in the illustrated configuration, illumination of the illumination diffuser 200 is indirect to the viewer, in that the one or more light emitting elements 220 are located behind the directing surface 212 and not visible to the viewer, and yet the light emitting elements 220 effectively illuminate both the front face 204 and edge 206 of the illumination diffuser 200.

Another advantage of the illumination diffuser 200 is the curved corner 214, which results in illumination of the diffuser 200 at the corners of the display 28, and in one example, in a manner where the illumination intensity is generally the same at that location as along the remainder of the illumination diffuser.

Another advantage of the illumination diffuser 200 is that it allows for an illuminated or lighted feature that can be associated with a display, but which has a generally slim and space-saving profile.

While the illumination diffuser 200 has been described with reference to the main display 28, it will be appreciated that it may be used with other displays, such as the top or second display 30 of the gaming machine 22 or other displays thereof (or displays used in other settings).

Door Closing Mechanism

Figure 4A:
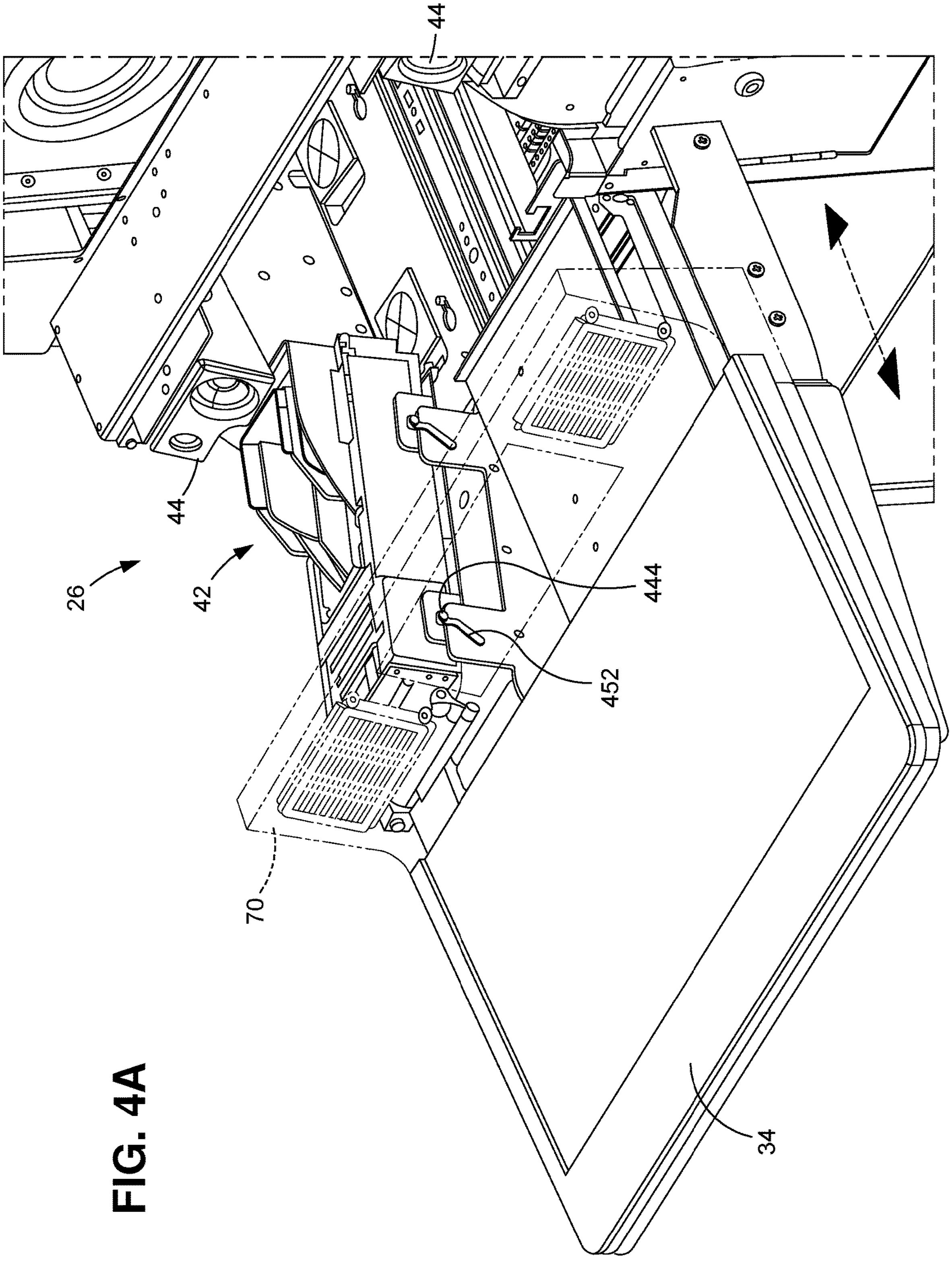
FIGS. 4A-D illustrates a media printer mounting configuration in accordance with an example if the disclosure.

As indicated above and illustrated in FIG. 4A, in one example, the gaming machine 22 has a door in the form of a movable button deck or console 34. One example of the disclosure is an adjustable door closing or latching mechanism. The door closing or latching mechanism has applicability to the movable button deck or console 34, but also doors having other configurations.

Figure 3B:
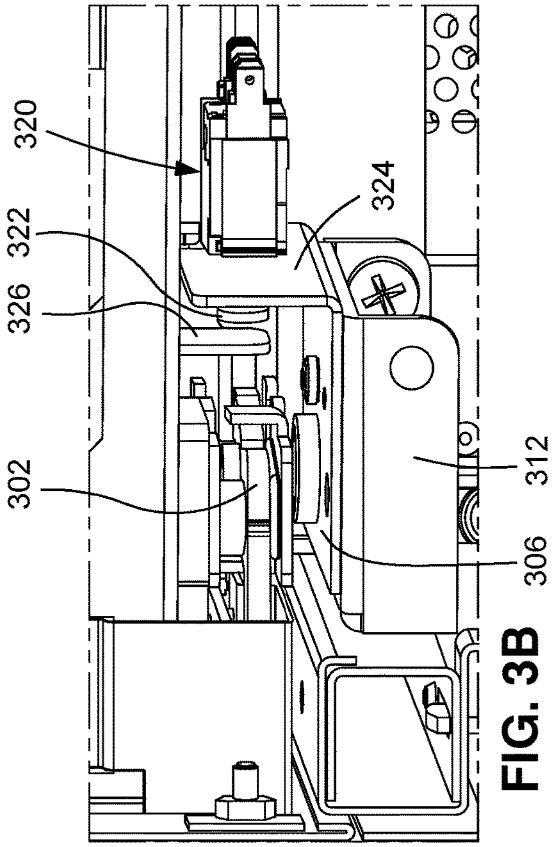
FIGS. 3A-C illustrate a gaming machine door closing mechanism in accordance with an example if the disclosure.

In one example, the button deck or console 34 is movably mounted to the housing 26 of the gaming machine 22. The button deck or console 34 may be moved from a closed position, such as illustrated in FIG. 1A, to an open position, such as illustrated in FIG. 4A In this example, the button deck or console 34 move generally horizontally outward from the front of the gaming machine 22. As one example, the button deck or console 34 may be mounted on or to one or more slides 300, as illustrated in FIG. 3A. For example, the button deck or console 34 may be mounted to a slide 300 at each side of the button deck or console 34. As is known, the slide 300 may have a first stationary component, such as mounted to the housing 26, and a second moving component which is connected to the first stationary component and which is movable relative thereto. The button deck or console 34 may be mounted to the second moving component.

The door closing or latching mechanism may be utilized to maintain the button deck or console 34 in its closed position. In one example, this mechanism may comprise a latch 302 for engagement with a striker pin 304, as illustrated in FIG. 3B.

The latch 302 may be mounted to the button deck or console 34, such as to a frame portion thereof. In one example, the latch 302 is a rotating or rotary latch, movable between a closed position (such as about the striker pin 304) and an open position. In one example, the latch 302 is configured as a slam latch, wherein an impact force of the latch 302 hitting the striker pin 304 causes the latch 302 to rotate or otherwise move between its open and closed position (wherein if the force is insufficient, the latch 302 does not close). The latch 302 may be opened by a latch release 303 (see FIG. 4B), such as may be manually operated. The latch release may be lock-controlled, such as via one or more locks 305 (see FIG. 4B) such as to prevent unauthorized unlatching of the latch 302, and thus unauthorized opening of the button deck or console 34.

The striker pin 304 is associated with the housing 26 of the gaming machine 22. In one example, the striker pin 304 is associated with a mount 306, which mount may be connected to the gaming machine 22 in different positions. The striker pin mount 306 may comprise a plate or other strong supportive structure (for supporting the striker pin 304 and maintaining it in position against the latch closing force).

Figure 3C:
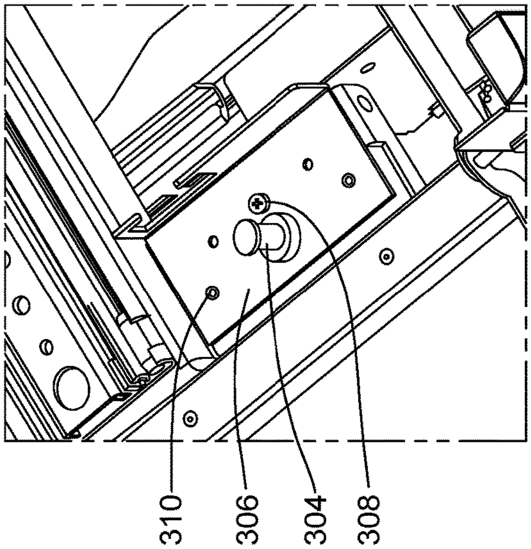
Figure 3A:
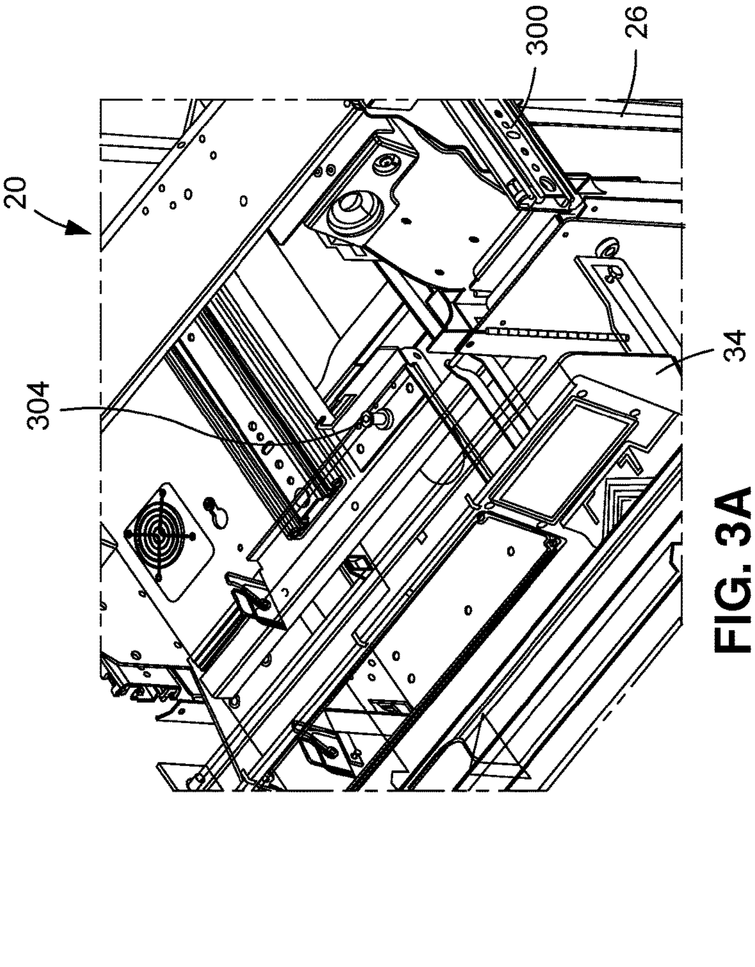

In one configuration, the mount 306 may be selectively connected to the housing 26, such as by one or more fasteners 308 (see FIG. 3C). The fastener 308 may comprise a machine screw. The mount 306 may include one or more apertures 310 therethrough, such as for accepting a shank of the fastener 308. The user may drive the fastener 308 through the mount 306 and into a portion of the housing 26, such as a support or frame element 312 thereof.

As illustrated, the support 312 may comprise a generally "U"-shaped bracket which is attached to a frame portion of the housing 26. The top of that bracket may be generally planar and accept thereon a generally planar portion of the striker pin mount 306, whereby the striker pin mount 306 may be positioned on the support 312 in a number of different positions.

During assembly, a user may pre-position the striker pin 304 and the associated mount 306 and close the latch 302. When the striker pin 304 is in the proper position for latch closure, the user may lock the striker pin 304 in position by engaging at least one fastener 308 with the mount 306 and the support 312, such as by driving a threaded screw through the mount 306 and into the support 312. If due to later use the latch 302 and striker pin 304 move out of position, the user may release the striker pin 304 by removing the fastener 308 and then engaging the fastener or a different fastener with the mount 306 and the support 312, such as using a different one of the apertures 310 as a guide.

In one example, the door, such as the button deck or console 34, may include a security element for detecting opening and/or closing thereof. This security element may comprise, for example, an intrusion switch 320, as illustrated in FIG. 3B. The intrusion switch 320 may include a plunger 322 which is movable from a first position (such as an extended position) to a second position (such as a retracted or compressed position), and wherein a change in the position of the plunger 322 may be detected and an output provided, such as to the controller of the gaming machine 22, to another system, or to an associated controller. Such an output might be recorded and used to track access, might be utilized to signal an alarm or the like. In other examples, the intrusion switch might have other configurations, such as where the plunger or other element is movable in other manners.

The intrusion switch 320 may be mounted to the striker pin mount 306, such as at a flange 324 thereof. The plunger 322 may then extend outwardly towards an actuator 326 which is associated with the door, such as the button deck or console 34. In this configuration, when the button deck or console 34 is closed, the actuator 326 may engage the plunger 322, such as by moving the plunger 322 to a depressed or closed position. When the button deck or console 34 is opened, the actuator 326 moves away from the intrusion switch 320, thus activating the switch.

In this configuration, the position of the intrusion switch 320 is adjusted along with the striker pin 304, thus preventing a situation where adjustments to either the striker pin 304 or intrusion switch 320, without corresponding adjustment of the other, causes the other two longer operate properly. Thus, when a user adjusts or changes the position of the mount 306, it results in simultaneous adjustment of both the striker pin 304 and intrusion switch 320.

Media Printer Mounting

As indicated above the gaming machine 22 may include a media printer 42, such as for printing and dispensing one or more tickets having associated monetary value or the like.

In one configuration, the media printer 42 is movable between first and second positions, such as to permit access thereto. As one example, the media printer 42 may be associated with the button deck or console 34 which, as just described, may be moved between an open and a closed position.

As illustrated in FIG. 1A, the gaming machine 22 may define a front panel 70 which defines an opening, such as a slot 72, which slot may be surrounded by a bezel. The tickets or other media which are generated by the media printer 42 may be dispensed through that opening or slot 72.

Figure 4B:
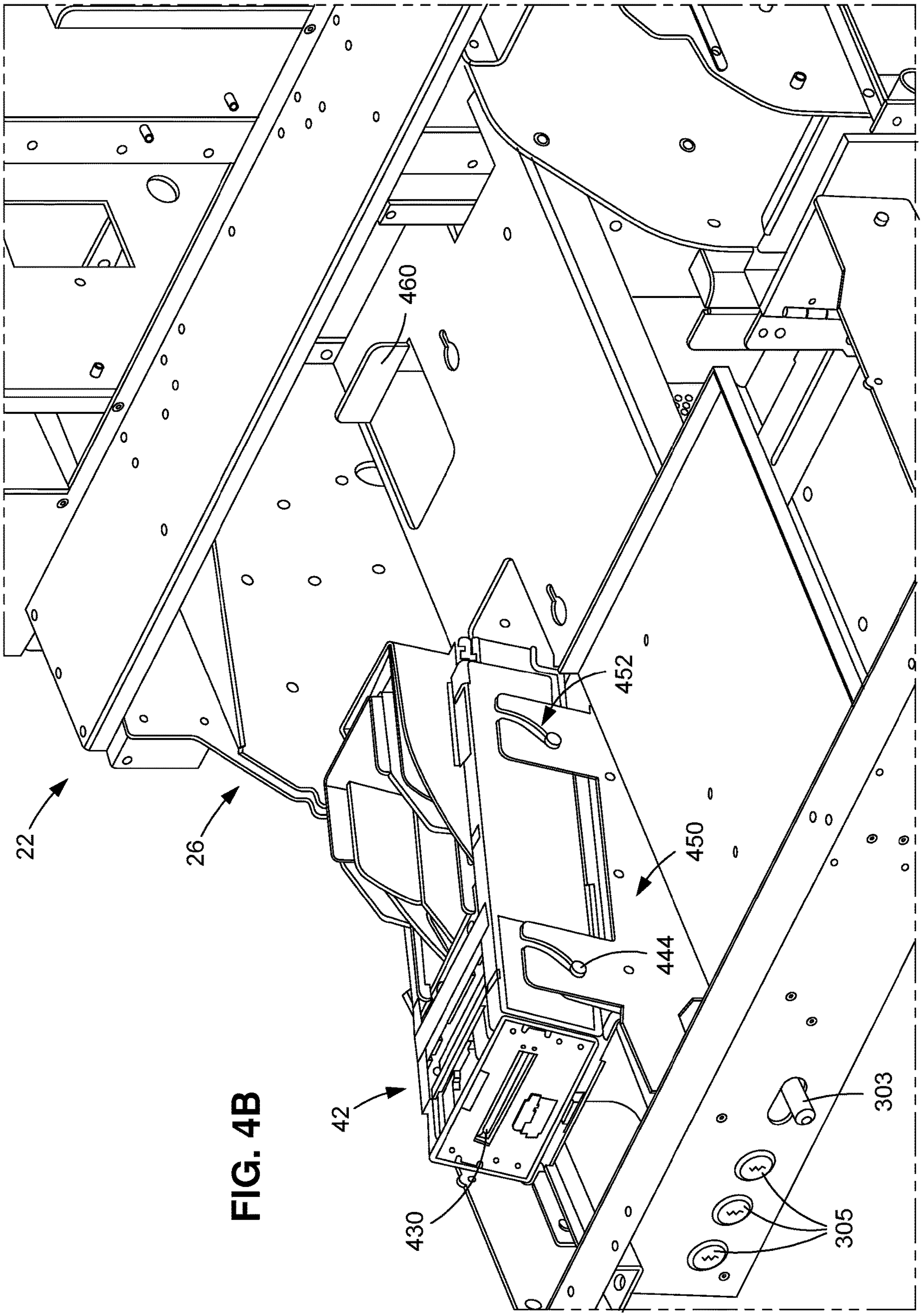
Figures 4C, 4D:
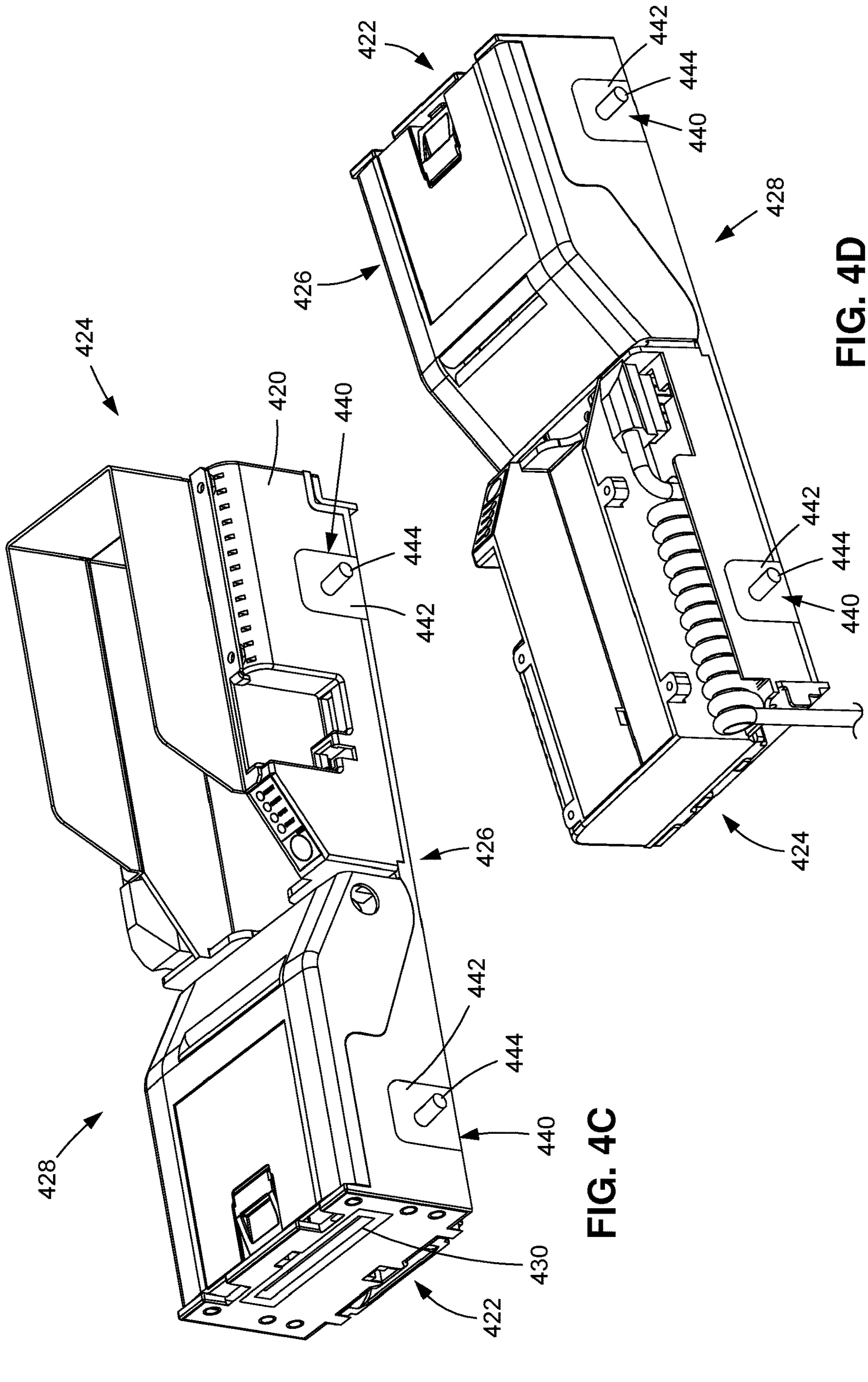

As illustrated in FIGS. 4C and 4D, the media printer 42 may include a housing 420 and have a front 422, an opposing rear 424, and first and second generally opposing sides 426,428. A slot 430 may be located at the front 422, through which media, such as tickets, may be dispensed.

As indicated above, the media printer 42 may be mounted to the button deck or console 34 so as to be movable therewith. As illustrated in FIG. 1A, when the button deck or console 34 is in the closed position, the media printer 42 is located in the housing 26 of the gaming machine 22, with the dispensing slot 430 thereof aligned with the slot or aperture 72 in the panel 70.

As illustrated in FIG. 4B, when the button deck or console 34 is moved to its open position, the media printer 42 is moved outwardly of the housing 26, so as to be accessible. Further, in one configuration, the media printer 42 is selectively connectable to the gaming machine 22. This permits the media printer 42 to be disconnected from the gaming machine 22, such as for replacement or service, and to be connected thereto, for use.

As illustrated in FIGS. 4C and 4D, the media printer 42 may be associated with a mount, such as a tray 440. For example, the housing 420 of the media printer 42 may fit in and/or be connected to the tray 440. The tray 440 may include a bottom and one or more side portions 442, such as which extend along portions of the sides 426,428 of the media printer 42.

Referring to FIGS. 4A and 4B, in one example, the media printer 42 may be removably associated with a mount 450. The mount 450 may be connected to the housing 26 of the gaming machine 22. The tray 440 may define one or more pins or tabs 444 (see also FIGS. 4C and 4D) which extend outwardly from the side portions 442, such as generally perpendicular thereto. These pins or tabs 444 may be configured to engage slots 452 defined by the mount 450.

In one configuration, the mount 450 has first and second upwardly extending portions that correspond to the two sides 426,428 of the media printer 42 (and associated tray 440). Pins 444 may extend outwardly from both sides of the tray 440 for engagement with these two portions of the mount 450. In one example, at least two pins 444 are located at each side of the tray 440, such as located near the front and rear of the media printer 42.

Each slot 452 may extend downwardly into the mount 450. As illustrated, the slots 452 may slope forwardly (so that a bottom portion thereof is located closer to the front of the gaming machine 22 than the top of the slot 452). In use, the media printer 42 may be associated with the gaming machine 22 by aligning the pins 444 of the tray 440 with the slots 452 of the mount 450 (see FIG. 4A), and then lowering the media printer 42 so that the pins 444 move to the bottom of the slots 452 (where, when the slots are curved as described, the media printer 42 moves downwardly and forwardly), as illustrated in FIG. 4B.

When the button deck or console 34 is closed, the media printer 42 is moved rearwardly and, as detailed above, the media dispensing slot 430 thereof is generally aligned with the slot 72 in the panel 70. It will be appreciated that in the above-described removable mounting configuration, the media printer 42 might be moved out of position by a force applied thereto which causes the media printer to move upwardly (e.g. via the pins 444 moving along the slots 452 towards the tops of the slots). In one configuration, at least one stop 460 may be provided for limiting movement of the media printer 42 when it is in its use position.

As illustrated, the stop 460 might comprise an upwardly extending flange which is associated with the housing 26 of the gaming machine 22. The stop 460 is located so that it engages the rear 424 of the media printer 42 when it is in its use position. In this position, rearward movement of the media printer 42 is prevented because of engagement of the media printer 42 with the stop 460. Of course, the stop 460 might have various shapes, sizes and locations.

The media printer mounting has various advantages, including: 1) it eliminates potential interference problems between the front of the media printer and the bezel associated with the housing/front panel; 2) it allows the media printer to be removed/disassociated from the gaming machine 22 without having to remove or loosen fasteners; and 3) it ensures that the media printer remains in a fixed and aligned position during use or movement of the gaming machine 22.

Button Deck

Figure 5:
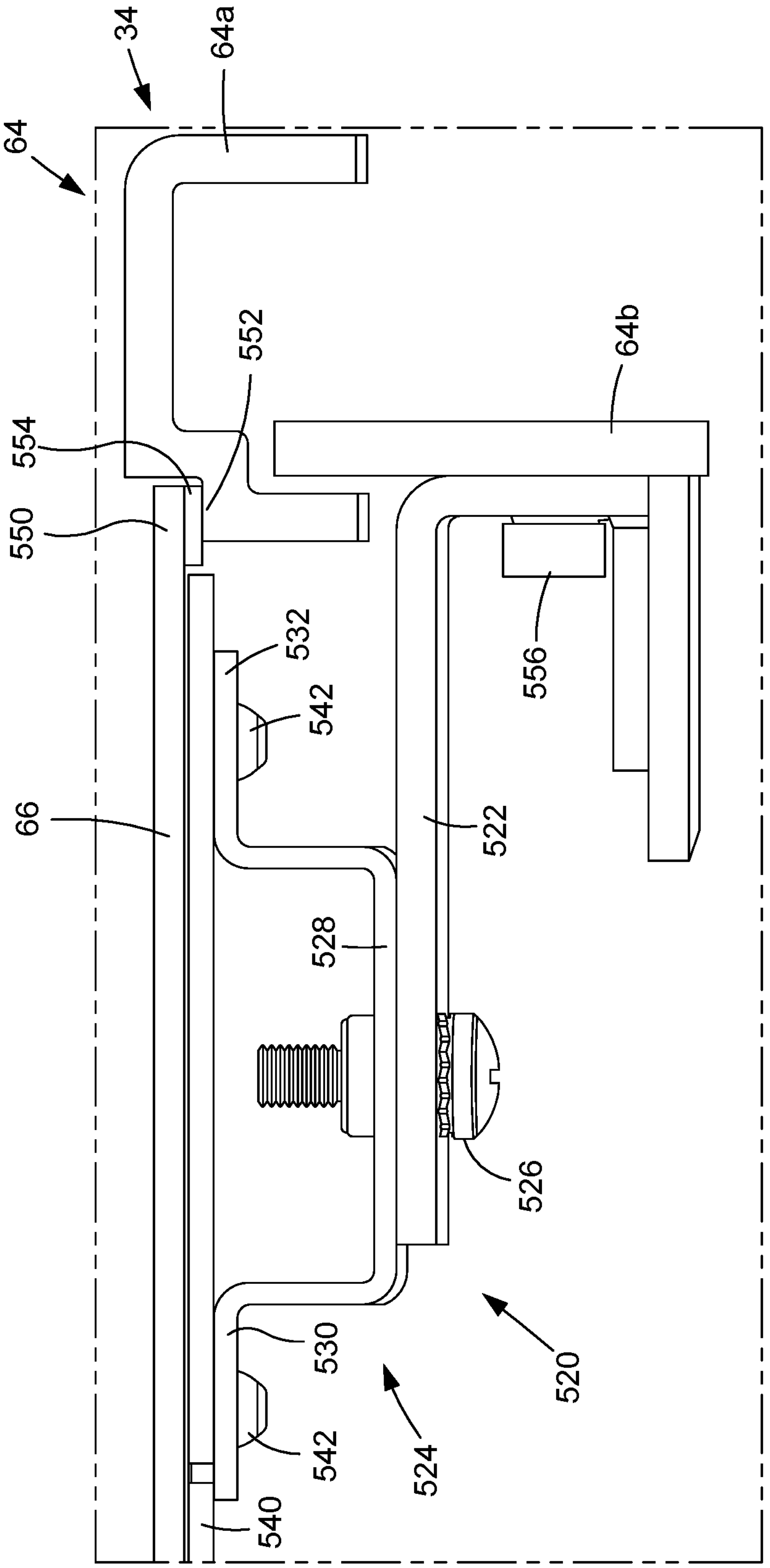
FIG. 5 illustrates a support configuration for a button deck panel in accordance with an example of the disclosure.

One aspect of the disclosure is a support configuration for a top surface of a button deck or console, particularly when the top surface (or a portion thereof) comprises glass. As indicated above and illustrated in FIG. 1B, the gaming machine 22 may include a button deck or console 34. As illustrated in FIG. 1B, the button deck 34 may have a top 60 a peripheral edge 62. The peripheral edge 62 may be defined by a console frame 64 which is connected to the housing 26 of the gaming machine 22 and extends outwardly therefrom. As illustrated in FIG. 5, the console frame 64 may have an edge portion 64*a* and one or more internal supports 64*b*. At least a portion of the top 60 of the button deck 34 may comprise a glass deck 66—such as which is located in an opening defined by the console frame 64.

FIG. 5 illustrates an example of a support configuration for the glass deck 66, which support configuration comprises one or more support brackets 520. The support brackets 520 are configured to support the glass deck 66 from the bottom thereof. As illustrated, the support brackets 520 may comprise a main support 522, such as the generally "L" shaped support which is illustrated and which has a first end connected to a portion of the console frame 64*b*. In the configuration which is illustrated, the main support 522 defines a generally horizontally extending support. A glass support 524 is supported by the main support 522, such as by being connected thereto by one or more fasteners 526. As illustrated, fastener 526 may comprise a threaded fastener and associated nut. However, the glass support 524 might be connected to the main support 522 with other types of fasteners (screws, rivets, clamps) or by other means (welding, etc.).

In one configuration, the glass support 524 is generally "U" shaped, having a central section 528 which is located between a first leg 530 and a second leg 532. The central section 528 may be generally planar for engagement with the horizontally extending portion of the main support 522. The first and second legs 530,532 may be generally "L"-shaped, extending upwardly from the central section 528 and then outwardly therefrom. The first and second legs 530,532 may each also define a generally horizontally extending supporting surface, such as for a mounting plate 540. The mounting plate 540 may be generally planar and be connected to and supported by the legs 530,532 of the glass support 524. For example, the mounting plate 540 may be connected to each leg 530,532 by a fastener 542. The fasteners 542 might again comprise a threaded fastener, or might comprise a rivet or other connector; further, the mounting plate 540 might be connected to the glass support 524 in other manners.

As illustrated, the glass deck 66 rests upon the generally horizontal supporting surface which is defined by the mounting plate 540. In one configuration, the glass deck 66 is secured to the mounting plate 540, such as by adhesive.

In one example, the support bracket 520 is configured to locate (when considering the location of the glass deck 66 and the size of the mounting plate 540), the mounting plate 540 at a location which is inset from a peripheral edge 550 of the glass deck 66. In this regard, one aspect of the support bracket 520 is that it is connected to and supported by the console frame 64 (which is located at the periphery of the button deck 34), but it extends inwardly therefrom a sufficient distance to so locate the mounting plate 540 relative to the glass deck 66 as just described.

Further, as illustrated in FIG. 5, one or more portions of the peripheral edge 550 of the glass deck 66 may be located adjacent to, but not contacting, the console frame 64. As illustrated, one or more portions of the edge portion 64*a* of the console frame 64 may define an inset 552 in which a portion of the peripheral edge 550 of the glass deck 66 may be located. As illustrated, the support bracket 520 preferably maintains the bottom of the glass deck 66 in a position in which it is elevated above or generally does not contact the console frame 64.

In one configuration, an energy absorber 554 is located between the glass deck 66 and the console frame 64. This energy absorber 554 might comprise, for example, a foam, resilient rubber or similar material. The energy absorber 554 might also be formed into a gasket or seal, thus blocking the space between the glass deck 66 and the console frame 64. In use, the energy absorber 554 preferably absorbs energy, such as from downward force on the peripheral edge of the glass deck 66, to prevent that edge from impacting the adjacent console frame 64 (which might damage the glass).

In one configuration, multiple support brackets 520 may be utilized to support the glass deck 66. For example, a support bracket 520 might be provided at each corner of the glass deck 66 and/or in other locations.

As illustrated in FIG. 5, the main support 522 may be disconnectable from the console frame 64, such as by one or more fasteners 556. This allows the glass deck 66, with the connected support brackets 520 to be removed from the console deck 64 (and/or installed as unit).

An important aspect of the support is that it supports the button deck, but protects the peripheral edge of the glass deck 66 from damage, such as due to downward force applied thereto.

Footrest

Figure 6B:
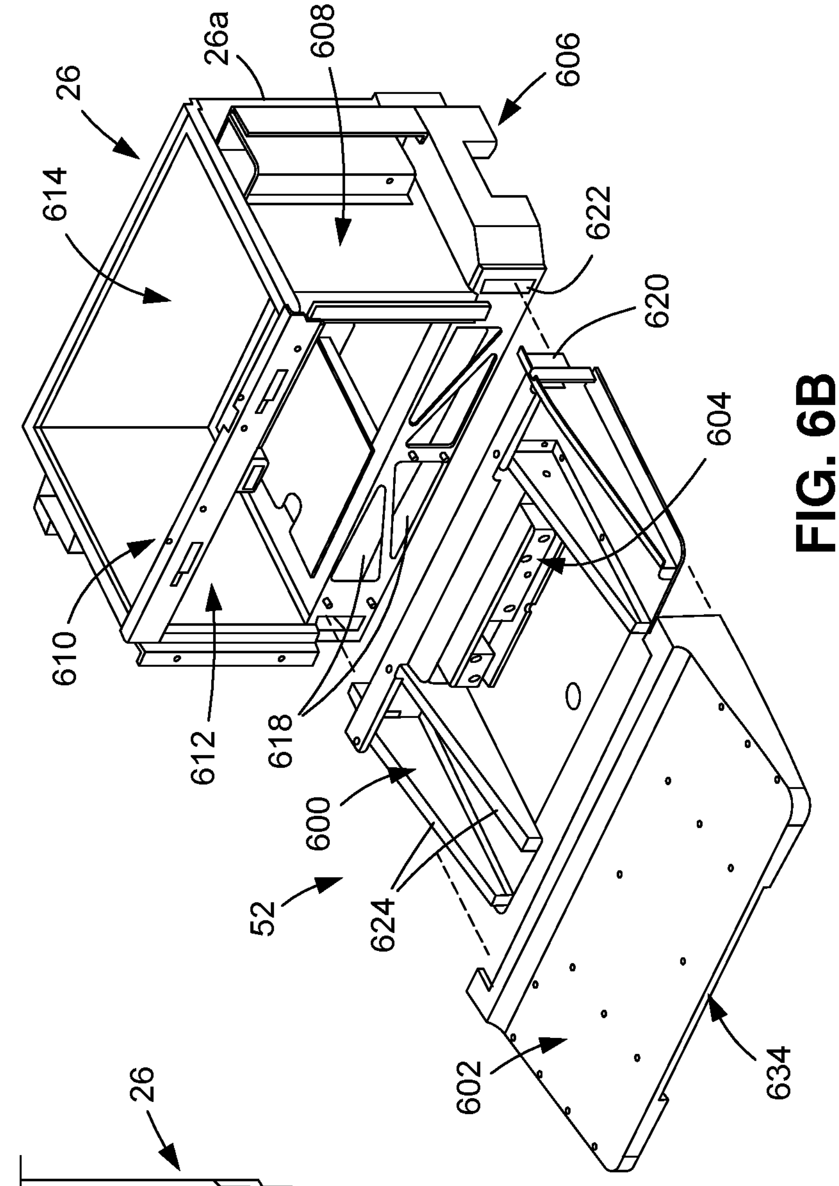
FIGS. 6A-E illustrate a convertible footrest for a gaming machine in accordance with an example of the disclosure.
Figure 6A:
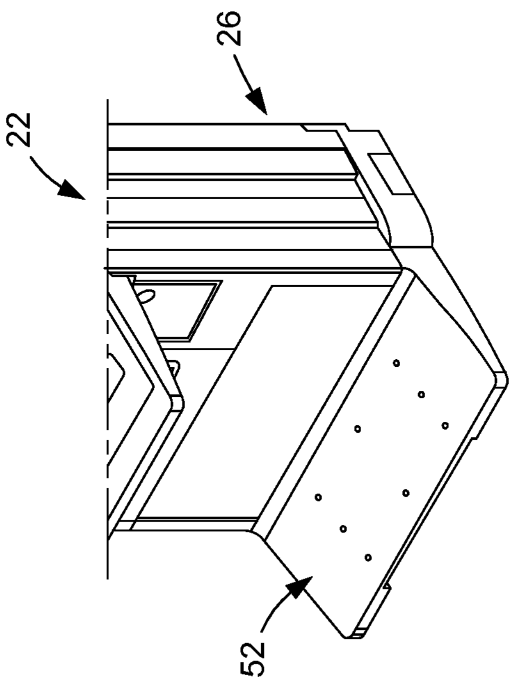

As illustrated in FIG. 1A and FIG. 6A, the gaming machine 22 may include a footrest 52. In one example, the footrest 52 may be arranged into multiple different configurations, such as depending upon the desired configuration or use of the gaming machine 22.

As illustrated in FIG. 6B, the footrest 52 may comprise a base portion 600, a cover 602, and a conversion bracket 604. As illustrated the lower portion 26*a* of the housing 26 of the gaming machine 22 may include a housing base 606, where the reminder of the gaming machine 22 is supported on that housing base 606. The lower portion 26*a* of the housing 26 may have a first side 608, a generally opposing second side 610, a front 612 and a rear 614. A portion of the front 612 may be generally open, until closed with a panel 616 (see FIG. 6E).

One or more passages or apertures 618 may extend through the housing base 606 at the front 612. These openings 618, as described in more detail below, allow air to flow from an interior space of the housing 26, and particularly the housing base 606, through the front 612.

The base portion 600 of the footrest 52 extends from the housing base 606. In one example, the base portion 600 of the footrest 52 is selectively connectable to and disconnectable from the housing base 606. As illustrated, the base portion 600 of the footrest 52 may have a rear portion which defines one or more flanges 620 for engagement with mating slots or openings 622 in the housing base 606 (and may be secured together, such as with fasteners, clips or other engagement mechanisms).

Figure 6C:
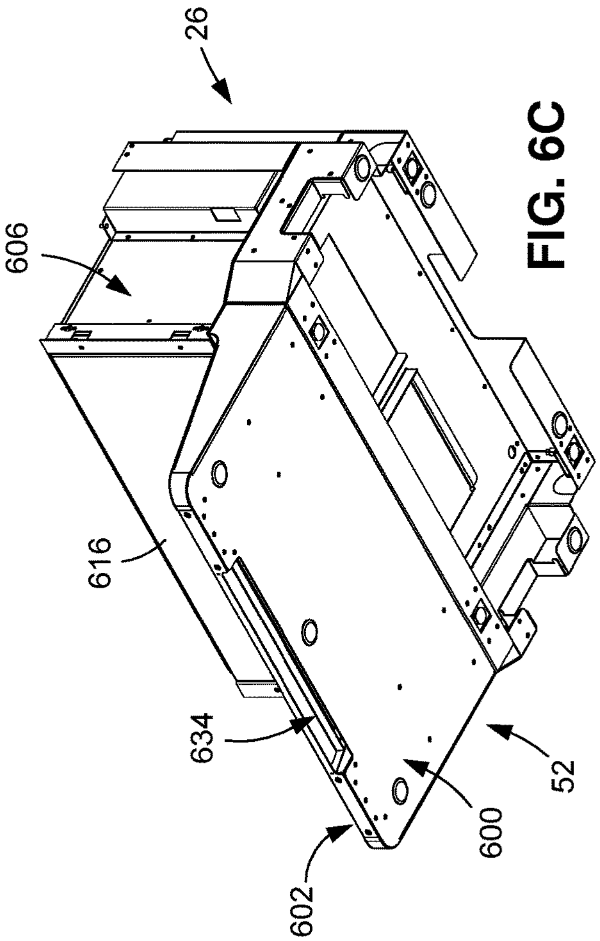

The base portion 600 of the footrest may have a generally closed bottom or base (see FIG. 6C) and one or more supporting struts 624 extending upwardly therefrom. As illustrated, the struts or supports 624 may be tapered, being taller at the rear (corresponding to the rear portion of the base portion 600 of the footrest 52).

The footrest cover 602 is configured to be connected to the base portion 600. In one example, the cover 602 fits over the base portion 600, so as to generally close a top of the base portion 600. The cover 602 may thus have a generally closed top and downwardly extending sides, thus defining an open back or rear which extends into a recessed bottom for accepting the base portion 600 of the footrest 52 therein. When connected to the base portion 600, the footrest cover 602 may be supported by the struts 624 of the base portion 600 (thus providing support against a downward force applied to the cover 602 by a player's feet resting thereon).

In one example, the conversion bracket 604 is selectively connectable to the footrest 52, and namely the base portion 600. As illustrated in FIG. 6D, when the conversion bracket 604 is not associated with the base portion 600 of the footrest 52, the rear of the base portion 600 defines one or more openings 630. These openings 630 preferably communicate with the one or more openings 618 in the front 612 of the housing base 606. Further, at least one passage 632 is defined by the base portion 600. This passage 632 leads from the one or more openings 618 to a vent 634 (see also FIG. 6C) such as defined at the front of the footrest 52. The passage 632 may be defined, for example, between pairs of struts 624 of the base portion 600, plus the bottom or base of the base portion and the footrest cover 602.

In one example, the conversion bracket 604 is eliminated, such as when it is desired to associate the gaming machine 22 with an air handling system. As one example, the gaming machine 22 may be associated with a vent or air supply of a casino or similar location, wherein at least one outlet of such a system is configured to deliver air to the interior of the housing base 606 (for example, by the lower housing 26A being positioned over or in alignment with such a supply). In this configuration, air which is provided to the interior of the housing base 606 passes through the openings 618 in the front 612 thereof, through the one or more openings 630 in the base portion 600 of the footrest 52, through the passage 632, and then out the at least one vent 634.

Figure 6E:
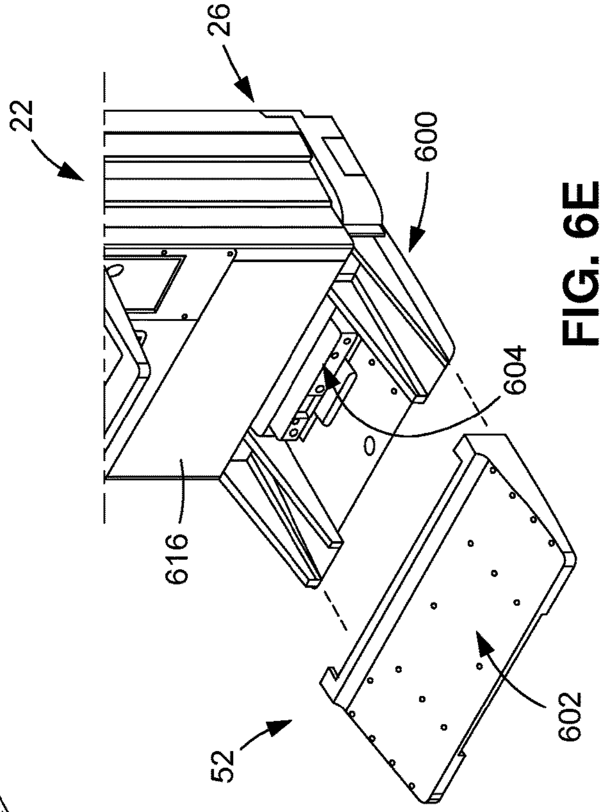
Figure 6D:
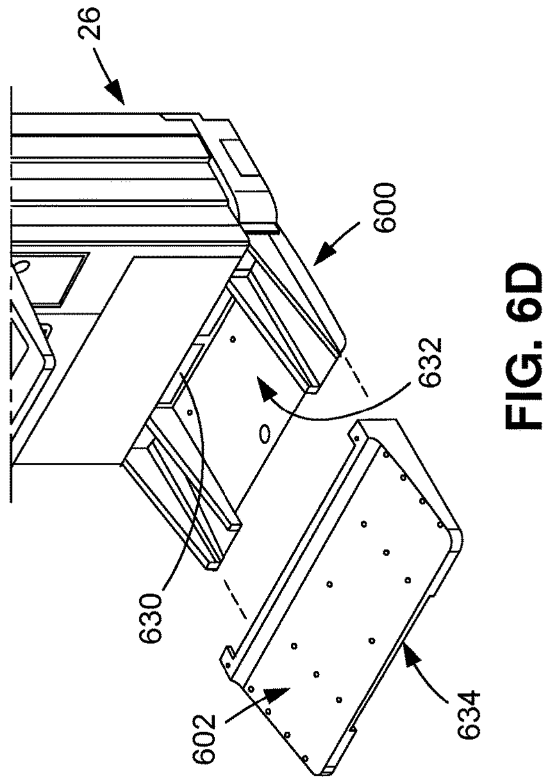

On the other hand, as illustrated in FIGS. 6B and 6E, the conversion bracket 604 may be associated with the footrest 52, such as the base portion 602. In this example, the conversion bracket 604 may be connected to the base portion 602, such as fitting into the passage 632 defined through the footrest 52. The conversion bracket 604 might be connected to the rear of the base portion 602, thus at least partially closing or blocking the openings 630.

In one example, the conversion bracket 604 is configured to accept in a mounting relationship a mount (not shown) of a sled chair. For example, the mount of such a chair may be passed through the front of the footrest 52 and into engagement with the bracket 604 and be securely connected thereto, thus joining the chair to the gaming machine).

The convertible footrest 52 of the disclosure has the advantage that the gaming machine 22, and particularly the housing 26 and footrest 52 thereof, do not need to be custom designed for entirely different applications, or require the housing base of the gaming machine and/or footrest to be completely changed (including by lifting up the gaming machine to change the base). Instead, the footrest 52 of the disclosure can be converted between different configurations, such as via a conversion bracket 604 and the configuration of the housing base 606, thus enabling the footrest 52 to be used in different configurations (such as when used with an attached chair or when used without an attached chair but used with an air handling system).

Intrusion Switch Mount

Figure 11A:
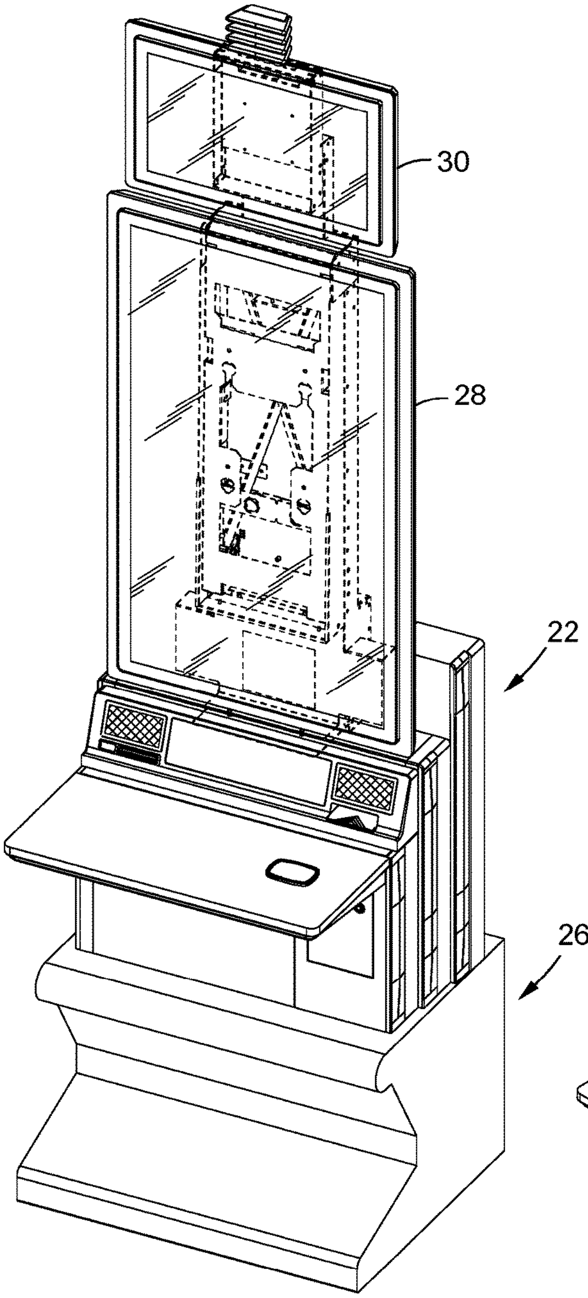
FIGS. 11A-11T, 11U-1 and 11U-2, 11V-1 and 11V-2, 11W-1, 11W-2, 11W-3, and 11X-11Y illustrate examples of pivoting display mounting configurations in accordance with examples of the disclosure.
Figure 11B:
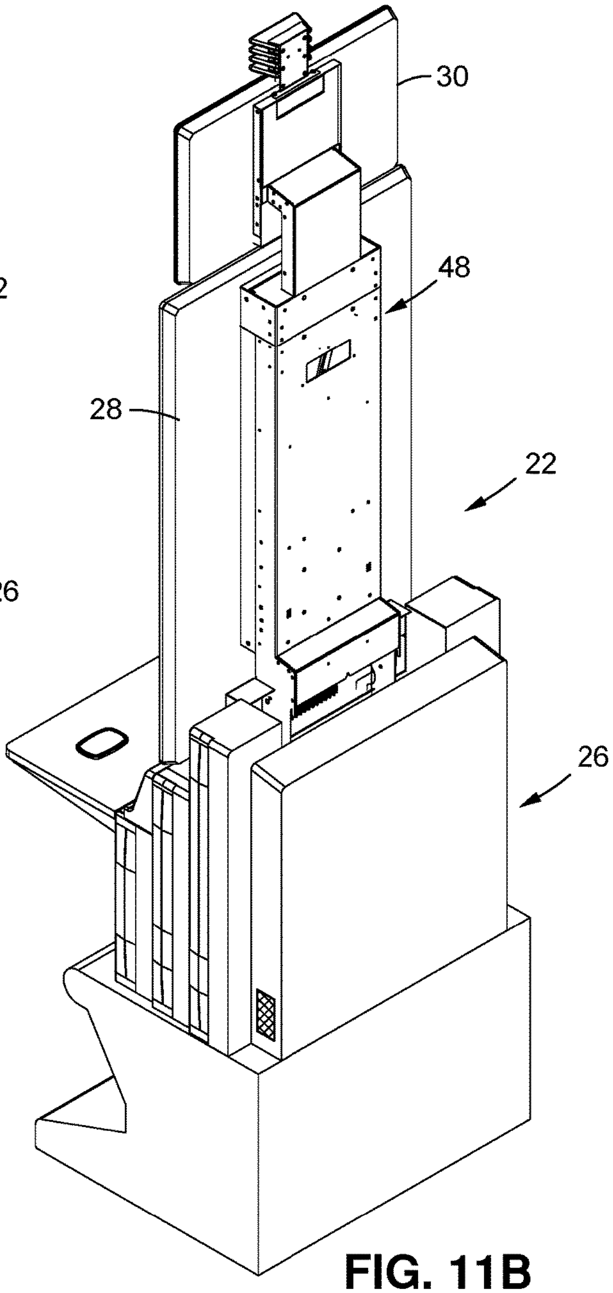
Figure 11C:
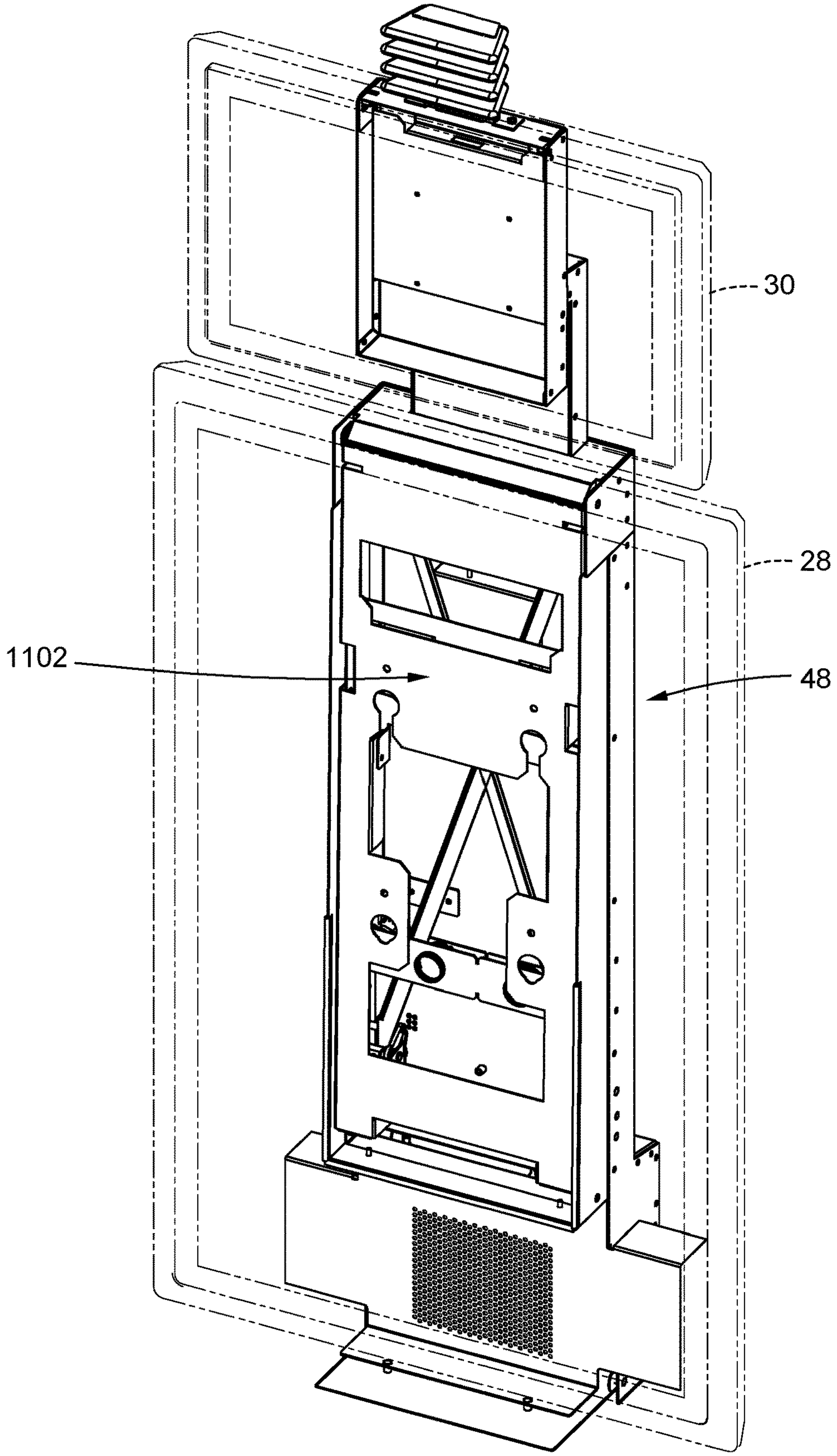
Figure 11D:
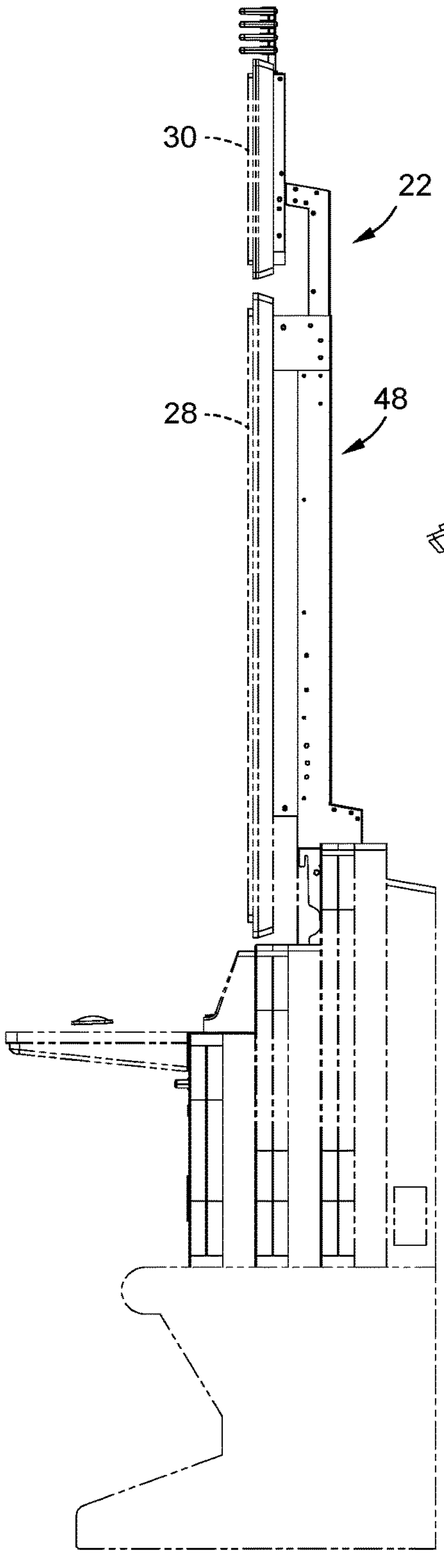
Figure 11E:
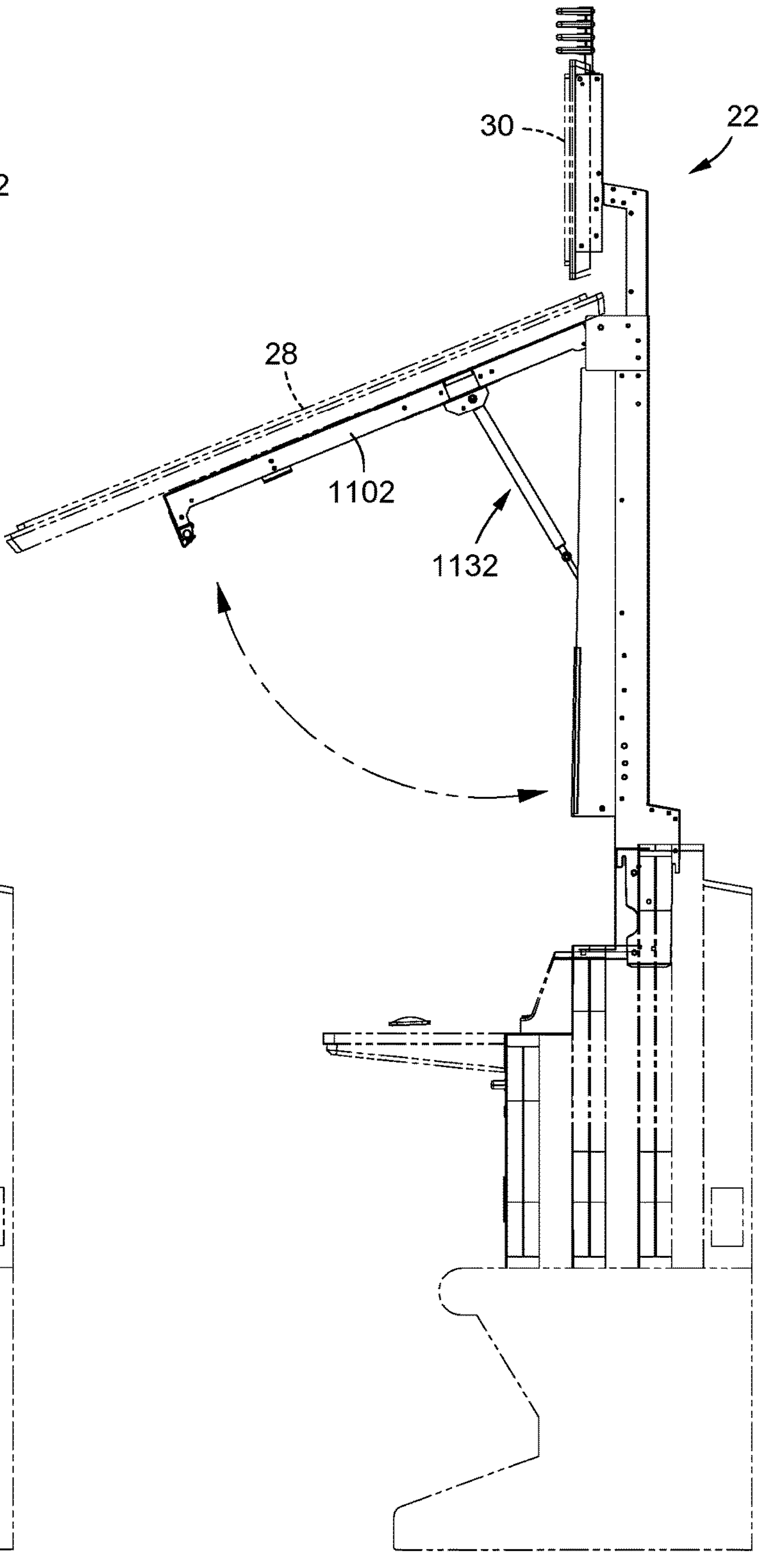
Figure 11F:
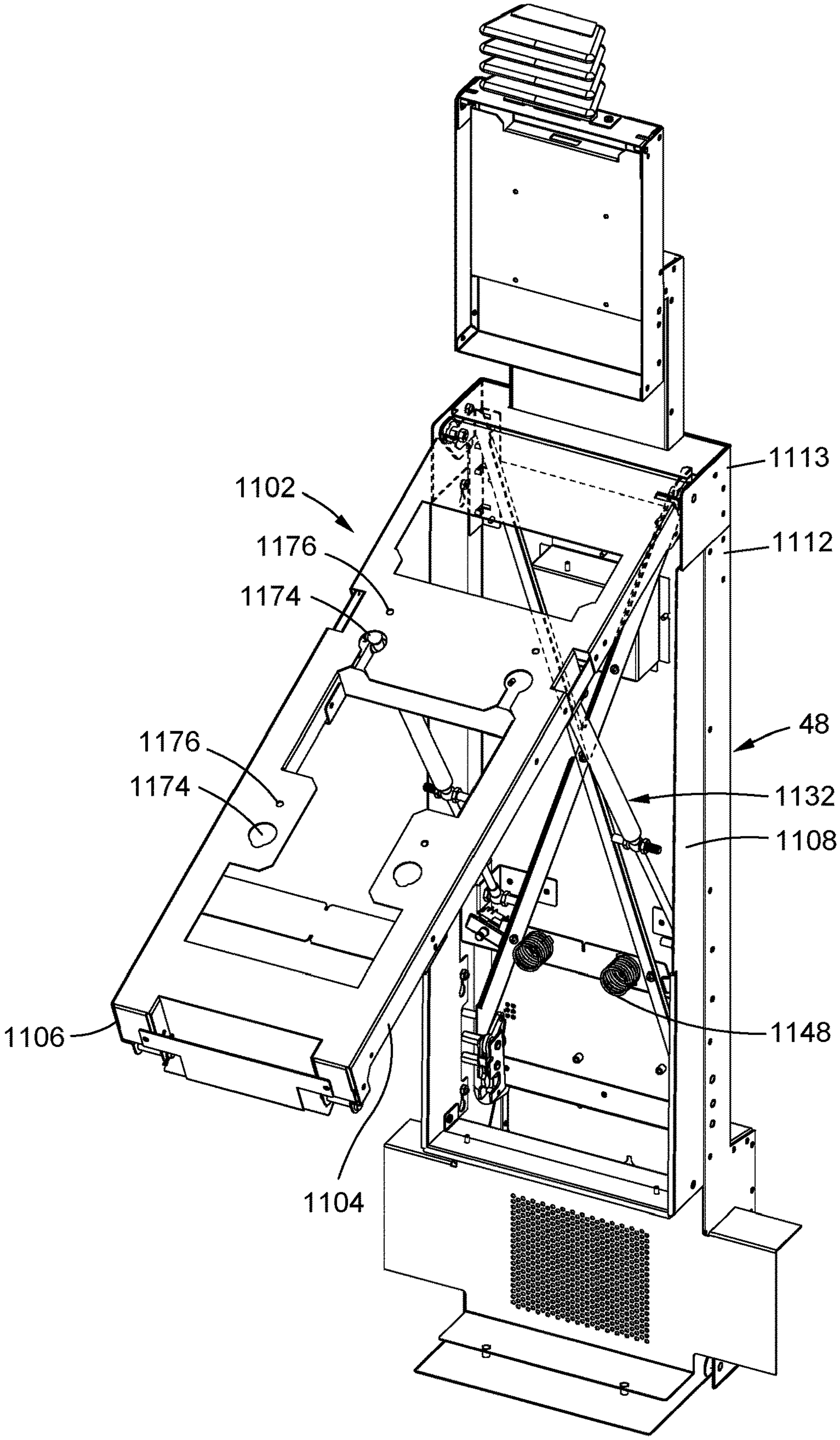
Figure 11G:
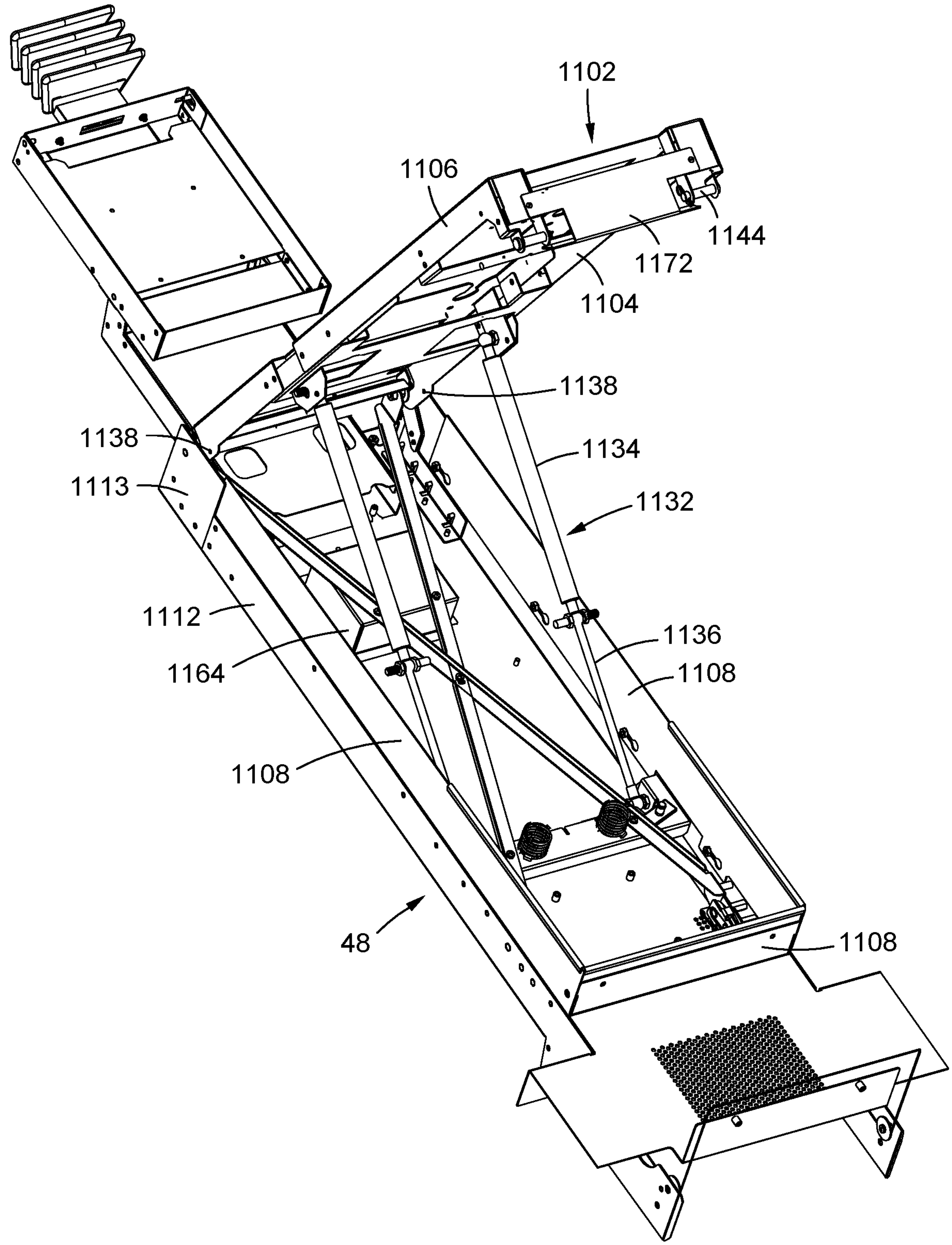
Figure 11H:
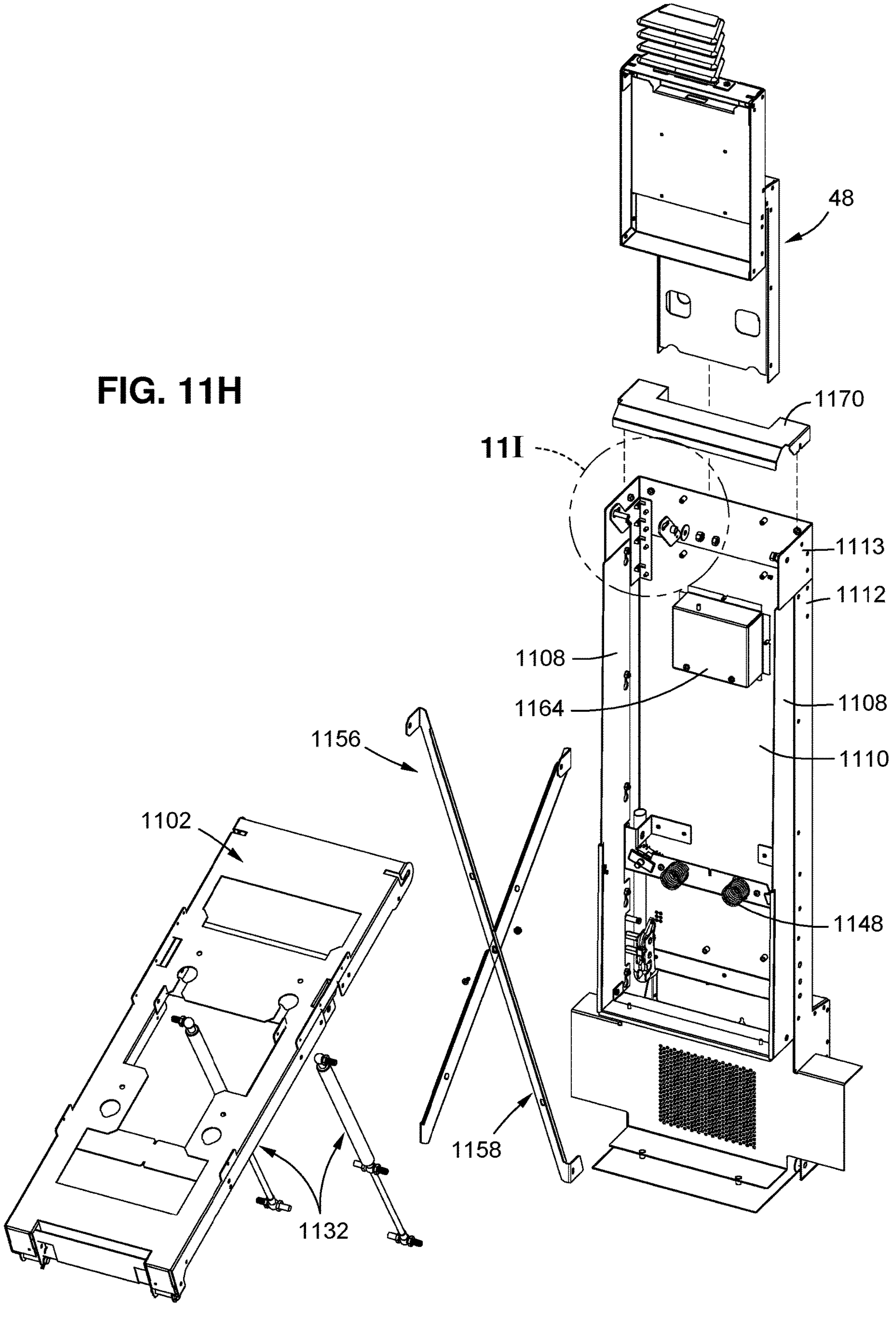
Figure 11I:
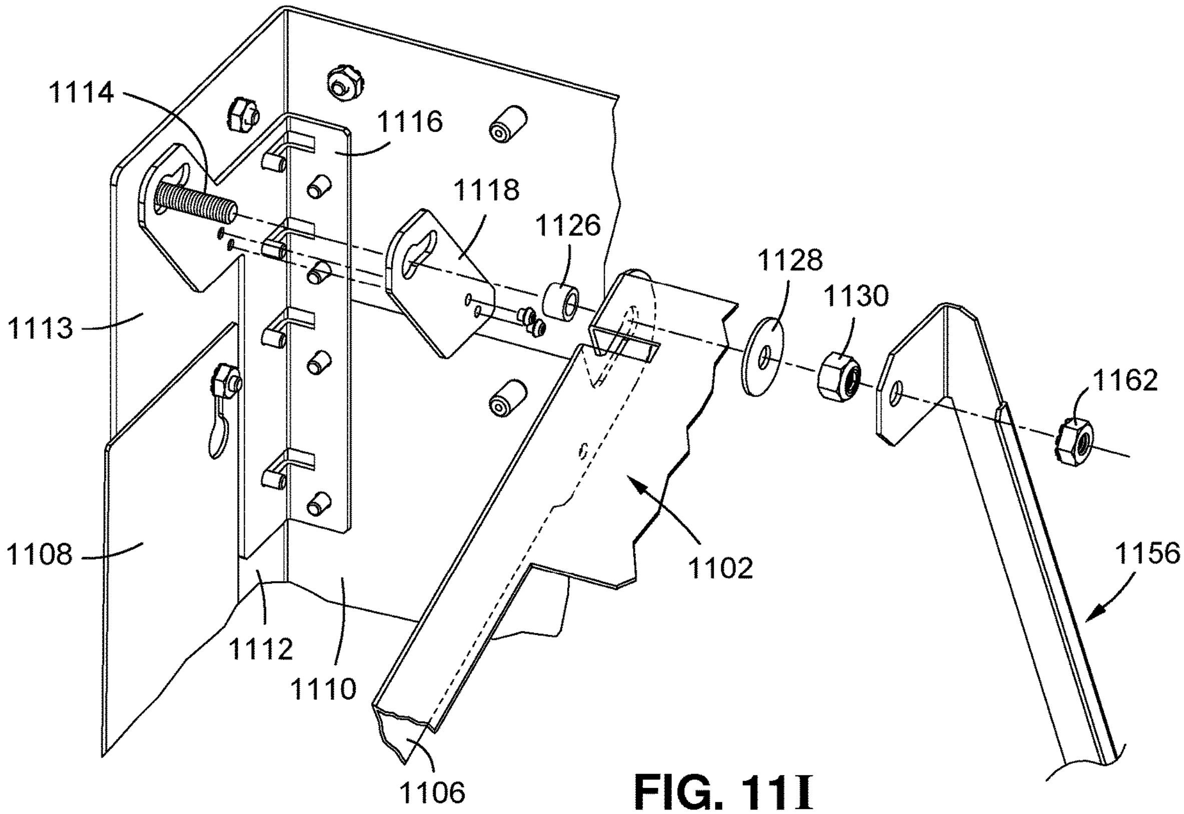
Figure 11J:
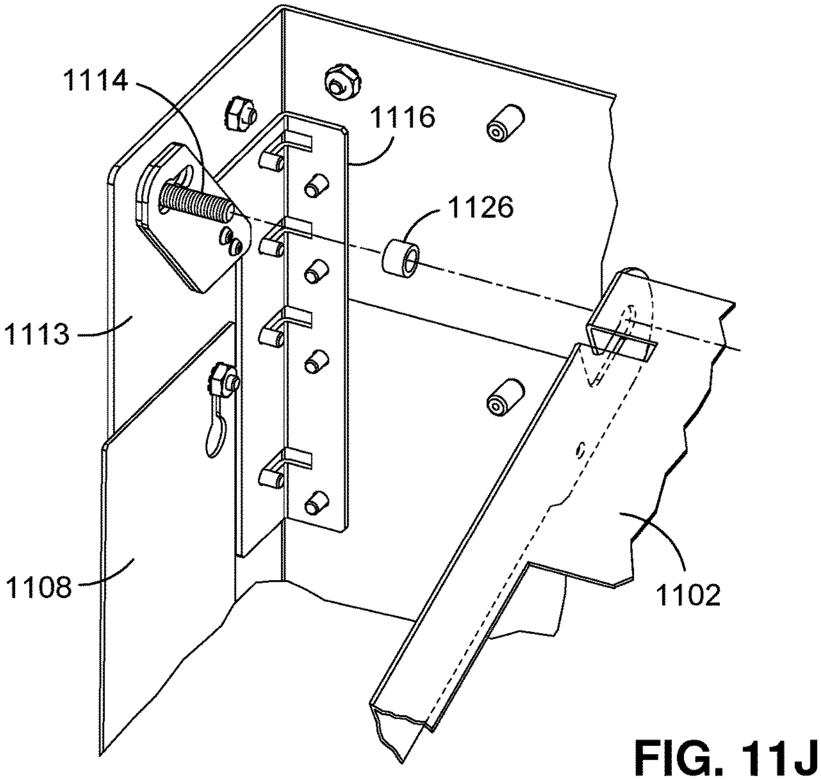
Figure 11K:
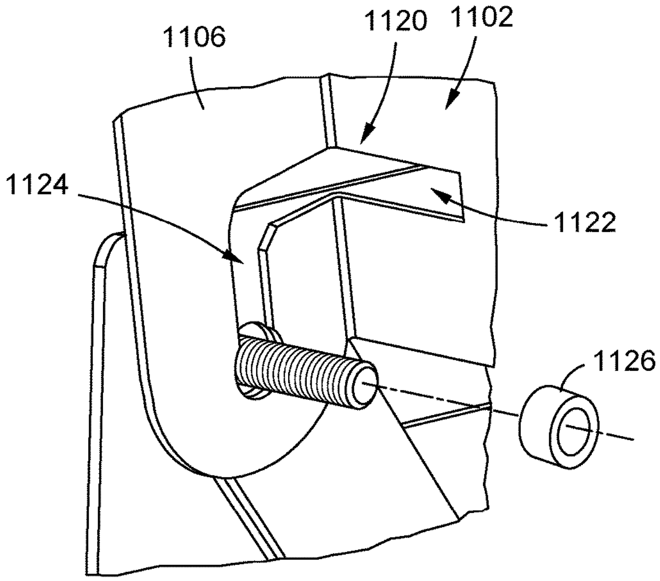
Figure 11L:
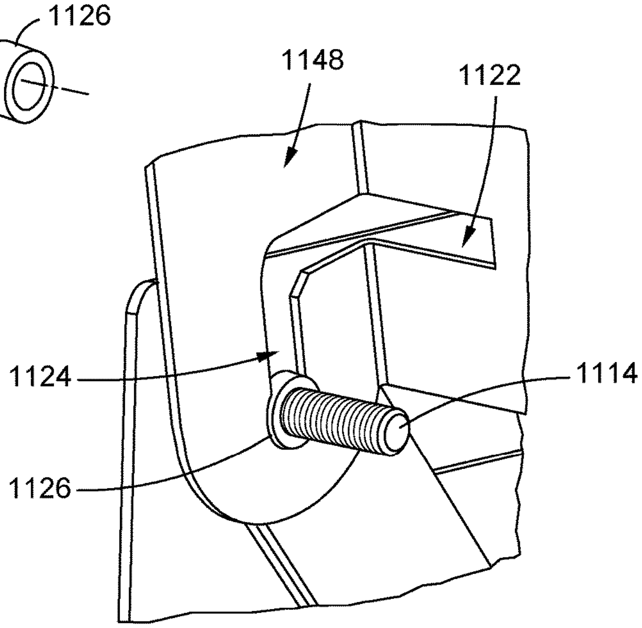
Figure 11M:
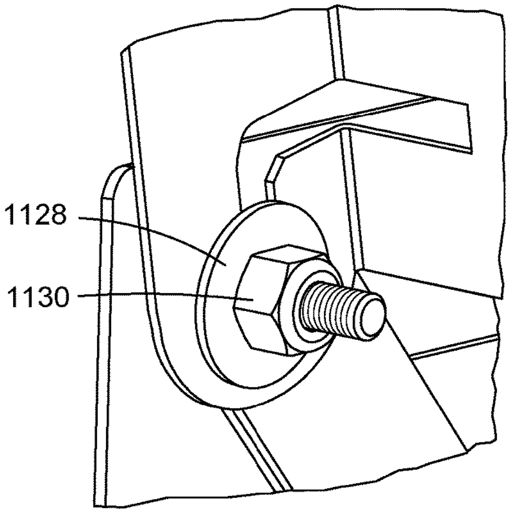
Figure 11N:
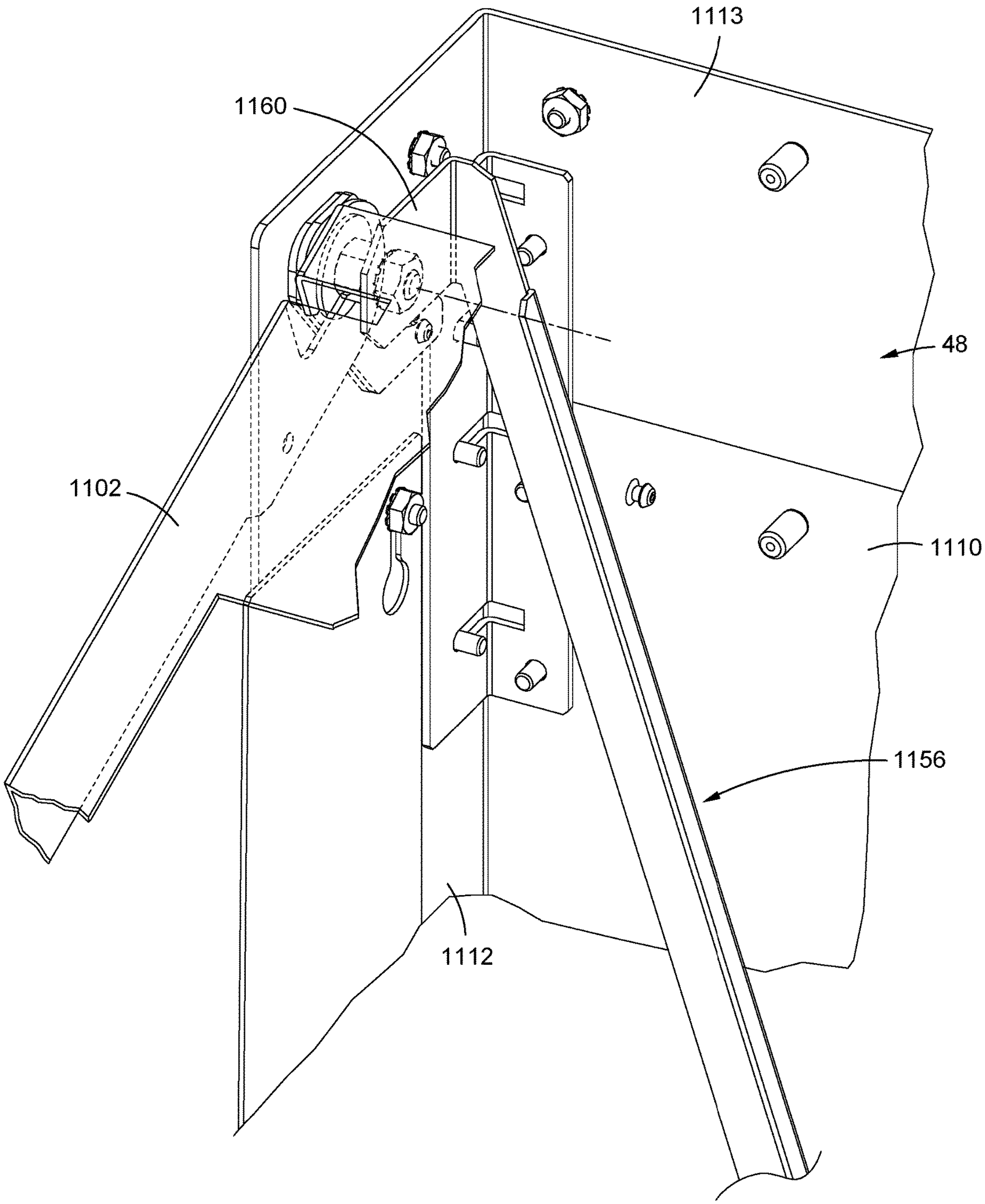
Figure 11O:
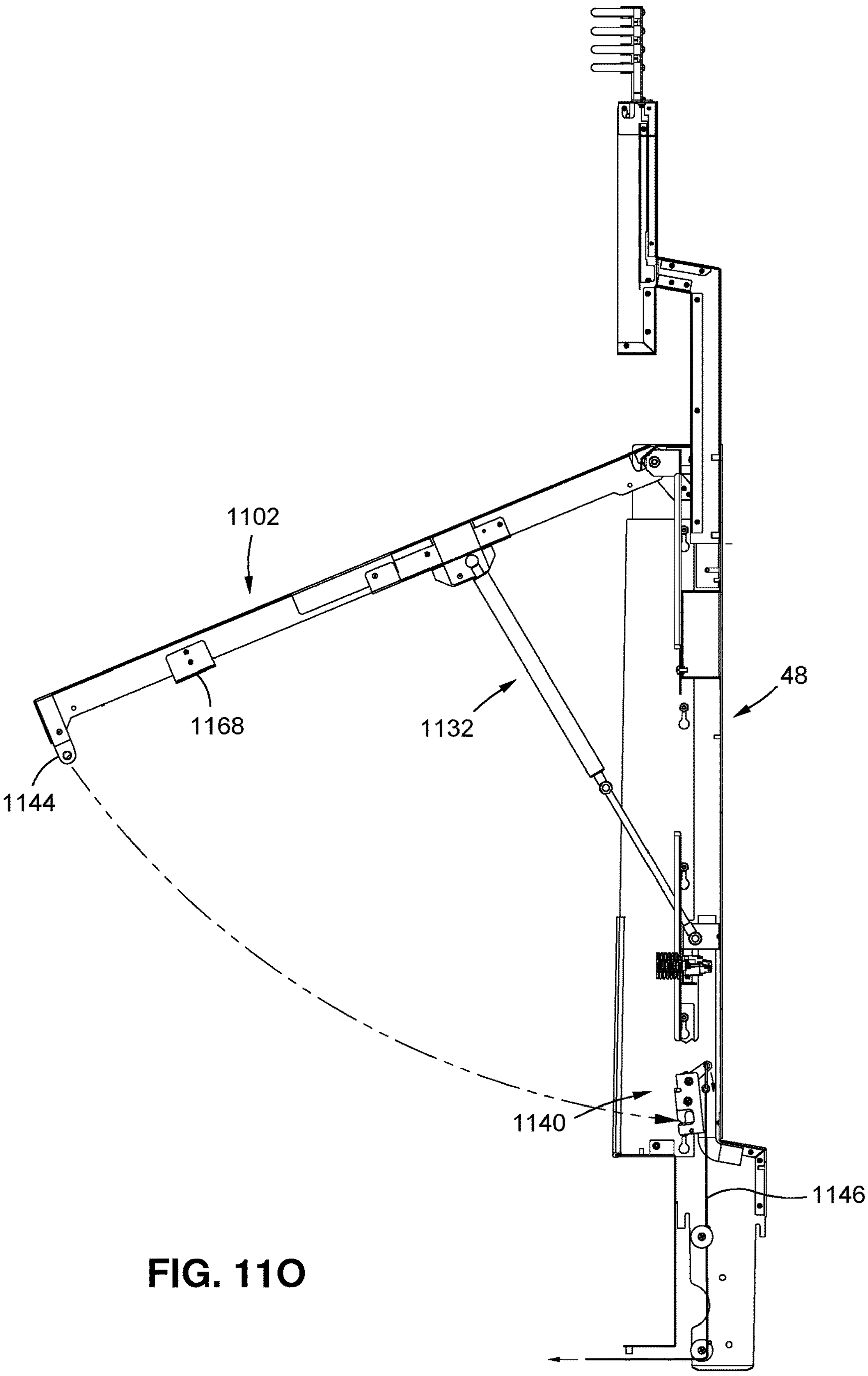
Figure 11P:
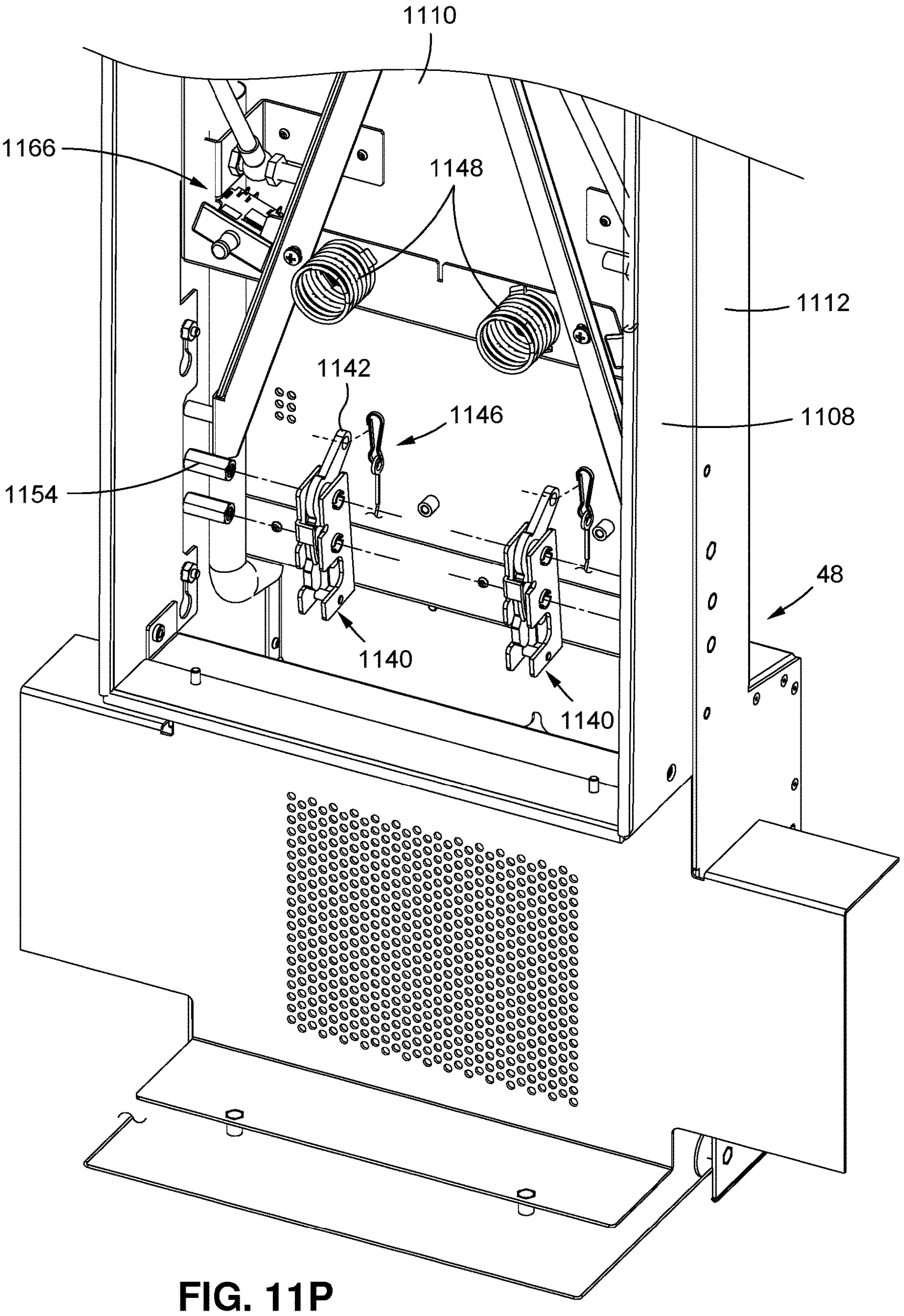
Figure 11Q:
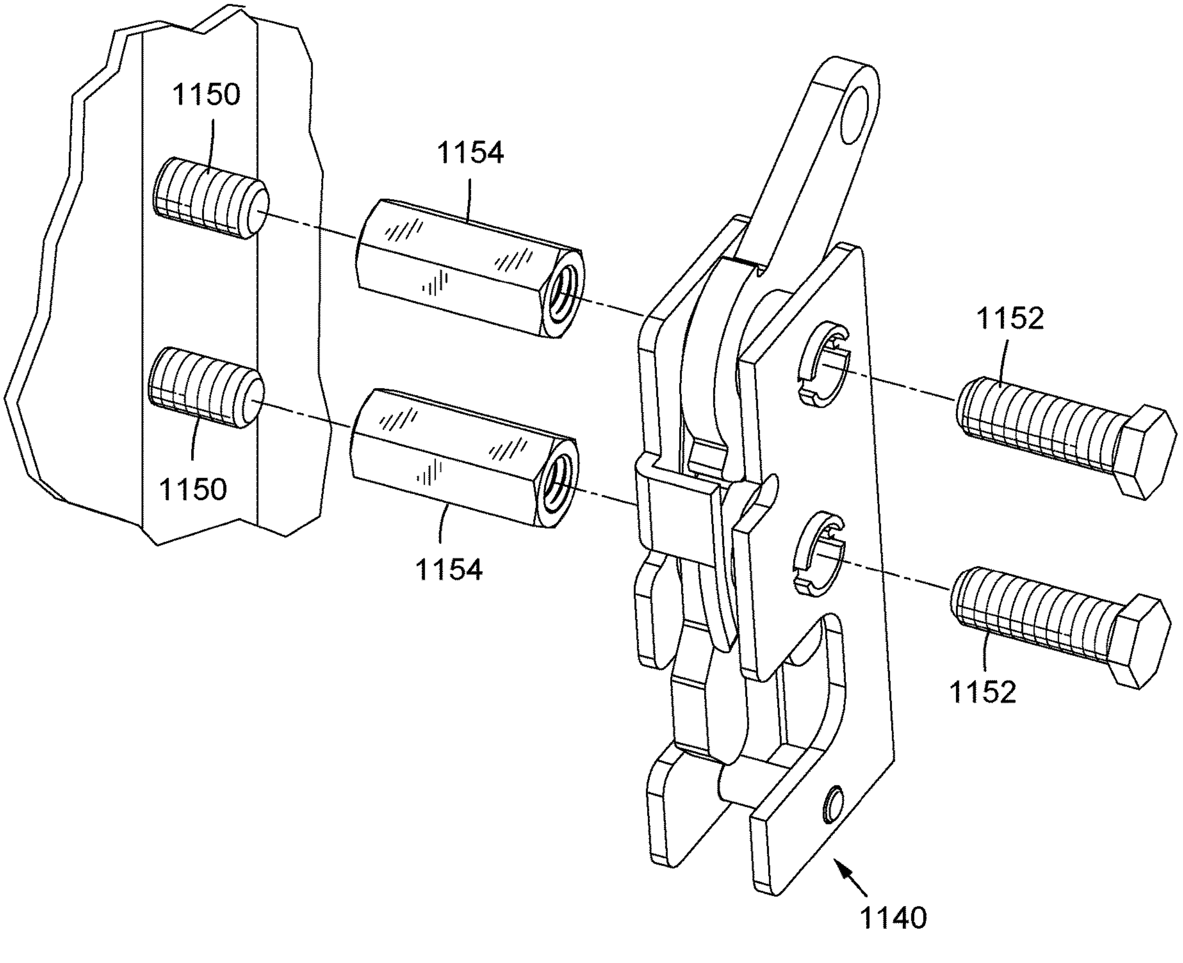
Figure 11R:
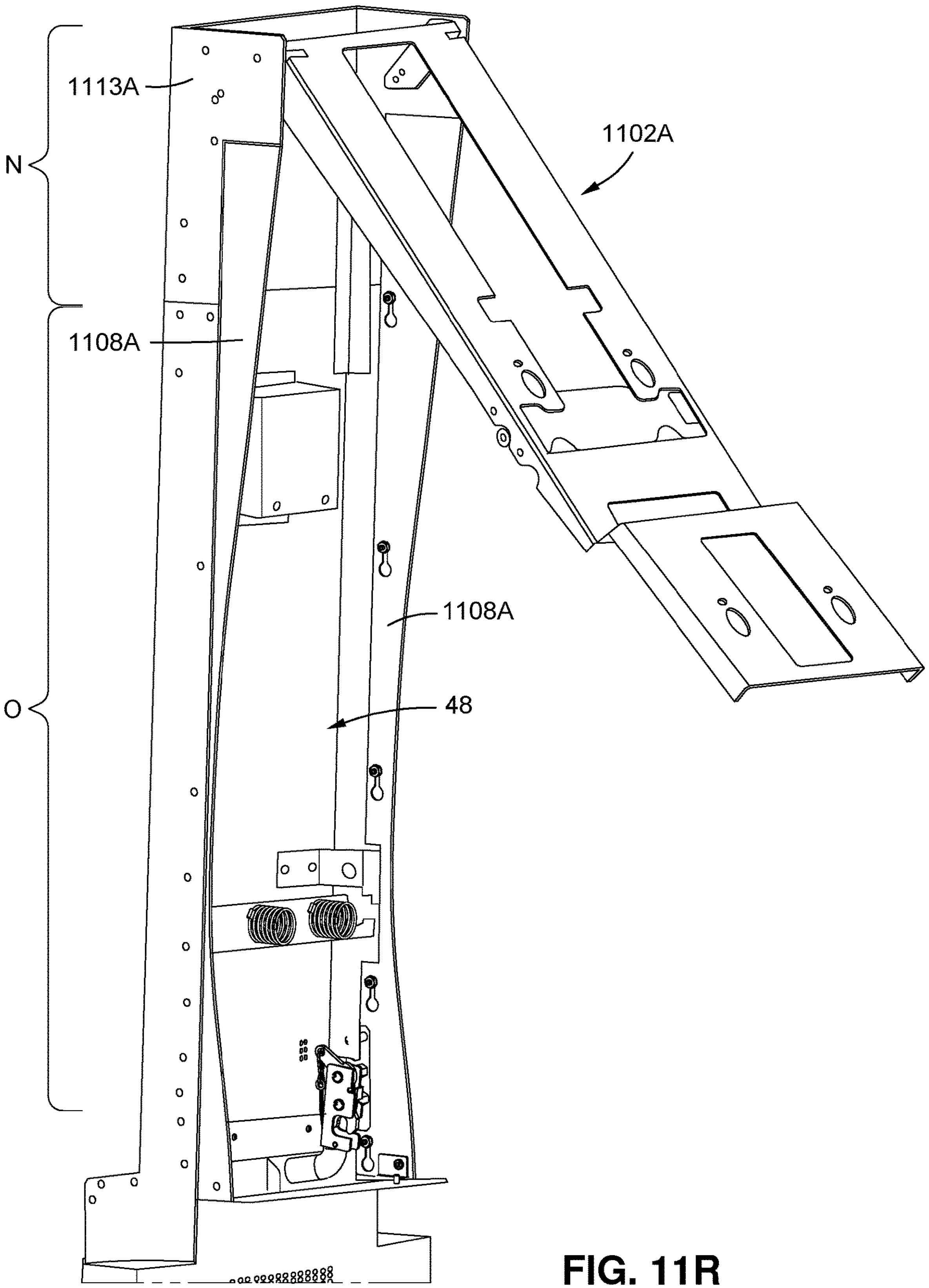
Figure 11S:
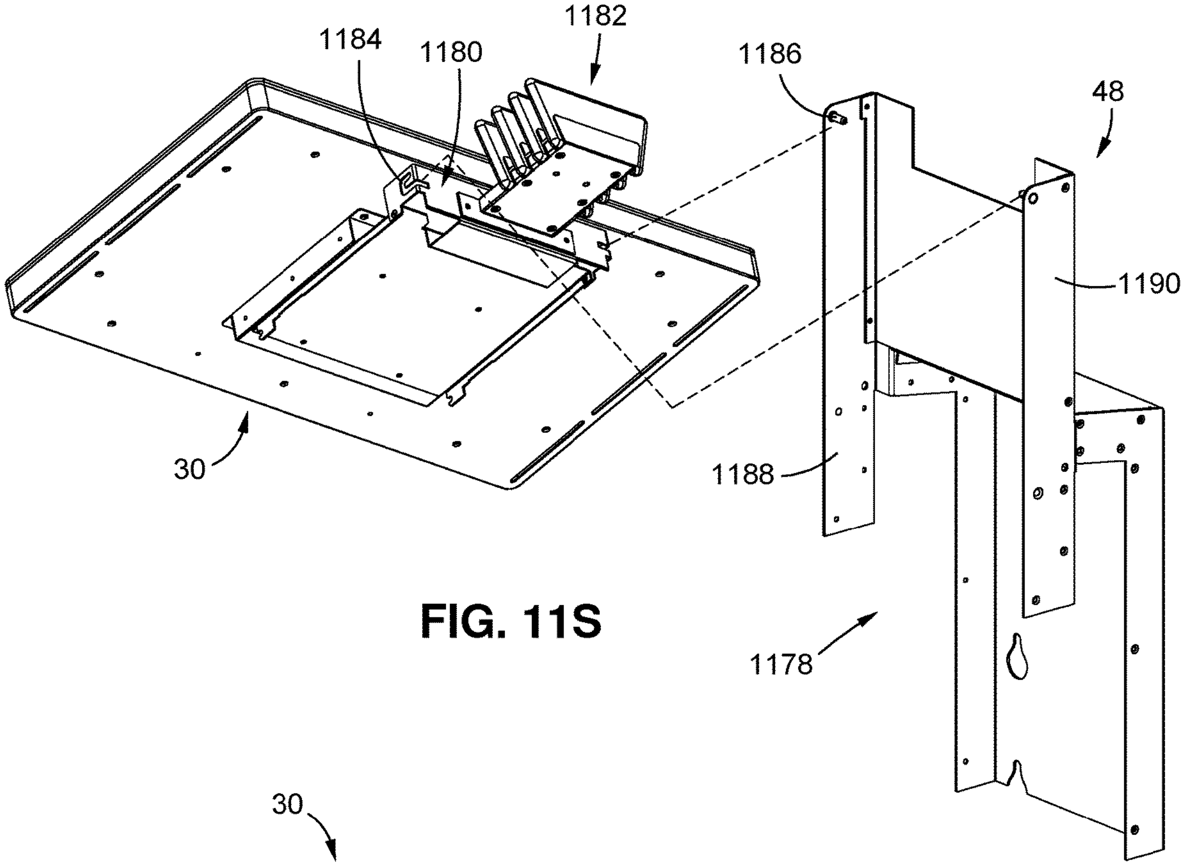
Figure 11T:
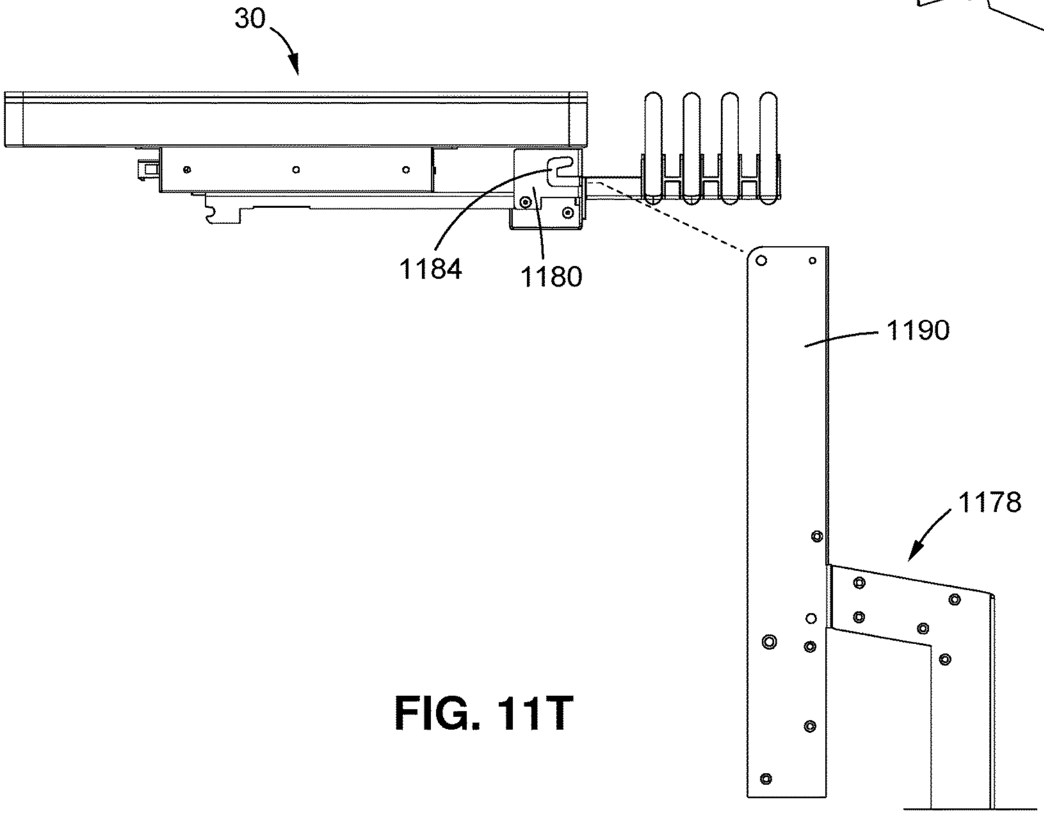
Figures 1, 11U:
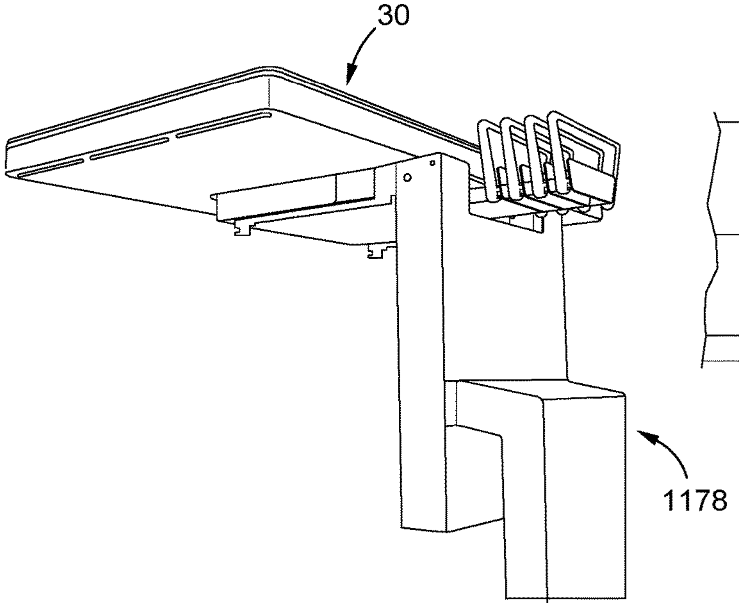

As indicated above, the gaming machine 22 may include one or more openable doors or panels, such as an access panel 46 (see FIG. 1).

Figure 7C:
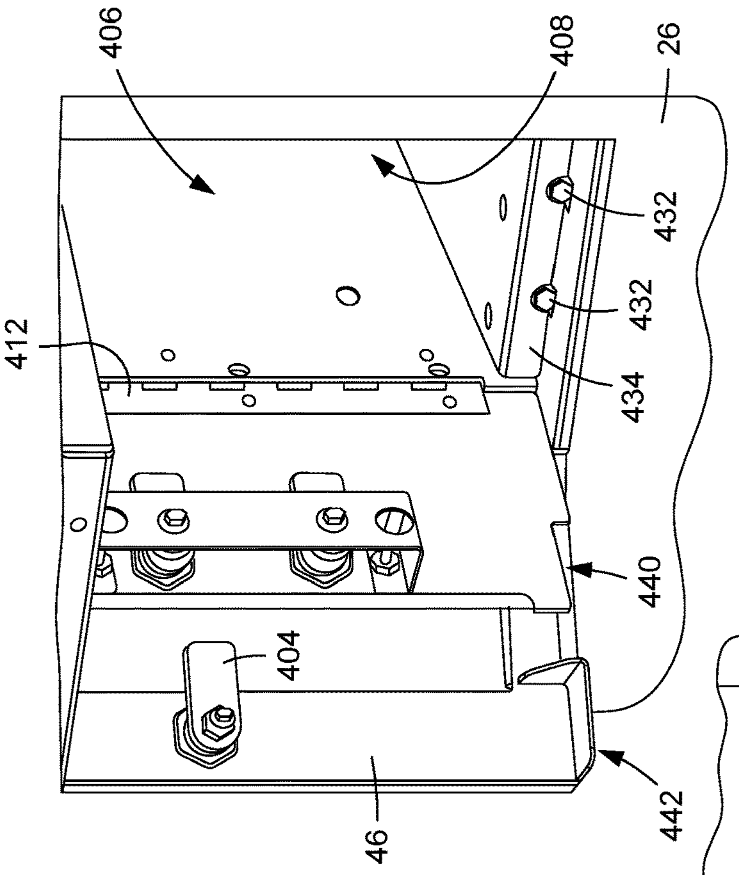
FIGS. 7A-C illustrate an intrusion switch mount for a gaming machine in accordance with the present disclosure.
Figure 7B:
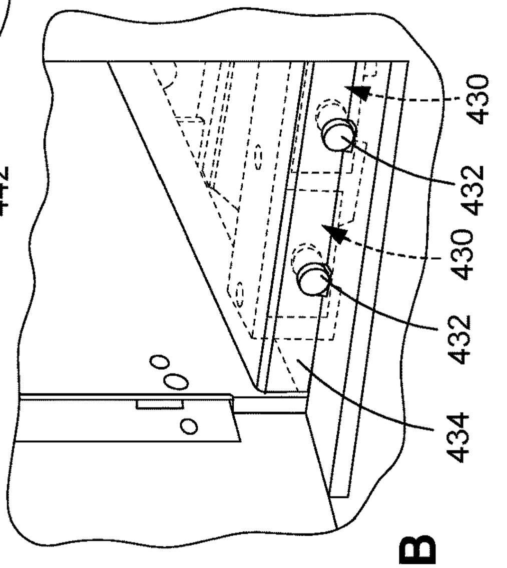
Figure 7A:
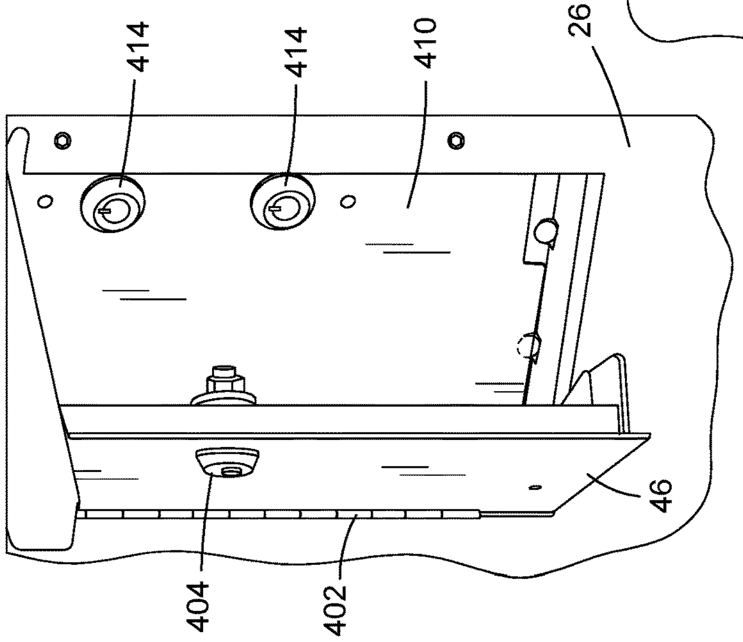

As illustrated in FIGS. 7A-C, in one example, the access panel 46 may selectively provide access to a portion of the interior of the gaming machine cabinet or housing 26, such as to the lower portion 26A thereof at the front of the gaming machine. In one example, the access panel 46 is movably mounted to the cabinet 26, such as via one or more hinges 402. The hinge(s) 402 may connect, for example, one edge of the panel 46 to the housing 26. In the example, the hinge 402 may be oriented so that it rotates about a vertical axis. This may allow the access panel 46 to be moved between an open position as illustrated in FIG. 7A and a closed position, as illustrated in FIG. 1.

A latch or lock 404 may be used to secure the access panel 46 in a closed position. In one example, a lock 404 is used, thus controlling the opening and closing of the access panel 46 to only desired personnel. The lock 404 may be, as illustrated, a mechanical key-operated lock, but might be other types, including electro-mechanical.

In one example, the access panel 46 comprises a main cash box access door. As illustrated in FIGS. 7A and 7B, behind the access panel 46 may reside a cash box 406 having an interior area 408 which is accessible via a cash box door 410. The cash box area 406 may comprise a generally enclosed and access-controlled area, such as defined by a box-like structure which is inside the housing 26 of the gaming machine 22.

In one example, access to the interior 408 of the cash box area 406 is provided by the cash box door 410. This door 410 is movably mounted, such as to the structure of the cash box area 406, such as via one or more hinges 412 (FIG. 7C). In one configuration, the hinge(s) 412 is vertically orientated and is positioned along a side edge of the door 410 that corresponds to the location of the hinged connection of the access panel 46, thereby allowing the access panel 46 and door 410 to be opened in the same direction, as best illustrated in FIG. 7C. In other examples, the access panel 46 and door 410 might open in other manners, including in different directions.

Again, a latch or lock 414 may be used to secure the cash box door 410 in a closed position. In this example, two locks 414 are utilized, both of which are mechanical key-operated locks. However, other numbers and types of locks might be utilized.

In one example, means are provided for detecting movement of the access panel 46 and the cash box door 410, such as when either or both are moved from their closed position to the open position. This means may comprise, but is not limited to, an intrusion switch 430 (see FIG. 7B). The intrusion switch 430 may include a plunger 432 which is movable from a first position (such as an extended position) to a second position (such as a retracted or compressed position), and wherein a change in the position of the plunger 432 may be detected and an output provided, such as to the controller of the gaming machine 22, to another system, or to an associated controller. Such an output might be recorded and used to track access, might be utilized to signal an alarm or the like. In other examples, the intrusion switch might have other configurations, such as where the plunger or other element is movable in other manners.

Advantageously, the access panel 46 and cash box door 410 are configured so that separate intrusion switches 430 can be used relative thereto, with a convenient common mounting of the switches 430. As illustrated in FIG. 7C, two intrusion switches 430 may be mounted at the face of a mount 434. In this example, the mount 434 is a generally vertically extending face and comprises a portion of the cash box area 406, such as at the bottom thereof. However, it might comprise a portion of the housing 26 of the gaming machine 22 or another associated structure.

In this example, the two switches 430 are mounted generally side-by-side in a horizontal plane. A first of the switches 430 is located so that the plunger 432 thereof is engaged by the cash box door 410 when the cash box door 410 is moved, such as to its closed position. For example, as illustrated in FIG. 7C, when the cash box door 410 is closed, a bottom portion thereof may engage the plunger 432 of that first switch 430. A second of the switches is located so that the plunger 432 thereof is engaged by the access panel 46 when the access panel 46 is moved, such as to its closed position. In the example illustrated in FIG. 7C, this is facilitated by the cash box door 410 having a cutout 440 in the bottom portion thereof and by the access panel 46 having a protrusion 442 which extends inwardly therefrom and which is aligned with the cutout 440 in the cash box door 410. Thus, when the cash box door 410 is closed and the access panel 46 is then closed, the protrusion 442 on the access panel 46 passes through the cutout 440 of the cash box door 410 and into engagement with the plunger 432 of the second switch 430.

In this manner, a single mounting is provided for multiple intrusion switches or detectors 430 for operation relative to two different movable doors or panels of the gaming machine 22. This design is space-saving, easier and lower cost to manufacture and service than known configurations.

Display/Panel Release

Figure 8A:
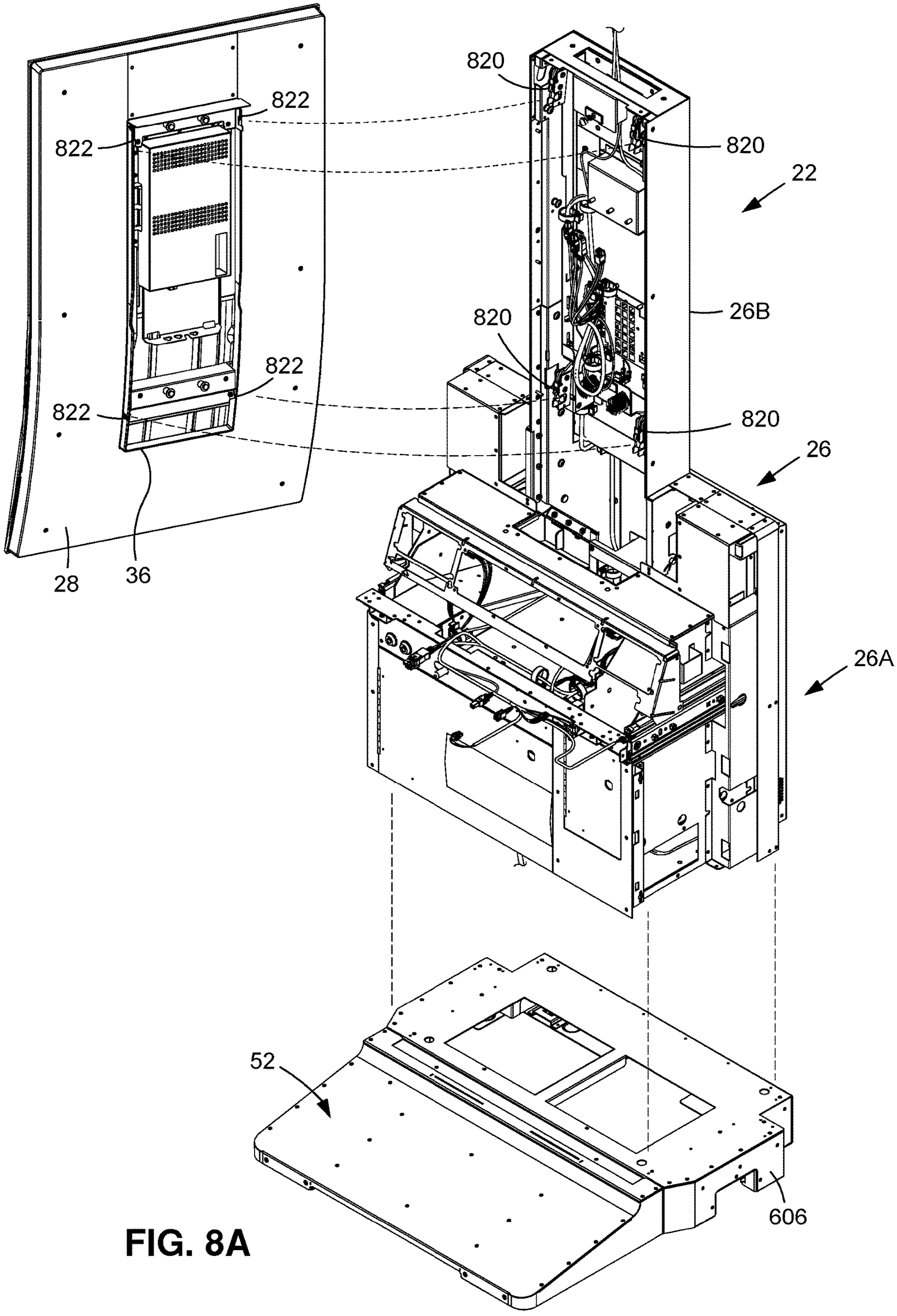
FIGS. 8A-B illustrate a display/panel release for a gaming machine in accordance with an example of the present disclosure.

As is indicated above, the housing 26 may include an upper portion 26B. As illustrated in FIG. 8A, a front of the upper portion 26B may be open, and be selectively accessible via the panel 36 (see also FIG. 1C). In one example, the panel 36 is associated with, such as by being connected to, the main display 28.

In one configuration, the panel 36 is selectively removable from the upper portion 26B of the housing 26. Thus, when the panel 36 is removed, the main display 28 is also disconnected from the housing 26, as illustrated in FIG. 8A.

In one example, the panel 36 (and thus the main display 28) is selectively connectable to the housing 26 via one or more latches 820. In one example, the panel 36 comprises one or more catches 822, such as extending rearwardly therefrom, each for engagement with one of the latches 820.

In the illustrated configuration, the panel 36 has four catches 822 associated therewith, such as two top catches and two bottom catches. The top catches 822 might be positioned along a horizontal line, the bottom catches 822 might be positioned along another horizontal line, and the left and right pairs of the catches (each comprising one of the top and one of the bottom catches) may be aligned along vertical lines. The latches 820 may correspondingly be positioned relative to the housing 26, wherein four latches 820 are provided corresponding to the four catches 822.

In one example, each latch 820 is movable between a latched and an unlatched position. In the latched position, the latch 820 retains the associated catch 822, preventing it from being moved outwardly therefrom. In the unlatched position, the latch 820 allows the corresponding catch 822 to be removed therefrom. In one configuration, the latch 820 may be moved from the unlatched to the latched position by engagement with a catch 822, such as by a force being applied to the latch 820 by the catch 822 in the latched direction (in the example illustrated in FIG. 8A, a direction in which the panel 36 is moved towards the housing 26).

Figure 8B:
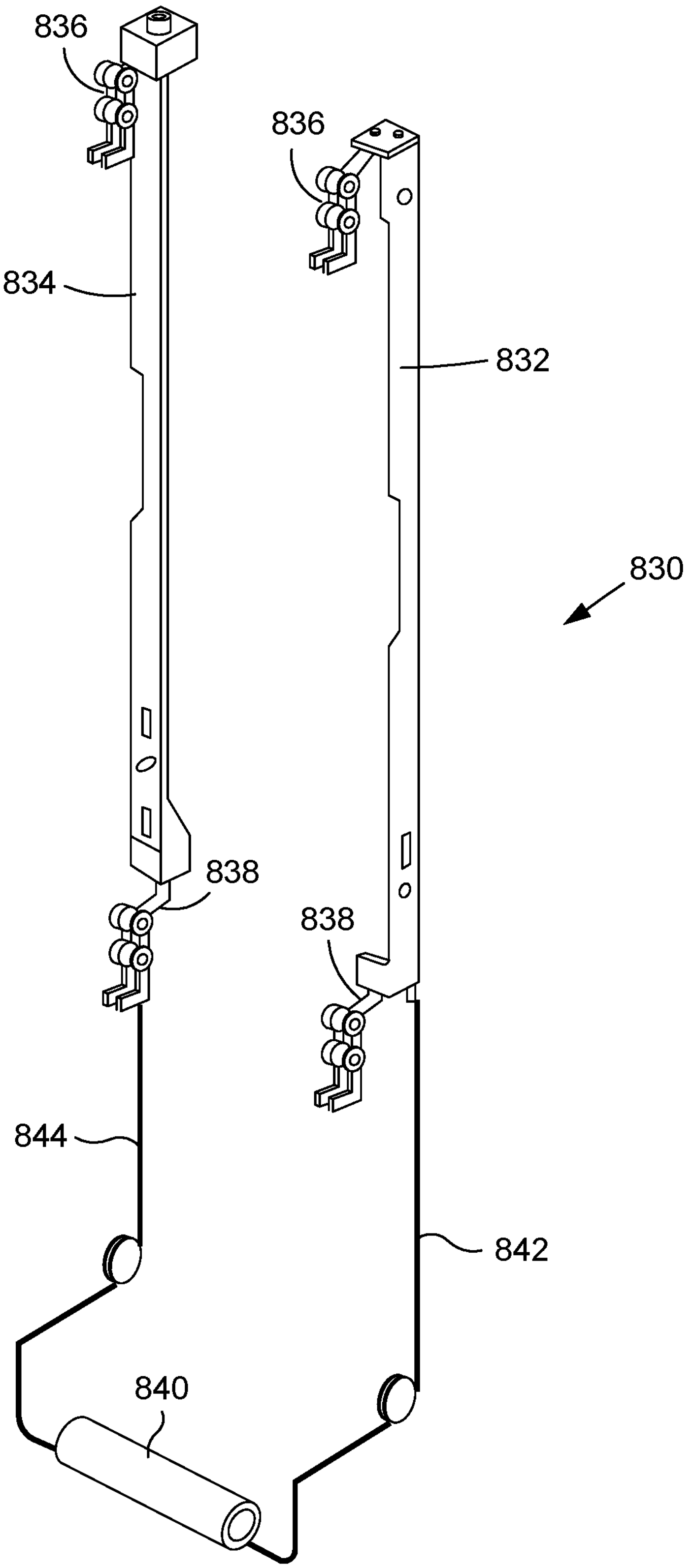

In one example, the latch 820 can be released from its latched position to its unlatched position. A release mechanism 830 is provided for releasing the latch 820. In one example, the release mechanism 830 is configured so that when a user actuates it, the release mechanism 830. As illustrated in FIG. 8B, the release mechanism 830 may comprise a first release bar 832 and a second release bar 834. The first and second release bars 832,834 may each include a top latch pull 836 and a bottom latch pull 838. The top latch pull 836 and bottom latch pull 838 are configured to engage the top and bottom latches 820 at one side of the housing 26, thus releasing them.

As indicated, in one example, a user can use the release mechanism 820 to release all of the latches 820, preferably at the same time. As illustrated, the release mechanism 820 may include a handle or grip 840. The handle 840 is associated with a first release cable or connector 842 and a second release cable or connector 844. In one example, the first release cable 842 operably connects the handle 840 to the first release bar 832 and the second release cable 844 operably connects the handle 840 to the second release bar 834. In one example, these cables 842,844 may be connected to lower or bottom ends of the release bars 832,834.

The handle 840 is preferably located in an area accessible to a user when the panel 36 is closed. As illustrated, the handle 840 may be located in the lower portion 26A of the housing 26. For example, a user may access the interior of the housing 26 by opening one or more panels or doors thereof, such as using appropriate keys. If the user needs to release the main display 28 or otherwise gain access to the interior of the top or upper portion 26B of the housing 26, the user may engage the handle 840. In one example, when a user pulls downwardly on the handle 840 it, in turn, pulls the first and second release cables 842,844. These cables 842,844, in turn, pull the first and second release bars 832,834 downwardly, causing them to actuate the latch pulls 836,838, thus unlatching the latches 820. Most importantly, the movement of the handle 840 effectuates unlatching of all of the latches 820 at the same time. This releases the panel 36, such as illustrated in FIG. 8A.

According to this aspect of the disclosure, a panel or similar portion of the gaming machine 22 is removably connected, most preferably by a plurality of releasable latches or similar connectors. The use of multiple latches in different locations ensures a secure connection of the panel. However, unlatching of the panel or other portion can be accomplished by a single release mechanism which effectuates unlocking or unlatching all of the latches at the same time.

Configurable Display Support

One aspect of the disclosure is a display support configuration. As indicated above, the gaming machine 22 might be configured with displays of different types, including displays of different shapes and sizes. For example, as illustrated in FIG. 1A, the gaming machine 22 might be configured with a main display 28 which is configurated as a flat panel display, or as illustrated in FIG. 1D, might be configured with a main display 28*a* which comprises a curved panel display.

In order to facilitate the use of different displays, such as different main displays, including to facilitate the mounting of those displays to the housing 26 of the gaming machine 22 and the proper positioning thereof, the gaming machine 22 may facilitate different display supports.

Figure 9A:
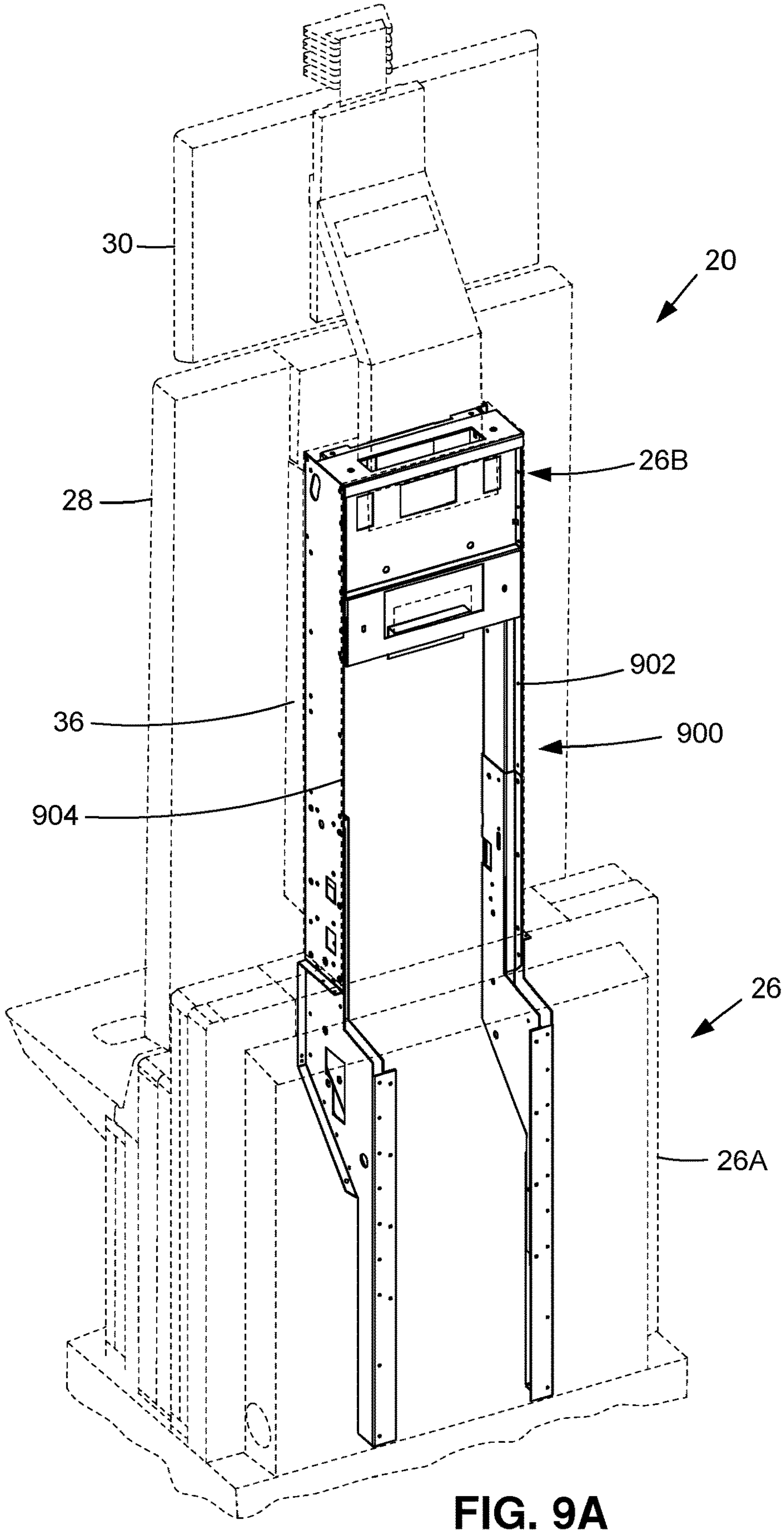
FIGS. 9A-D illustrate a configurable display mount for a gaming machine in accordance with an example of the disclosure.

As illustrated in FIG. 9A, a display support 900 may comprise a first leg 902 and a second leg 904. In general, the first and second legs 902,904 may be connected to the lower portion 26A of the housing 26 and extend upwardly therefrom, to the top portion 26B of the housing 26. The first and second legs 902, 904 may support one or more connectors, such as the above-described latches 820 (see FIG. 8A) for connecting the main display 28 (and associated panel 36) thereto.

Figure 9B:
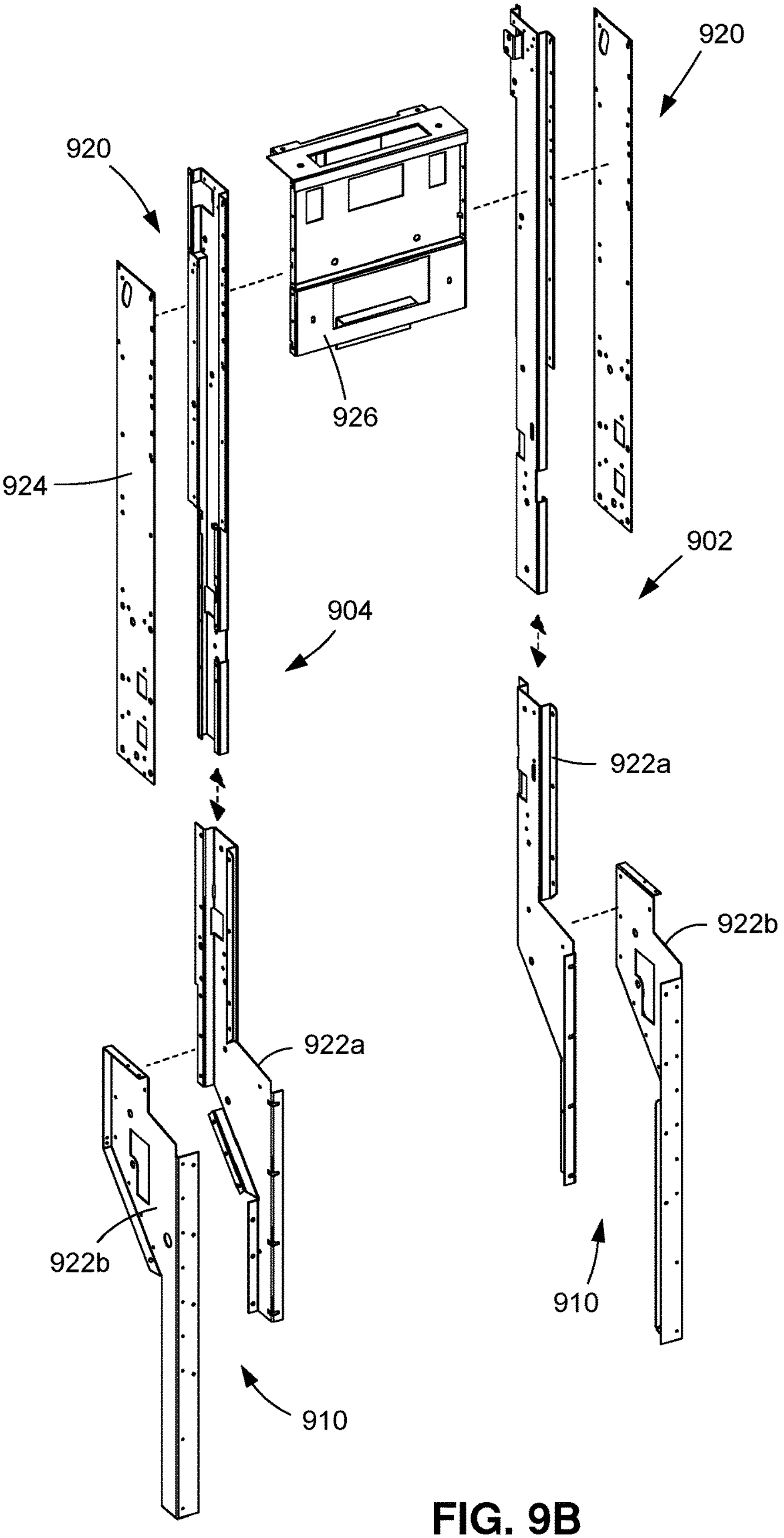
Figure 9C:
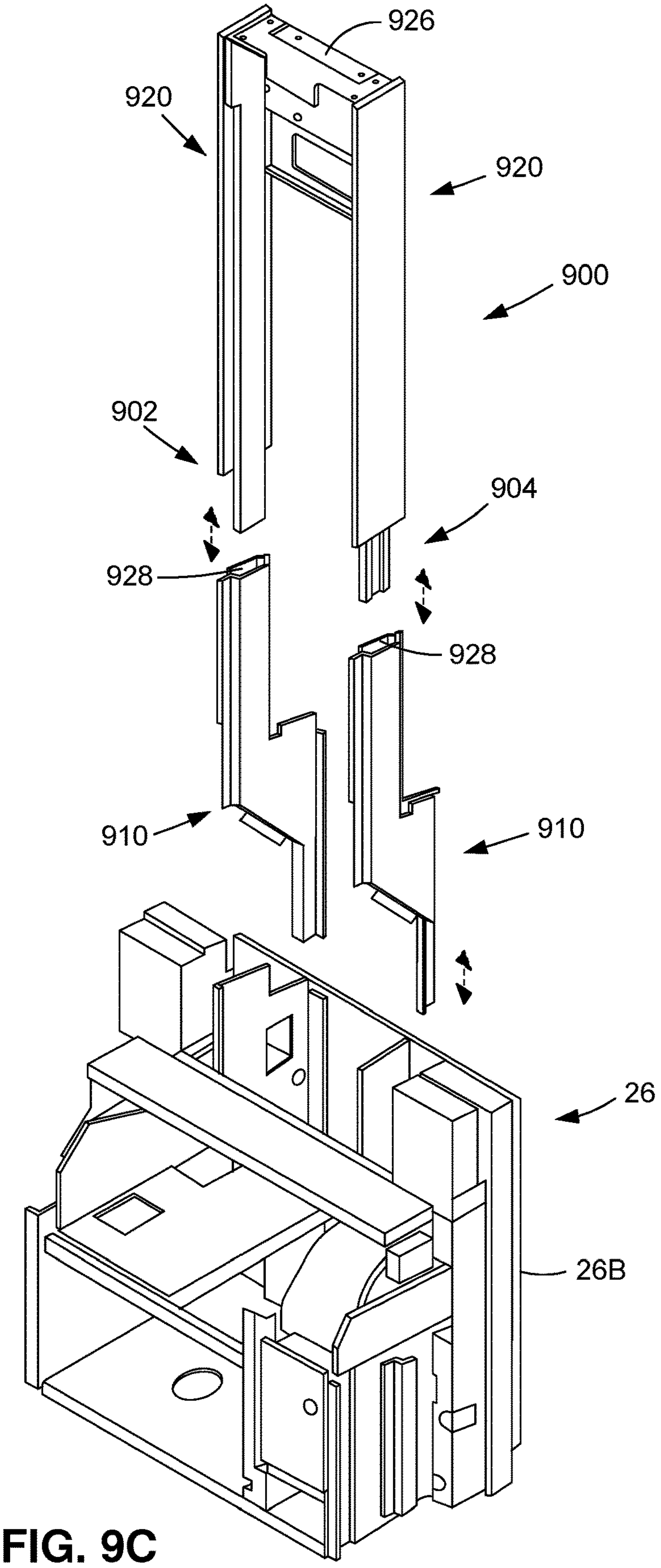

Referring to FIG. 9B, each leg 900, 902 may comprise a mount portion 910 and an extension portion 912. The mount portion 910 may be configured to be connected to the lower portion 26A of the housing 26. The mount portion 910 might engage the lower portion 26A of the housing 26 in a slot configuration and/or by one or more fasteners. As illustrated, the mount portion 910 may be constructed from first and second members, such as inner and outer members 922*a,b* which may be connected to one another, but they may have other configurations. As illustrated in FIG. 9C, the inner and outer members 922*a,b* may cooperate to define a slot 928, opening or the like, such as for accepting a portion of a corresponding extension portion 912 therein.

The extension portions 912 may be connected to the mount portions 910, such as by one or more fasteners or the like (and may thus also be disconnectable therefrom). The extension portions 912 may extend upwardly from the mount portions 910. Various mounting plates 924 or other elements may be connected thereto. In one example, a central strut 926 may be positioned between the extension portions 912 of the two legs 902,904.

As illustrated in FIG. 9C, the mount portions 910 of the legs 902,904 may be connected to the lower portion 26A of the housing 26. The extension portions 920 may be connected to the mount portion 910 and extend upwardly therefrom, thus defining a support and mounting location for the main display 28 (and the second display 30).

Figure 9D:
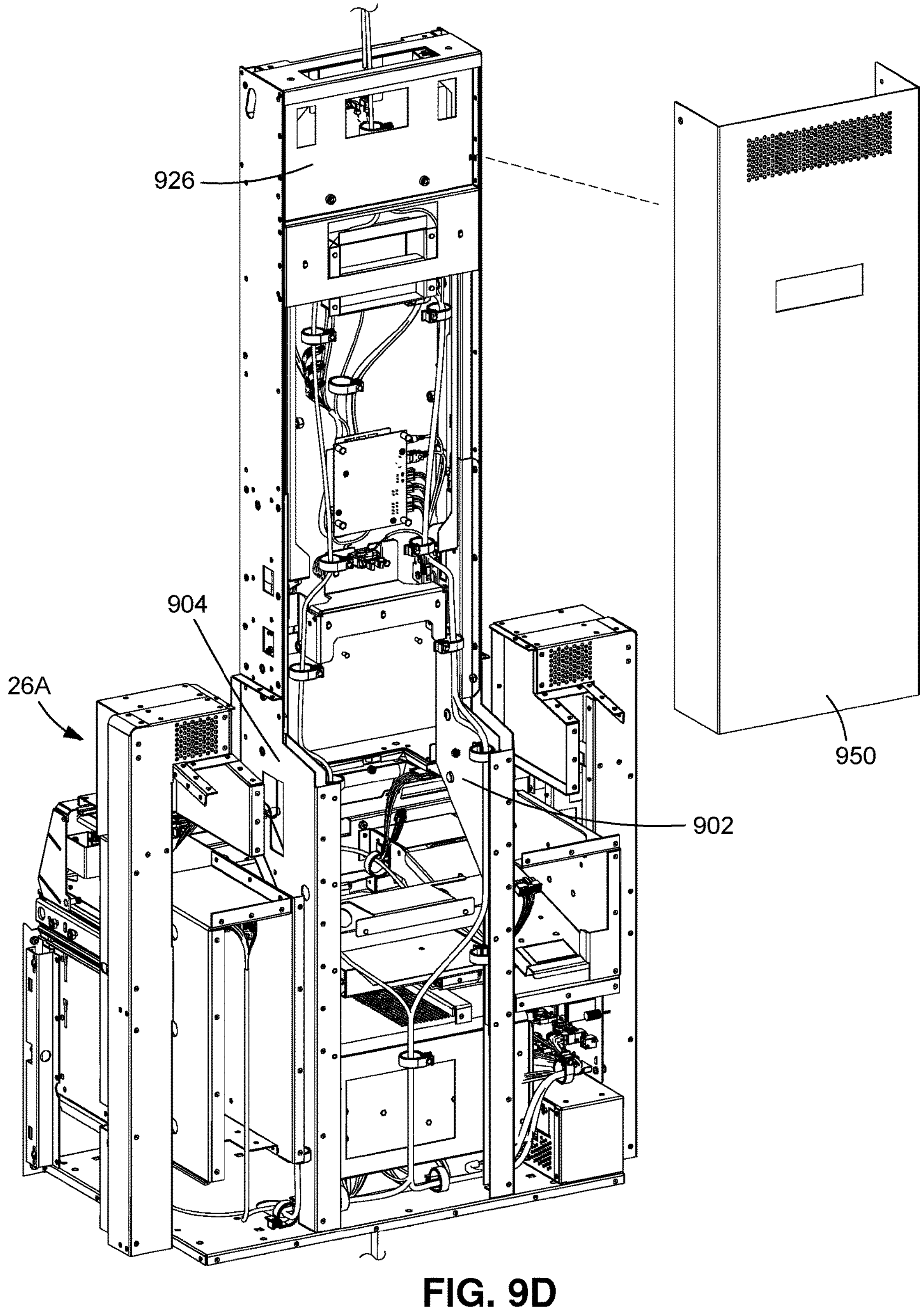

As illustrated in FIG. 9D, a panel 950 may be located over the legs 902,904 at the rear of the housing 26 to enclose them. As illustrated in FIG. 9A, the main display 28 may be connected to the front of the legs 902,904, along with the panel 36. As further illustrated in FIG. 9A, the second display 30 may also be connected to and supported by the legs 902,904 (one mounting configuration therefor is described in more detail below).

As described, the display support 900 may comprise two legs 902,904 which are spaced from one another. In other configurations, as few as one and more than two legs might be utilized.

Most importantly, because the gaming machine 22 may be configured with different display mounts 900, the gaming machine 22 may accommodate displays of different shapes and sizes. In particular, the mount portion 910 and/or extension portion 920 of each leg 902,904 may vary in shape in order to facilitate such different displays. For example, as illustrated, the mount portions 910 may have an offset between a bottom and a top thereof, which offset defines the mounting location of the extension portions 920 relative to the lower portion 26A of the gaming machine 22. The amount of this offset might vary, for example, to change the location of the display which is mounted thereto (in a front to back direction relative to the housing 26). Further, the length of the extension portions 920 (or other shapes) might vary, such as depending upon the desired height of the upper portion 26B of the housing 26). The disconnectability of the display mount 900 allows the gaming machine 22 to be manufactured with different mounts for different applications, and may also permit a gaming machine 22 having one configuration to be changed or modified (such as a later time) to a different configuration.

Secondary Display Mount

Figure 10A:
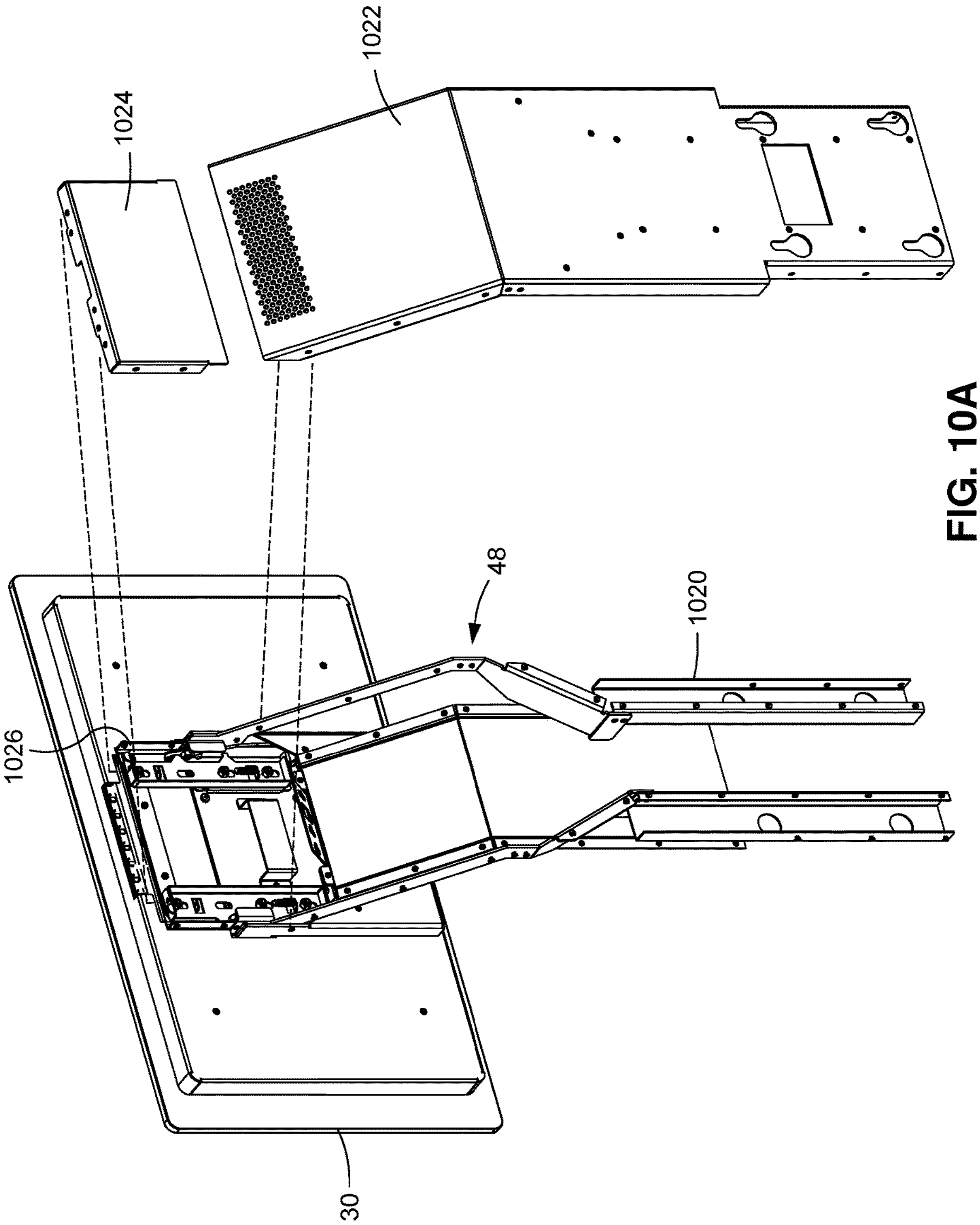
FIGS. 10A-C illustrate a display support for a gaming machine in accordance with an example of the disclosure.

One aspect of the disclosure is a removable mounting for a display, such as a display of the gaming machine 22. The display may comprise the second or top display 30 of the gaming machine 22. As indicated above and illustrated in FIG. 1B, the top display 30 may be supported by and connected to the gaming machine 22 by the display support 48. Referring to FIG. 10A, the display support 48 may comprise a frame 1020 and one or more panels or covers 1022,1024. The frame 1020 may have various configurations, such as one or more legs or the like, and connect to and extend from the housing 26 of the gaming machine 22. In one example, the display support 48 is connected to, and extend upwardly from, the display support 900 (described above and illustrated in more detail in FIGS. 9A-D).

The display, such as the top display 30, is supported by the display support 48. In one example, a bracket 1026 is connected to the display 30, such as at the rear thereof. The display 30 is removably connected to the frame 1020. The one or more panels 1022,1024 may be utilized to generally enclose the frame and/or other components thereof.

As indicated, the display 30 may be removably connected to the display support 48, such as via a locking mechanism which is movable between a locked or latched position which prevents the display 30 from being disconnected therefrom, and an unlocked or unlatched position in which the display 30 is permitted to be disconnected therefrom.

Figure 10B:
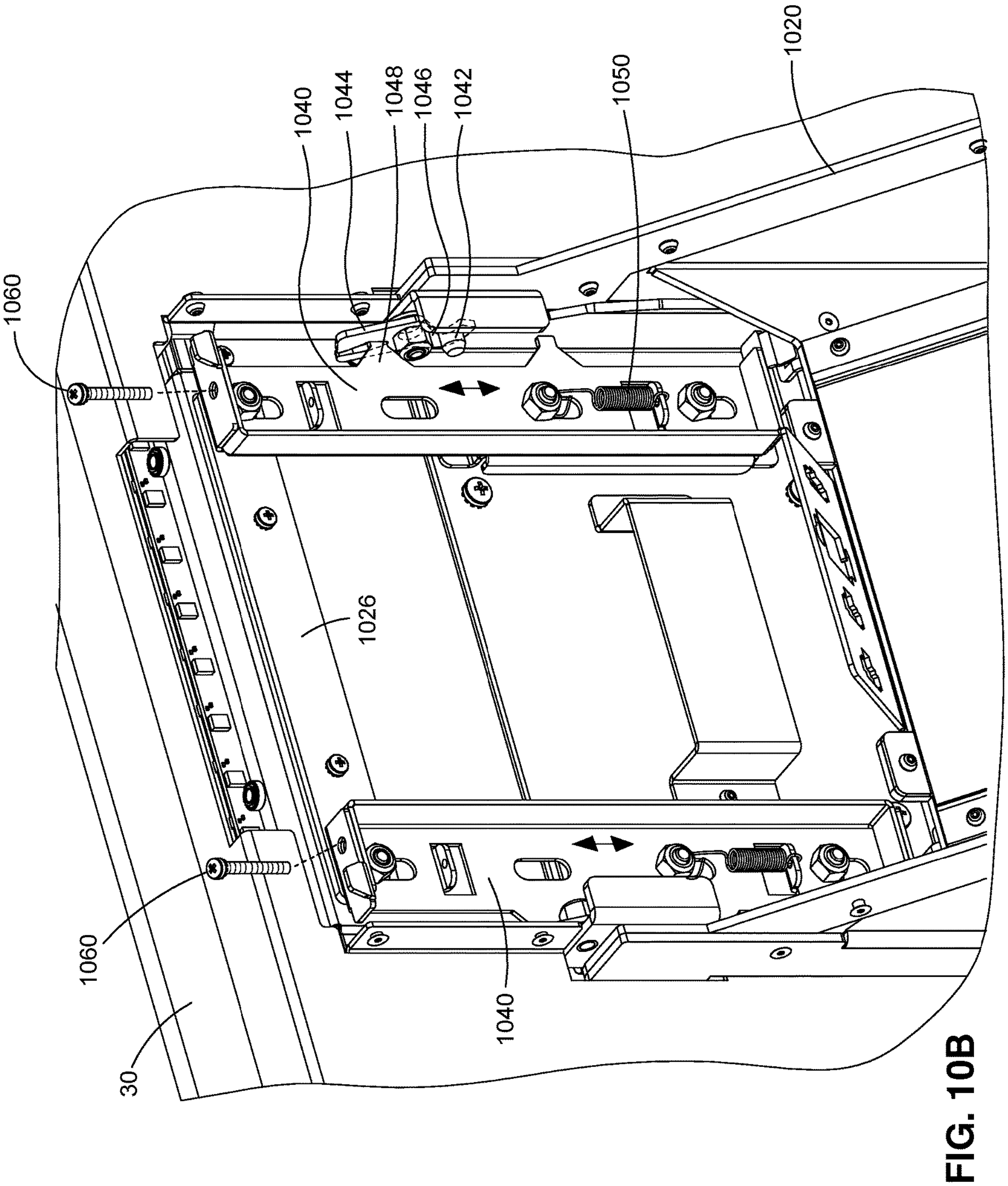
Figure 10C:
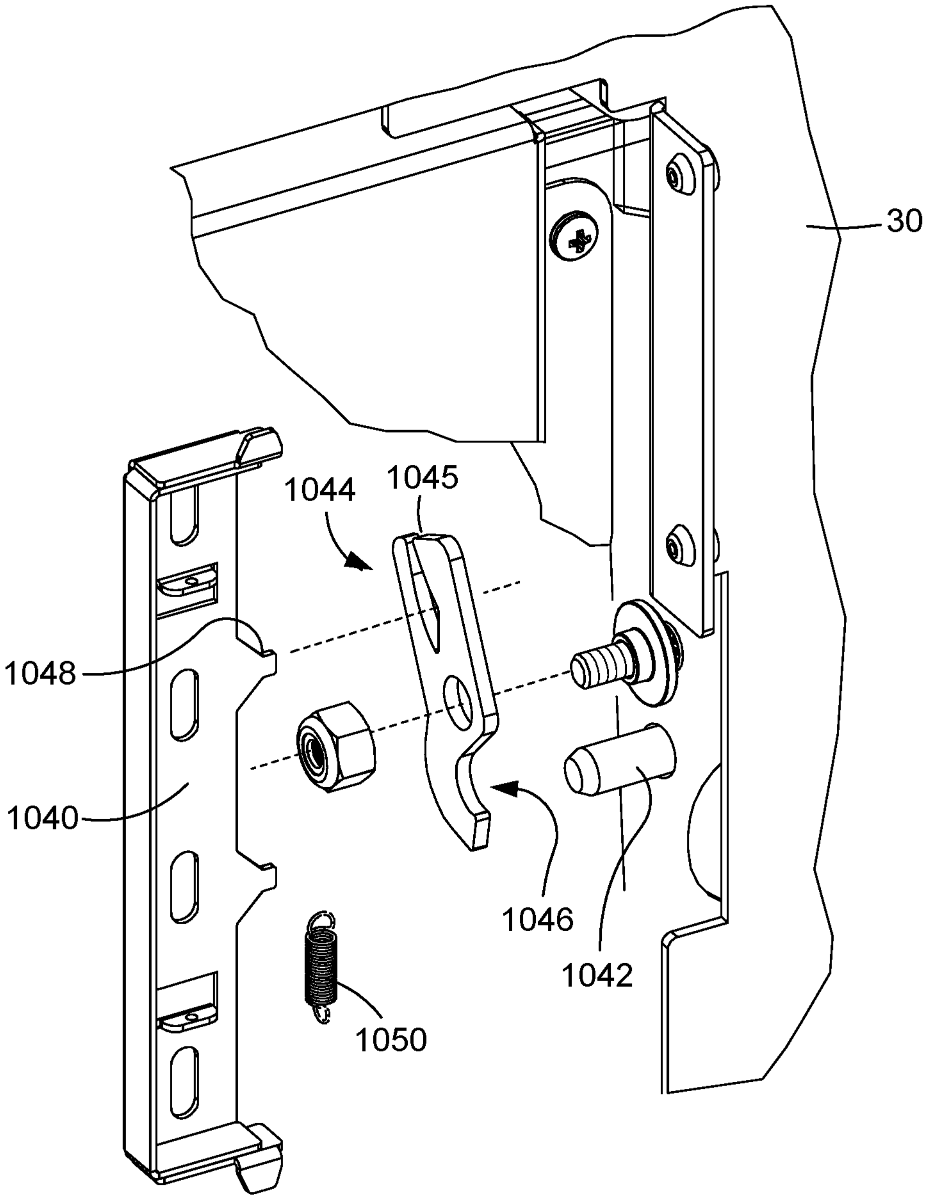

In one example, as illustrated in FIGS. 10B-C, the locking mechanism comprises at least one movable lock bar 1040, such as which is movably mounted on the bracket 1026. In the illustrated configuration, two spaced-apart lock bars are provided, and each lock bar 1040 is movable up and down.

A pin 1042 is provided relative to each lock bar 1040. The pins 1042 may, for example, extend inwardly from legs of the frame 1020.

The lock bars 1040 are each configured to selectively actuate a movable latch 1044. The latches 1044 may be associated with the frame 1020. The latches 1044 may be rotatably mounted and include a catch 1046 for engaging the pin 1042.

In one configuration, when the lock bars 1040 are moved to a first position, such as a raised position, a portion of each lock bar 1040, such as a finger 1048, engages the corresponding latch 1044 (such as in a slot 1045 formed therein), causing it to rotate to a position where the catch 1046 does not engage the pin 1042. This allows the bracket 1026, and thus the display 30, to be removed from the display support 48. When the lock bars 1040 are in a second position, such as a lowered position, the latches 1044 are rotated to a position where the catches 1046 engage the pins 1042, thus securing the display 30 to the display support 48.

In one configuration, means are provided for biasing the lock bars 1040 to their first position. This means may comprise, for example, a spring 1050. The spring 1050 may be configure to pull its corresponding lock bar 1040 upwardly, so that the latches 1044 are in their unlatched position.

A means may be provided for maintaining the lock bars 1040 in their second position, against that biasing force. In one configuration, a threaded fastener 1060 may pass through a mounting portion of the bracket 1026 into engagement with the lock bar 1040. When the threaded fastener 1060 is tightened, it pushes the lock bar 1040 downwardly against the biasing force generated by the spring 1050, so that the latch 1044 is locked or latched. When the fastener 1060 is loosened, the lock bar 1040 may move upwardly to its first position, under the biasing force.

Of course, other biasing elements might be used, and the latch bars and latches might have other configurations. For example, in one configuration, the latch bars might be joined and a single fastener might be used to lock the position of both latch bars at the same time.

An advantage of the display support 48 is that displays of different configurations may be mounted thereto, and such displays may be removed therefrom for servicing or replacement. As one aspect, a technician can remove the display with one hand. In particular, a technician can grab the display 30 with one hand, loosen the fasteners 1060 with the other (such as using a screwdriver) and the simply remove the display 30 (by lifting it off of the pins 1042).

Of course, this mounting configuration may be applied to other than a top/secondary display 30 of a gaming machine 22.

Pivoting Display Mount

Another aspect of the disclosure is a pivoting display mount. In one example of the disclosure, one or more of the displays of the gaming machine 22 may be mounted for pivoting movement relative to the gaming machine 22.

In one example, the main display 28 may be mounted for pivoting movement. As described above relative to FIGS. 8A-B, in one configuration, the main display 28 may be mounted in a fixed position relative to the gaming machine 22, such as to the display support 48. As described above, such a mounting may permit the display 28 to be disconnected from the gaming machine 22, but does not permit a change in the orientation of the main display 28 relative to the gaming machine 22.

However, FIGS. 11A-R illustrate another display mounting configuration in which the main display 28 is pivotally mounted to the gaming machine 22. In this configuration, the main display 28 can be disconnected from the gaming machine 22, but can also be moved, preferably in a rotating or pivoting manner, relative to the gamine machine.

FIGS. 11A and 11B illustrate a configuration of the gaming machine 22 which includes a planar main display 28, such as illustrated in FIG. 1D. Once again, the main display 28 is connected to, and supported by, the display support 48. However, as illustrated in FIG. 11G, in this configuration, the main display 28 is mounted to a pivoting chassis 1102.

As illustrated in FIGS. 11D and 11E, the pivoting chassis 1102 may be moved to and from a first or closed position relative to the display support 48. In this position, the main display 28 which is mounted to the pivoting chassis 1102 may be in a generally vertical position. The pivoting chassis 1102 may be moved to and from a second or open position relative to the display support 48. In this position, the main display 28 is located at an angle offset from vertical, such as a horizontal or generally horizontal position. Of course, the pivoting chassis 1102 is also movable to positions between the first and second positions, such as during movement of the chassis 1102 between those positions.

Additional details of the pivoting display mount will be described with reference to FIGS. 11F and 11G. In one configuration, the pivoting chassis 1102 comprises a support, such as a panel, and may have a top, an opposing bottom, a first side and opposing second side, and face or main portion which has a front and a generally opposing rear. In one configuration, the sides may be configured as flanges 1104,1106, such as which extend rearwardly generally perpendicular to the face or main portion of the chassis 1102. As illustrated and described in more detail below, one or more openings or apertures may be provided through the pivoting chassis 1102, including the side flanges 1104,1106. In the configuration illustrated, the pivoting chassis 1102 is generally rectangular in shape (taller than it is wide), but it might have other shapes and sizes.

In one configuration, the pivoting chassis 1102 may be located at the front of the display mount 48. In one configuration, one or more extensions 1108 may be connected to the display mount 48 and extend outwardly therefrom. The extensions 1108 may be configured to extend along the sides and bottom of the pivoting chassis 1102 when it is in its first or closed position, such as illustrated in FIGS. 11C and D. As described in more detail below and illustrated in FIG. 11R, the shape of the extensions 1108 may depend upon the shape of the main display 28 which the pivoting chassis 1102 is intended to support.

As illustrated in FIGS. 11H and 11I, the display mount 48 may have an inside face 1110 with forwardly extending side flanges 1112. The side extensions 1108 may be connected to the side flanges 1112, such as to extend further outwardly from the display mount 48.

The pivoting chassis 1102 may be mounted for pivoting or rotational movement at or near the top thereof, to the display mount 48. In configuration, as best illustrated in FIG. 11G, a mounting bracket 1113 may be connected to the top of the display mount 48. This mounting bracket 1113 may be generally "U" shaped, such as having a central portion which corresponds to the face 1110 of the display mount 48, and opposing end or side portions which correspond to the side flanges 1112 and extensions 1108. The mounting bracket 1113 might be formed as part of the display mount 48. However, as illustrated in FIG. 11R and described in more detail below, in one configuration the mounting bracket 1113 is advantageously removable therefrom, such as to facilitate use of a mounting brackets 1113 of different sizes, such as to facilitate the use of different sized displays 28. In this configuration, the mounting bracket 1113 may be connected to the display mount 48 with one or more fasteners or other elements, such as corner brackets 1116. As illustrated in FIG. 11I, these brackets 116 may be used to join the bracket 1113 securely at each side of the display mount 48.

In one configuration, a mounting pin 1114 extends inwardly from each side of the mounting bracket 1113 (or if the mounting bracket is part of the display mount, the display mount 48). The pivoting chassis 1102 is mounted for rotational movement relative to the pins 1114.

In one configuration, the mounting pins 1114 may extend through or more supports or stiffeners, such as the corner brackets 1116 and a secondary stiffener 1118. As illustrated in FIG. 11K, the pivoting chassis 1102 may define a mounting pin accepting slot 1120 at each side. The slot 1120 may include a first portion 1122 in the face of the pivoting chassis 1102, and a second portion 1124 in the corresponding side portions 1104,1106. As illustrated, the second portion 1124 may be generally "L" shaped. During assembly, the mounting pins 1114 may be aligned with the first portion 1122 of each slot and then passed into the second portion 1124 of each slot 1120, with the pivoting chassis 1102 then moved to that the mounting pins 1114 are located in the closed end of the slots 1120.

As illustrated in FIG. 11L, a bushing 1126 may be located over the mounting pin 1114 so that it fits into the slot 1120. In one configuration, at least the end portion of the mounting pin 1114 is externally threaded for accepting one or more fasteners. As illustrated in FIG. 11N, a washer 1128 and nut 1130 may then be secured to the mounting pin 1114.

In one configuration, a means for biasing may be provided for biasing the pivoting chassis 1102 into its second or open position. The means for biasing may comprise, for example, one or more pneumatic shocks 1132, such as having a body 1134 and an extendable piston or rod 1136. In one configuration, two shocks 1132 are provided, one at each side of the pivoting chassis 1102, such as to provide even lifting force to both sides (one shock 1132 might be utilized, but might generate some bending/twisting of the chassis, depending upon the configuration thereof). One end of the each shock 1132 may be connected to the display mount 48 and another may be connected to the pivoting chassis 1102. In one configuration, the shocks 1132 or other means for biasing provide a lifting force to aid in moving the pivoting chassis 1102 and a display 28 connected thereto, to the open position. Further, the shocks 1132 may generate sufficient force to maintain the pivoting chassis 1102 and associated display 28 in the open position without user assistance, such as to facilitate a user working on the gaming machine 22 without having to hold the pivoting chassis 1102 and display 28. In other embodiments, a stop or lock might be provided which allows the pivoting chassis 1102 and associated display 28 to be maintained in the open position.

In one configuration, during assembly the pivoting chassis 1102 may be configured to be maintained in an open position to permit installation of the shocks 1132. For example, referring to FIG. 11G, an aperture 1138 may be provided in each side 1104,1106 of the pivoting chassis 1102, such as near the top thereof. A pin (not shown) or similar element may be placed into engagement with one or both apertures 1138, which pin then engages the side flange 1112 of the display mount 48 thus retaining the pivoting chassis 1102 in an open position such as illustrated in FIG. 11G. Other types of stops or locks might be provided for similar purposes.

Other means for biasing might be provided, such as springs, to provide a force which causes or aids in causing the pivoting chassis 1102 to move it its open position.

In one configuration, at least one means is provided for securing the pivoting chassis 1102 in its closed position. As illustrated in FIG. 11P, this means may comprise at least one latch 1140. In one configuration, two latches 1140 are provided, such as in a spaced configuration near the bottom of the display mount 48. Each latch 1140 may include a movable locking lever 1142 which is biased towards a locking position and which is configured to accept a pin 1144 which is mounted to the pivoting chassis 1102 (see FIG. 11G). In operation, when the pivoting chassis 1102 is closed, the pins 1144 are pressed into engagement with the latches 1140, causing the locking levers 1142 to be moved to their locked or latched position, thus securing the pivoting chassis 1102 in its closed position.

A release 1146 is provided for unlatching the latches 1140. In one configuration, the release 1146 comprises at least one cable which is connected to each locking lever 1142. As illustrated in FIG. 11O, the cables may extend downwardly through the display mount 48 and then extend forwardly, such as to an access point in the cabinet 26 (such as behind the movable button deck or console 34—which as described above, may be unlocked and moved to an open position). In operation, a user may access a handle which is connected to the releases 1146 and pull the handle, thus pulling the locking levers 1142 downwardly, moving them to an unlatched position, thus releasing the pivoting chassis.

In one configuration, a second means for biasing may be utilized to move the pivoting chassis 1102 out of engagement with the latches 1140 when they are unlatched. The second means for biasing may comprise, for example, one or more springs 1148, such as coil springs. The one or more springs 1148 may be mounted to the display mount 48 in a manner in which they engage the pivoting chassis 1102 when it is in its closed position. Thus, when the latches 1140 are unlatched, the biasing force generated thereby pushes the pivoting chassis 1102 away from the latches 1140 (preventing the pins 1144 from being recaptured by the latches 1140 when the release 1146 is disengaged).

In one configuration, as illustrated in FIGS. 11P and 11Q, the latches 1140 are spaced from the face 1110 of the display mount 48, such as to provide clearance for operation of the locking levers 1142 and the releases 1146. As illustrated, the latches 1140 are connected to the flanges 1112 at each side of the display mount 48. For example, threaded studs 1150 may extend inwardly from the flanges 1112, and corresponding threaded fasteners 1152 may extend outwardly from the latches 1140. A coupler 1154, such as a threaded nut, may be used to join the latch 1140 to the studs 1150, thus securely coupling the latches 1140 to the display mount 48 in a position spaced from the face 1110 thereof.

In one configuration, one or more braces, stiffeners or the like may be utilized to increase the strength and rigidity of the mounting configuration. For example, as illustrated in FIGS. 11G and 11H, a first brace 1156 and a second brace 1158 may be associated with the display mount 48. As illustrated, the braces 1156,1158 may be arranged into an "X" configuration.

The braces 1156,1158 may have various configuration. The braces 1156,1158 might be generally flat, but to resist bending under load, would have to be thick and heavy. Thus, as illustrated, the main body of each brace 1156,1158 is generally flat, but includes at least one rib or flange, such as along a side thereof, for increasing the rigidity thereof while allowing the main body of each brace 1156,1158 to be much thinner (and thus lighter and lower in cost).

Each brace 1156,1158 may have a top end and a bottom end which are each coupled to the display mount 48. As illustrated in FIGS. 11I and 11N, in one configuration, the top ends of the braces 1156,1158 are connected to the same mounting pins 1114 that are used to mount the pivoting chassis 1102. For example, the top end of each brace 1156,1158 may include a mounting tab 1160 (which, as illustrated, may extend generally perpendicular to a main body of the brace). The tab 1160 may include an aperture for accepting the portion of the mounting pin 1114 that extends beyond the coupling nut 1130 that retains the pivoting chassis 1102. A second nut 1162 may then be threaded onto the mounting pin 1114.

As illustrated in FIG. 11G, the braces 1156,1158 might be secured in other locations. For example, aside from being mounted at their top and bottom ends, the braces 1156,1158 might be coupled to one another and the display mount 48 at the intersection, and the braces 1156,1158 might be coupled to the display mount 48 or associated features thereof, such as between their top and their point of intersection and their point of intersection and their bottom end. For example, threaded fasteners might be used at their locations to secure the braces 1156,1158. As illustrated, in one configuration, the braces 1156,1158 may be coupled or connected to a handle enclosure 1164. The braces 1156,1158 might also be coupled to a cross-member of the display mount 48. However, the braces 1156,1158 could be coupled to the display mount 48 or other features.

In one configuration, at least one detector 1166 may be provided for detecting or sensing a position of the pivoting chassis 1102. In one configuration, the detector 1166 may comprise a plunger type switch having a plunger which is biased to an extended position and which can be pressed inwardly to a retracted position. The switch may provide an output to the controller of the gaming machine, in a similar manner to that described above. As illustrated in FIG. 11O, a portion of the pivoting chassis 1102, such as a switch bracket 1168 connected thereto, may be configured to engage the plunger portion of the switch or detector 1166. The detector or switch 1166 may, as illustrated in FIG. 11P, be mounted to the display mount 48.

In use, when the pivoting chassis 1102 is in its first or closed position, the bracket 1168 may engage the plunger of the detector or switch 1166. When the pivoting chassis 1102 is opened, the plunger moves to its extended position, and may thus trigger the switch. In some configurations, movement of the plunger to the extended position and the associated output of the switch, may cause the gaming controller to activate an alarm, unless the an override input is provided, such as by an authorized user (such as by a technician providing input by an unlocking key to the cabinet which the controller then interprets as authorized access thereto, including opening of the associated pivot chassis 1102).

The mount may include other features. As described and illustrated, when in the closed position, the pivoting chassis 1102 cooperates with the display mount 48 to define a generally closed space which houses a number of features or components, such as wiring, the latches 1140, the braces 1156,1158, etc. The space may generally be bounded at the front by the body of the pivoting chassis 1102, at the back by the face 1110 of the display mount 48, and at the sides by the sides 1104,1106 of the pivoting chassis 1102 and the flanges 1112 and the associated extensions 1108. As illustrated in FIG. 11H, a top cap 1170 may be provided for generally closing the top of that space, such as around a mount 1020 for the secondary display 30.

In one configuration, a bottom bracket 1172 may be provided for closing the bottom of the space. This bracket 1172 may include a portion, such as an inside face, which is located inwardly of the sides of the pivoting chassis 1102 and the latch pins 1144, so that when the pivoting chassis 1102 is closed, the latch pins 1144 to do hit the latches 1140 if they are in a closed position.

As indicated, the pivoting chassis 1102 is configured to support a display, such as the main display 28 as illustrated in FIGS. 11A and 11B. The display 28 may be connected to and disconnected from, the pivoting chassis 1102 (such as for manufacture and later repair or replacement). In one configuration, as best illustrated in FIG. 11F, the pivoting chassis 1102 defines one or more keyholes 1174 or other apertures through the face thereof. Each keyhole 1174 may be configured to accept a mount, such as a stud, which extends from the rear of the display 28. The user may extend the studs through the aligned keyholes 1174, thus associating the display 28 with the pivoting chassis 1102. Further, one or more secondary apertures 1176 may be provided through the face of the pivoting chassis 1102. Each secondary aperture 1176 may accept a fastener, such as a threaded fastener from the rear thereof into engagement with the display 28, thus securing the display 28 to the pivoting chassis 1102.

In the configuration described, the position of the main display 28 may be changed from a "use" position in which the pivoting chassis 1102 is in its first or closed position and the display 28 is generally extending (such as illustrated in FIGS. 11A and 11B), to an "access" or "service" position in which the pivoting chassis 1102 is moved to its second or open position (such as illustrated in FIG. 11E).

In one configuration, the extensions 1108, display mount 1002 and mounting bracket 1113 might be formed as one element, such as one sheet metal part, in order to further reduce cost. However, by doing so, one would "lock" the display mount/tower as being compatible with, or designed for, only one monitor having a given shape (such as flat or curved) and having one size (such as a particular height). In the configuration described above where these elements are separate and can be selectively connected/disconnected, the modular assembly allows one to re-use the same display mount 1002 but simply utilize different extensions 1108 (if going to a different curvature monitor of the same overall height) or utilize different the extensions 1108 and a different mounting bracket 1113 (if going to a taller monitor).

For example, as indicated herein, the gaming machine 20 might be configured with main displays 28 having different sizes or shapes. Referring to FIG. 11R, a taller main display 30 may be facilitated by connecting a taller mounting bracket 1113A to the display mount 48 and then providing a taller pivoting chassis 1102A. In this manner, the same display mount 48 and associated features, labelled "0" in FIG. 11R may be used with gaming machines 22 having different sized main displays 28, and only different mounting portions, labelled "N" in FIG. 11R are required—which includes the bracket and pivoting chassis. As noted above, where the bracket 1113,1113A is configured as an element which can be connected to and disconnected from the display mount 48, this allows the gaming machine 22 to have a modular construction both for ease of manufacturing in to different configurations, but allows the configuration of the gaming machine to be changed thereafter.

Further, the gaming machine 22 may be configured with a flat or planar main display 20, such as illustrated in FIG. 11A, or a display of another shape, such as a curved main display 28 such as illustrated in FIG. 1A. In the case of a curved main display 28, the alternate extensions 1108A (side and/or bottom) may be utilized, which extensions 1108A have a shape which matches the contour of the rear of the main display 28.

Various advantages and other features of the above-described display mounting configuration will now be described. In general, the mounting has the advantage, noted above, of allowing easy opening and closing of the display mount 48 and associated display 28, such as to gain access to the interior space thereof and to service and/or replace the display 28.

Further, the mount, including specific features and configurations thereof, have advantages of cost, weight and strength. For example, the configuration of the pivoting chasing 1102 having a slot 1120 that includes a first portion 1122 in the face of the pivoting chassis 1102 and a second portion 1124 in the corresponding side portions 1104,1106, is that the pivoting chassis 1102 can still be slid into place onto the mounting pins 1114, but results in substantially higher strength at the connection that if a simple open slot were provided in each side portion.

As another example, due to the pivot configuration, only two latches 1140 need to be provided (as compared to four in the non-pivoting configuration noted above). This results in a reduction in cost. Another advantage is the side-mounting of the latches, which offsets the latches 1140 from the face of the display mount 48. The above-described configuration results in less costs than forming and connecting stand-out brackets to the display mount 48 to place the latches 1140 outwardly from the face 1110 thereof. Other advantages of cost, strength and weight are noted above.

In one configuration, the pivoting mount described above permits connection of the pivoting chassis to the display mount in a manner which does not involve placing fasteners into the pivoting chassis or display mount that are visible from the exterior, thereby increasing the aesthetic appearance of the machine. For example, as indicated above, in one configuration, the pivoting mount is achieved by aligning pins which extend inwardly from the mounting flange 1113 with slots in the pivoting chassis 1102, as contrasted, for example, with mounting configurations which might connect one pivoting member to another via screw mounted hinges which require the screws and/or hinges to be visible. Further in one configuration, the pivoting chassis mount utilizes 107 cubic inches of metal as compared to 217 for the non-pivoting design described above, thus reducing the weight and cost of the machine.

In another example of the disclosure, the secondary display 30 may also be mounted for pivoting movement relative to the gaming machine 22, such as the housing 26 thereof. In one example, such as described above relative to FIGS. 10A and 10B, the secondary display 30 may be mounted to a display mount 48 via one or more pins 1044. In such a configuration, the bracket 1026 may rotate about the pins 1044, thus allowing the display 30 to be rotated.

In another example, the secondary display 30 may be mounted for pivoting movement which also permits connection and disconnection of the secondary display from the gaming machine. FIGS. 11S to 11Y illustrate one example in which the secondary display 30 is mounted for pivoting connection and disconnection. Referring to FIGS. 115 and 11T, the display mount 48 may comprise or include a topper extension 1178. In one example, the topper extension 1178 is removable, such as when a secondary or topper display 30 is not utilized with the gaming machine 22. The configuration of the topper extension 1178, such as its height and shape, may vary, such as depending upon size of the secondary display 30. In one example, the extension 1178 is configured to cause a bottom of the secondary display 30 to be mounted adjacent to the top of the main display 28, with the front faces thereof generally flush with one another. Thus, as illustrated in FIGS. 11S and 11T, the extension 1178 may be configured to extend upwardly from a portion of the display mount 48 which supports the main display 28, and then towards the front of the gaming machine 22, so as to cause the front of the secondary display 30 to be flush with a front of the main display 28.

In one example, the secondary display 30 and the topper extension 1178 may be pivotally connected to one another and pivotally disconnected from one another. As illustrated, the secondary display 30 may include a mounting bracket 1180. The mounting bracket 1180 might be formed as a portion of a housing or panel of the secondary display 30, or might be a separate element which is connected thereto. In one example, the bracket 1180 has a top and first and second ends or sides, and is connected to the secondary display 30, such as with fasteners. As illustrated, the bracket 1180 may be located near a top of the secondary display 30, and a gaming machine candle 1182 may be mounted to the top of the bracket 1180 and may extend upwardly above the top of the secondary display. A slot 1184 is located at each end or side of the bracket, wherein each slot 1184 is configured to accept a pin therein. As illustrated, a portion of each slot 1184 may intersect the top of the mounting bracket 1180 and the slot may then extend into the end portions of the mounting bracket 1180.

A mounting pin 1186 is associated with each of a first mounting portion 1188 and a second mounting portion 1190 of the topper extension 1178. As illustrated, the first and second mounting portions 1188, 1190, may comprise spaced apart brackets or flanges. In general, the distance between the mounting portions 1188, 1190 is slightly larger than the length of the mounting bracket 1180 from end to end, thus permitting the mounting bracket to fit therebetween. The mounting pins 1186 extend inwardly from each of the first and second mounting portions 1188, 1190, such as generally perpendicular thereto.

Figures 2, 11U:
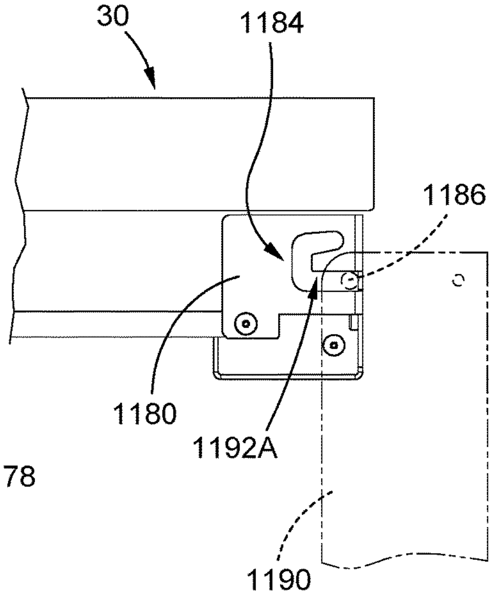

Additional details of the pivoting mount will be appreciated from a description of the operation thereof. As illustrated in FIGS. 11U-1 and 11U-2, when the secondary display 20 is positioned generally horizontally with the top of the mounting bracket 1180 facing the topper extension 1178, the secondary display 30 may be moved laterally towards the topper extension 1178, causing the mounting pins 1186 to enter a first portion 1192A of the slots 1184 at the top of each end of the mounting bracket 1180. This first portion 1192A of each slot 1180 preferably extends generally vertically when the secondary display 30 is similarly vertically oriented.

Figures 1, 11V:
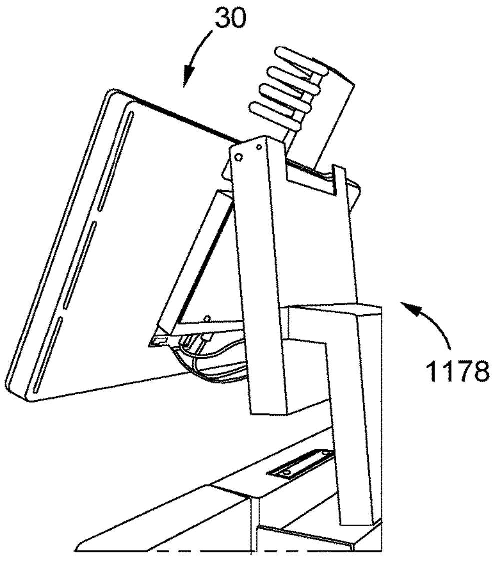
Figures 2, 11V:
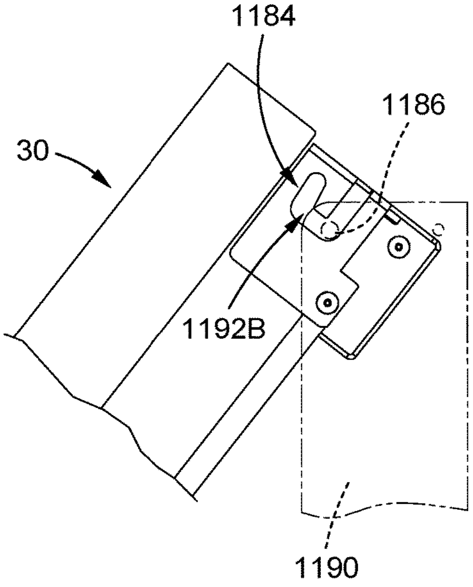
Figures 1, 11W:
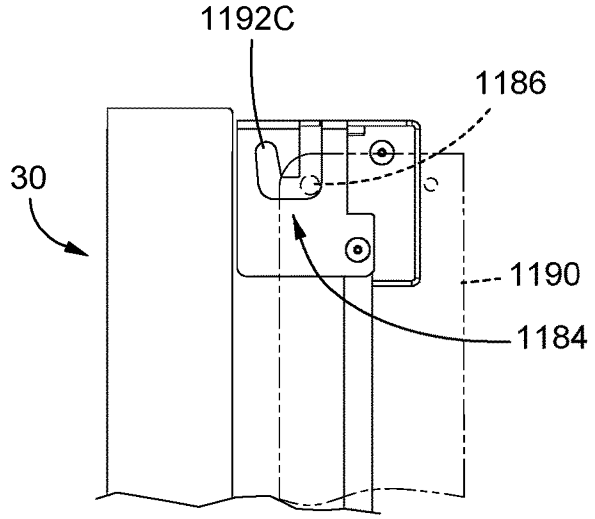
Figures 2, 11W:
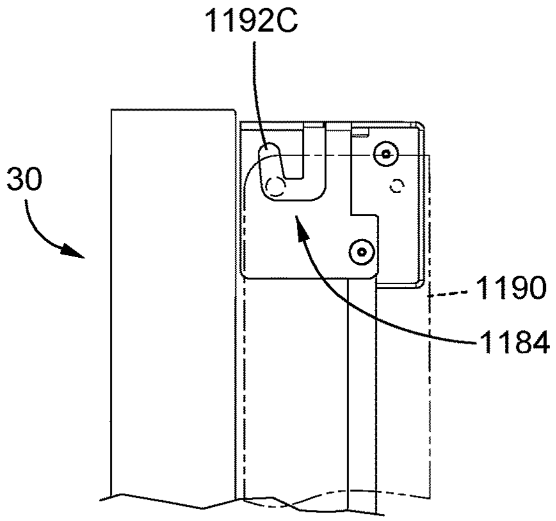
Figures 3, 11W:
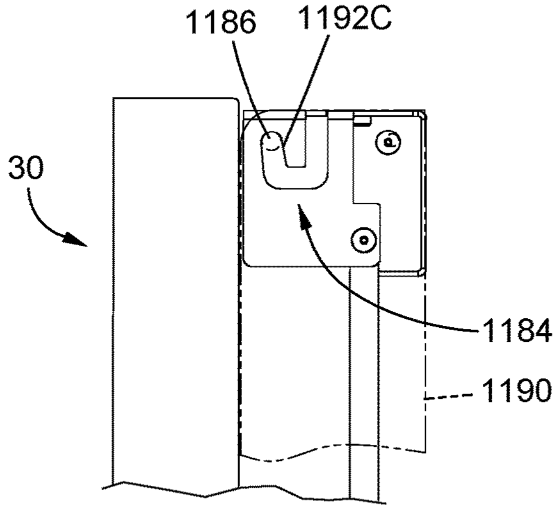

As illustrated in FIGS. 11V-1 and 11V-2, the secondary display 30 may be moved until the pins 1186 travel along the first portion 1192A of each slot 1180 to a second portion 1192B thereof, which second portion may extend generally perpendicular to the first portion 1192A. As indicated, this movement may be effectuated by pivoting movement of the secondary display 30 relative to the topper extension 1178.

As illustrated in FIGS. 11W-1, 11W-2 and 11W-3, the secondary display 30 may then be moved, such as in a further pivoting movement, to cause the pins 1186 to move along the second portion 1192B of each slot 1180 to and along a third portion 1192C of each slot. As illustrated, in one example, the third portion 1192C extends generally perpendicular to the second portion 1192B, and thus generally parallel to the first portion 1192A. Thus, the third portion 1192C of each slot 1180 may extend generally vertically when the secondary display 30 is oriented vertically.

In this configuration, as illustrated in FIGS. 11X and 11Y, when the secondary display 30 is generally vertically orientated, the pins 1186 are each located at the end or top of the third portion 1192C each slot 1180. In this position, the mass of secondary display 30 generates a downward force which maintains the pins 1186 at the top of each slot 1180, and thus the secondary display 30 in the mounted vertical position, as illustrated in FIG. 11X. Of course, associated wiring (power cable, video cable, etc.) would then be connected from the secondary display 30 the gaming machine's controller.

The secondary display 30 may be disconnected from the gaming machine 22 by reversing the process noted above.

A particular advantage of this mounting configuration is that it permits essentially tool-less connection and disconnection of the secondary display 30 to the housing 26 (such as for installation, repair, replacement, etc.) In one example, the method involves pivoting of the secondary display 30 relative to the housing 22, such as relative to a topper extension 1178. In one embodiment, the pivoting connection permits movement of a pin relative to offset portions of a mounting slot, where the secondary display 30 is placed in different orientations to allow the pin to move relative to the slot—and preferably where the second display 30 is placed in an orientation other than vertical in order to move the pin along at least a portion of the slot, so that when the secondary display 30 is moved to its vertical use position, the pin is prevented from moving along the slot to its exit point.

Cabinet Paneling

Another aspect of the disclosure comprises removable housing covering or paneling. The covering or paneling may be used to generally enclose portions of the housing 26, and may include aesthetic features, such as to change the appearance of the exterior of the gaming machine 22. The paneling is configured for ease of installation and removal, including both during manufacture and in use, where the gaming machines 22 may be situated in close proximity to one another, such as in a side-by-side configuration.

In one example, one or more panels are connectable to one or more frame elements of the housing 26, such as for closing portions of the housing 26 and/or defining an exterior of the housing (such as an exterior aesthetic thereof). In one example, the panels may comprise at least one front side panel 1202 and at least one rear side panel 1204. The front and rear side panels 1202,1204 may be located at each side of the gaming machine 22, and cooperate with one another to define at least a portion of an exterior of the sides of the housing 26 of the gaming machine 22.

Figure 12A:
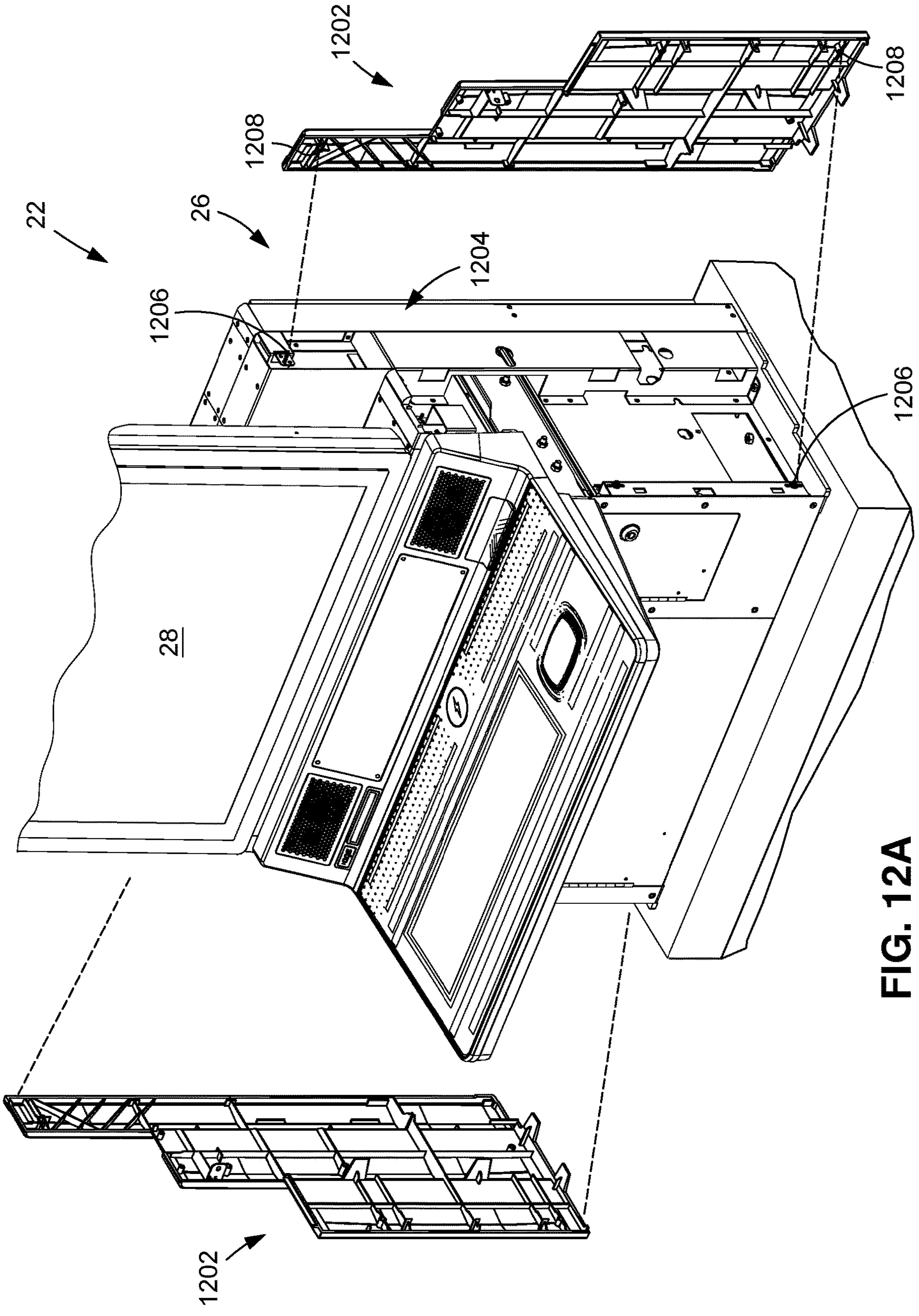
FIGS. 12A-D illustrate configurations of cabinet paneling in accordance with examples of the disclosure.
Figure 12B:
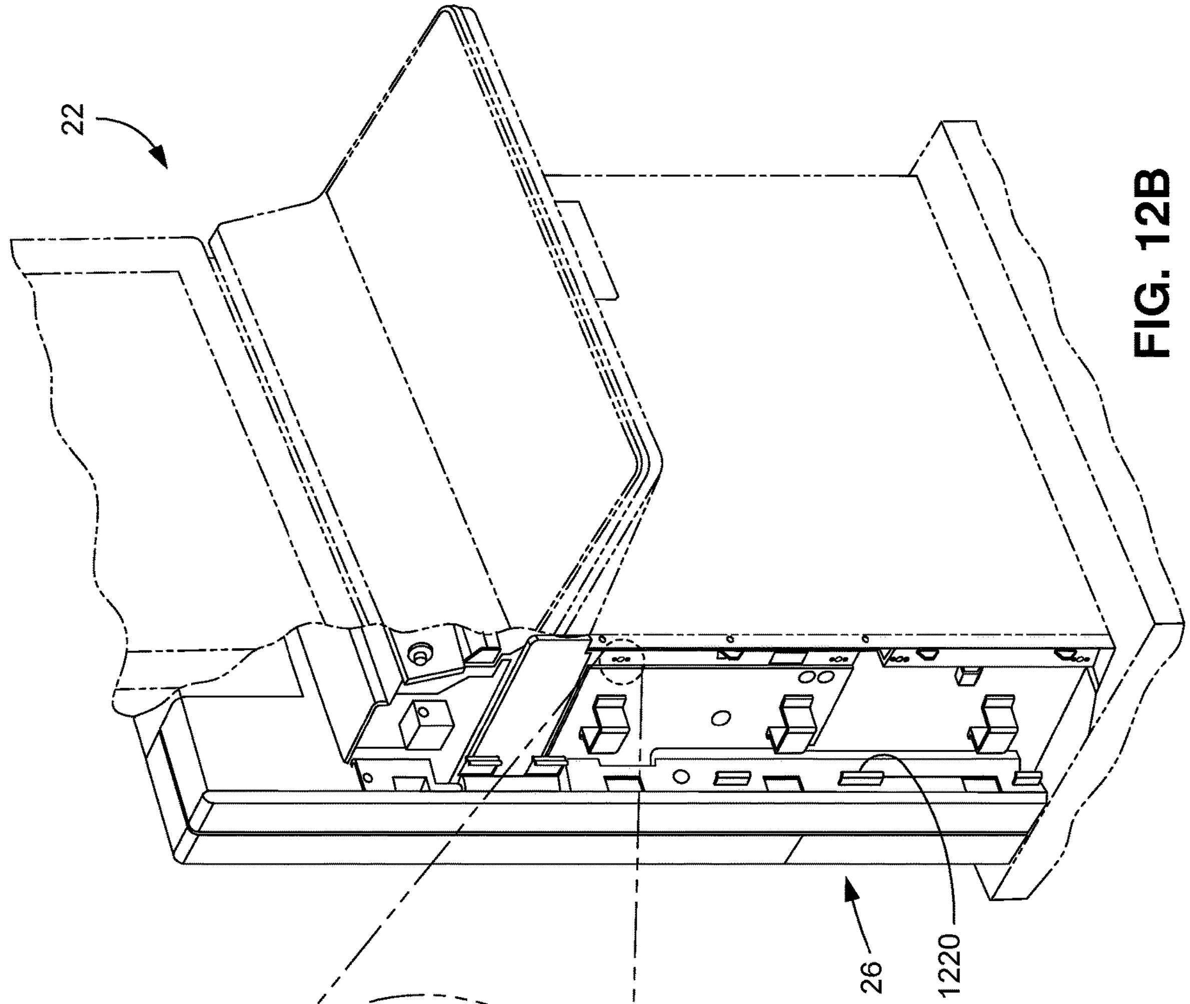
Figure 12C:
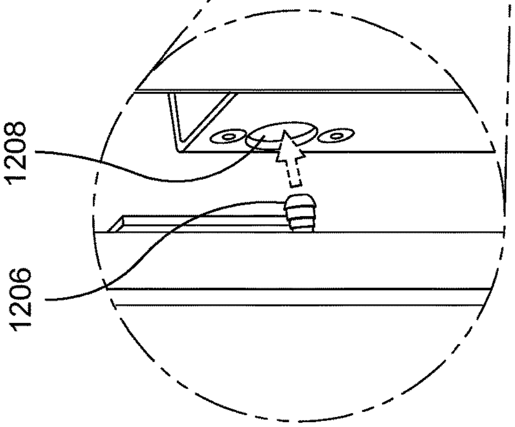

As one example, referring to FIGS. 12A-C, a rear side panel 1204 may be located at each side of the housing 26 of the gaming machine 22, such as near the rear thereof. The rear side panel 1204 may be connected to the housing 26, such as one or more frame elements thereof, such as with one or more fasteners or the like.

In one example, the front side panel 1202 is configured to be connected to the housing 26, but also the rear side panel 1204, where by the front and rear side panels 1202,1204 are interconnected or interdependent.

For example, the housing 26 may define one or more first connectors for connection to one or more second connectors associated with the front panel member 1202. The first and second connectors preferably allow for removable connection of the front panel member 1202 to the housing 26, such as without the use of tools. As one example, the first connectors might comprise apertures 1206 in the housing 26 for engagement with pins 1208 which extend outwardly from a rear or interior side of the front side panel 1202, thus allowing the front side panel 1202 to be snapped into place (e.g. snapped into engagement with the housing 26).

Figure 12D:
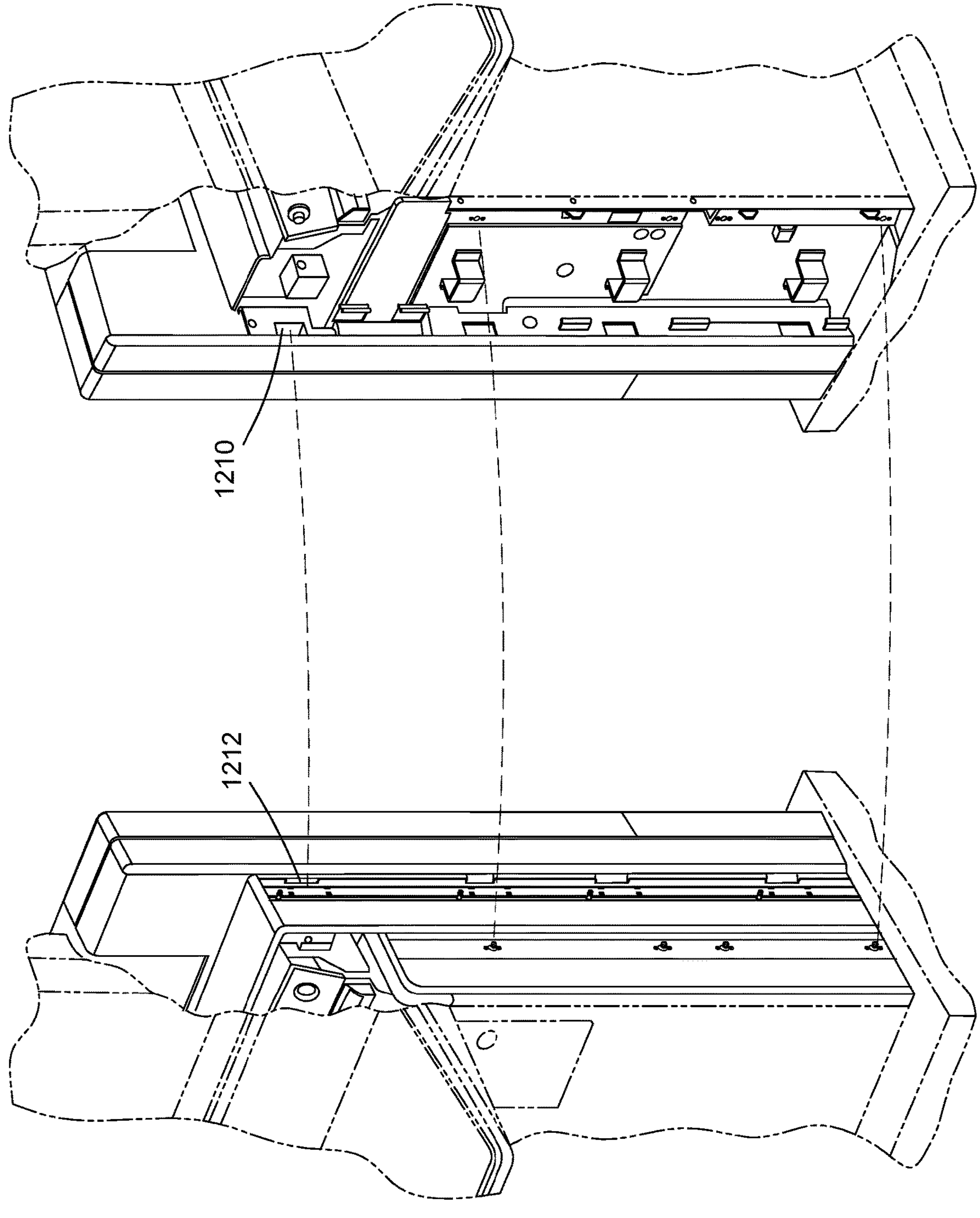

In one configuration, as best illustrated in FIG. 12D, the connectors may instead (or also) comprise one or more slots 1210 or similar openings associated with or defined by the housing 26, for engagement with one or more catches 1212 associated with the front side panel 1202. In one configuration, as illustrated, these slots 1210 may be defined in a portion of the housing 26 which faces forwardly.

Importantly, as indicated, in one configuration, the front and rear side panels 1202,1204 are designed to inter-engage or interconnect. In one configuration, as illustrated in FIG. 12C, the rear side panel 1204 defines one or more tabs or catches 1220. These tabs 1220 may extend outwardly from the rear side panel 1204, such as towards the front of the gaming machine 22. The tabs 1220 may be generally "L"-shaped, such as extending outwardly from the rear side panel 1204 and then back inwardly towards the housing 26. In one configuration, the front side panel 1202 defines one or more ribs or extensions, such as at the rear or interior thereof, for engaging the tabs 1220. In particular, when the front side panel 1202 is connected to the housing 26 by the connectors as described above, the one or more ribs or similar features are preferably located adjacent to the tabs 1220 of the rear side panel 1204, thus effectively linking them.

In example of use, the rear side panel 1204 is connected to the housing 26. Once the rear side panel 1204 is connected, the catches 1212 of the front side panel 1202 are aligned and inserted into the slots 1210. The front side panel 1202 is then snapped in at the front edge and fully constrains the rear side panel 1204 by touching off/engaging the rear side panel 1204 constraint interfaces (the tabs 1220). These interfaces in turn keep the side front panel 1202 accurately positioned.

An advantage of this aspect of the disclosure is that slot machines are often placed in a casino in a side-by-side bank configuration where servicing the side panels is challenging, such as due to very limited tool access and hand access. The interdependent snap-in side paneling configuration described above minimizes the number of fasteners and makes panel removal significantly easier when parts need to be serviced.

Cabinet Modularity

One aspect of the disclosure comprises a gaming machine 22 which is modular in construction and assembly, thus permitting the configuration of the gaming machine to be easily changed or modified, either at the time of assembly or thereafter. Features associated with this modularity.

As one example, as illustrated in FIG. 10A, the lower portion 26*a* of the housing 26 may comprise a central module 1020. This central module 1020 may comprise a frame which, along with additional components, may define one interior area for housing components of the gaming machine 22, such as the controller, media printer, etc.). This central module 1020 may also include the frame for the button deck or console 34.

As discussed above, the upper portion 26*b* of the housing 26 may include a variable display mount 900, such as for supporting the main display 28. As indicated above, the display mount 900 may be connected to, and thus supported by, the lower housing 26A. Further, the configuration of the display mount 900 may vary, such as depending upon the shape and/or size of the main display 28 that is to be used with the gaming machine.

As also described above, display support 48 may be connected to the display mount 900, for supporting at least one second display 30. This support 48 may be selectively attached to the display mount 900, thereby allowing different configurations of supports 48 to be utilized, such as to associate second displays 30 of different sizes or shapes, to facilitate the connection of more than one secondary display, and/or to facilitate the support of other features, such as candles or the like.

In one example variation other features of the gaming machine 22 may be modular, and may thus be varied so as to change the configuration of the gaming machine. These features may include, but are not limited to a base portion, exterior covering or panels, and features of the button deck or console.

Figure 13A:
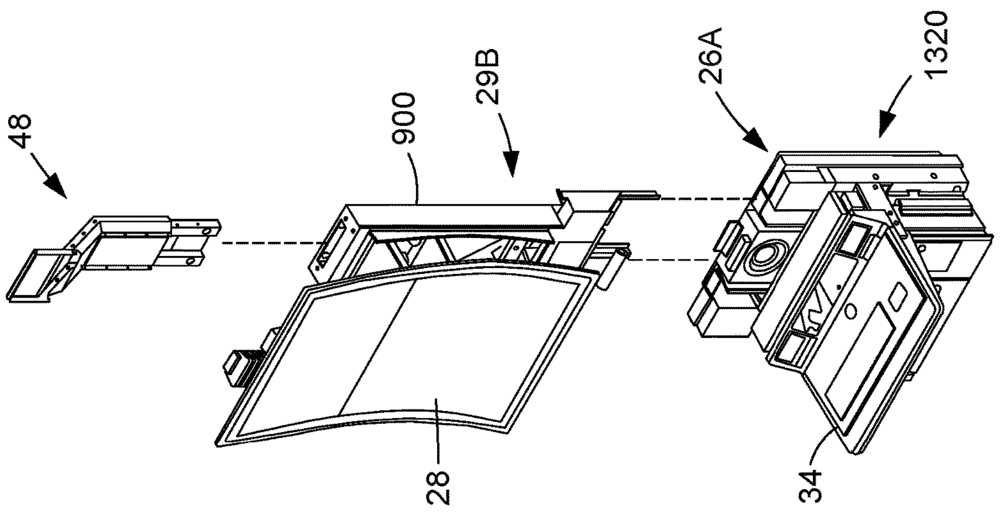
FIGS. 13A-C illustrate aspects of gaming machine cabinet modularity in accordance with examples of the disclosure.
Figure 13B:
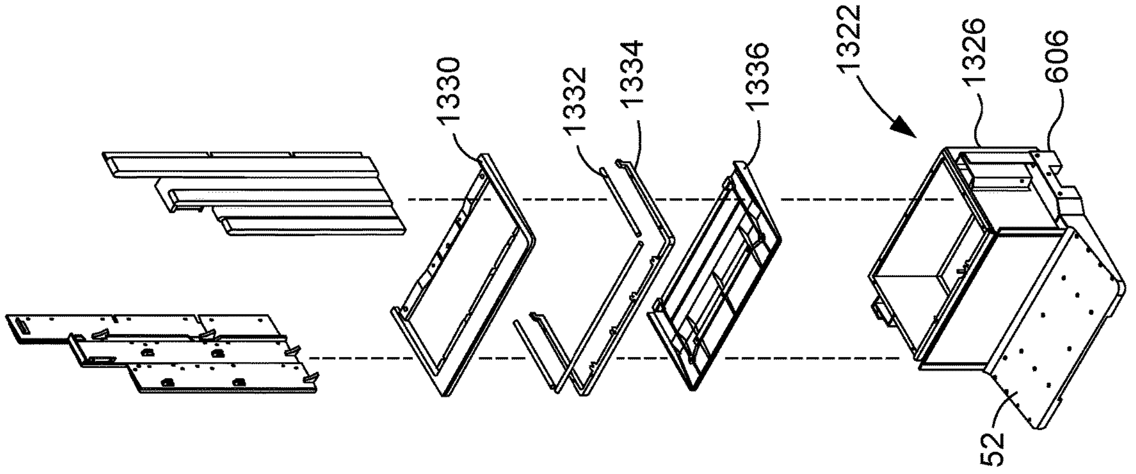
Figure 13C:
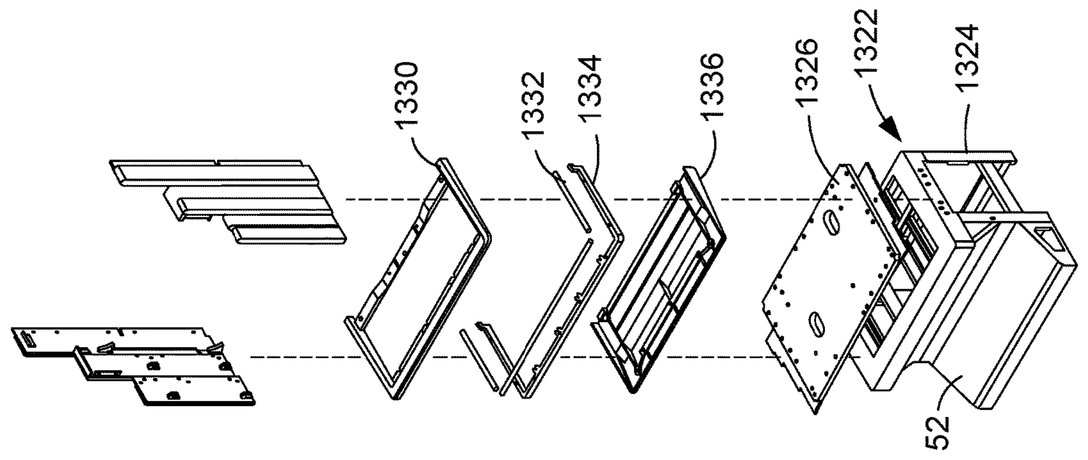

As illustrated in FIGS. 13B and 13C, the central module 1320 may be configured to be supported by a stand module 1322, where the configuration of the stand module may vary, such as to vary the configuration of the gaming machine 22.

Referring to FIG. 13B, in one configuration where the gaming machine 22, such as where it is configured in a slant-display configuration such as that illustrated in FIG. 1D, the stand module 1322 may comprise a riser 1326 which sits on a base 606 (described above and illustrated in FIG. 6B). A footrest 52, such as the convertible foot rest described above, may be associated with the stand module 1322. The central module 1320 may be connected to, and sit upon, the stand module 1322, thus positioning it in a raised position.

On the other hand, referring to FIG. 13C, in another configuration where the gaming machine 22 is configured in an upright display configuration such as illustrated in FIG. 1A, the stand module 1322 might be configured as a raised pedestal 1324. The raised pedestal 1324 may support a base plate 1326. The central module 1320 may be connected to, and sit upon the stand module 1322, thus positioning it in a raised position. A footrest 52 may extend from the stand module 1322.

As also illustrated in FIGS. 13B and C, features of the button deck or console 34 might be varied depending upon the desired configuration of the gaming machine 22. For example, a deck bolster 1330 (such as comprising or defining a trim portion of the button deck or console 34), a PCB 1332, a lens 1334 (such as a perimeter light strip or illuminated diffuser which forms one or more portions of the button deck or console 34, such as a portion of the periphery thereof) and/or an access panel 1336 (such as forms a lower portion of the button deck or console 34) might of the button deck or console 34 might be varied, such as been different configurations of the gaming machine 22 (such as a slant and upright configuration). In one example, these elements are selectively connectable to the central module 1320 to change the configuration of the gaming machine 22.

In another example, as described above, the housing 26 may include exterior paneling (such as the above described side panels, such as the front side panels 1202 and rear side panels 1204). The configuration of the trim elements, such as the shape, size, color other attributes, may vary, such as upon the desired configuration of the gaming machine 22.

Cable/Wire Management

Figure 14C:
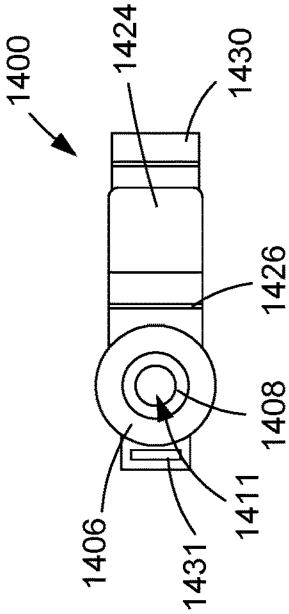
FIGS. 14A-C illustrate cable/wire management system in accordance with an example of the disclosure.
Figure 14B:
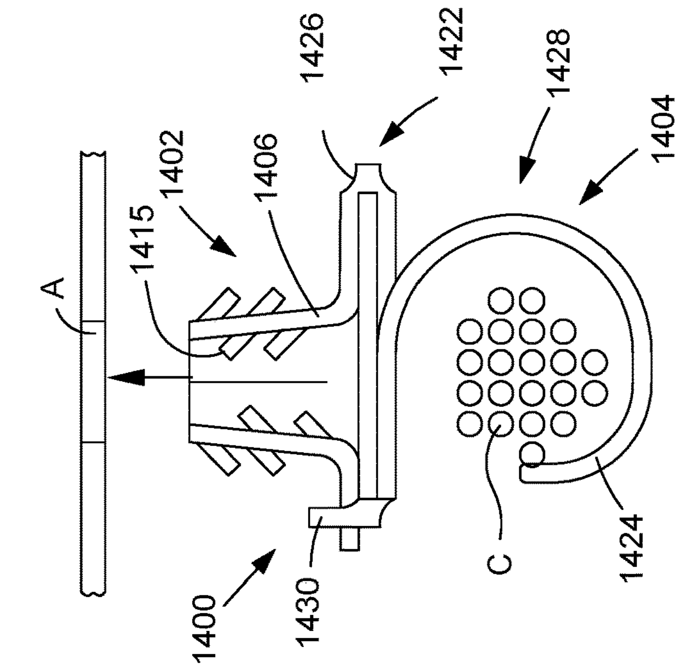
Figure 14A:
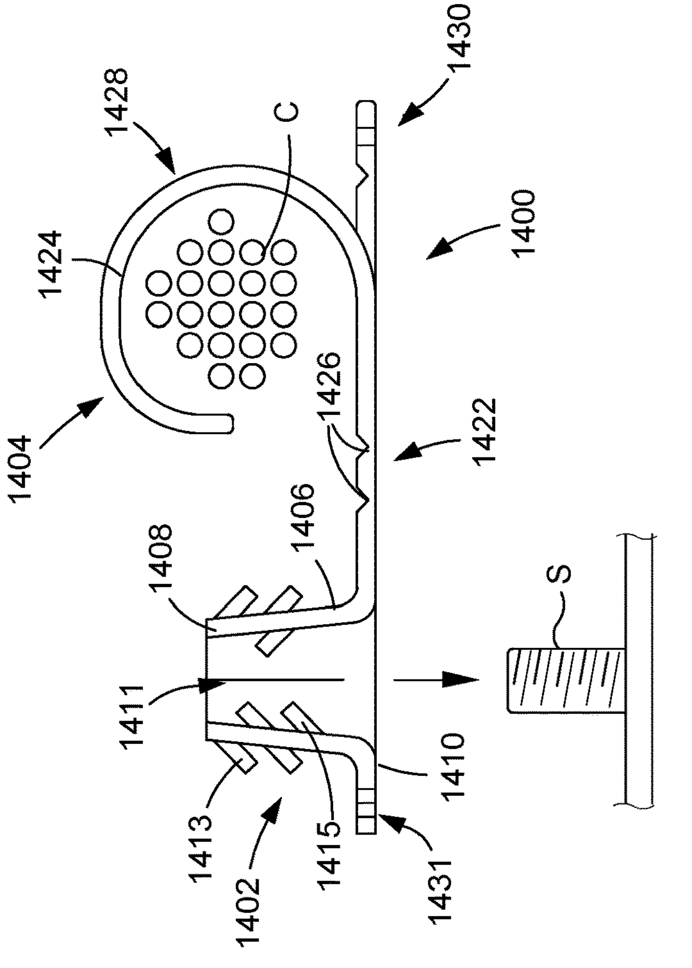

One example of the disclosure is a cable or wire management member. As illustrated in FIGS. 14A-C, a cable or wire management member may comprise a clip 1400. The clip 1400 may include a base or mount 1402 and a cable retainer 1404.

In one example, the base or mount 1402 is configured to be connected to a stud S (such as a cylindrical body having one or more threads thereon) or be associated with an aperture A (such as an opening in a member, such as a panel or other body, where the opening may be an inset or recessed opening or a thru-opening). The mount 1402 may comprise a body 1406 having a frustoconical shape, such that a top end 1408 is generally circular in shape and an opposing bottom end 1410 is generally circular in shape.

The body 1406 may comprise a wall which defines an passage 1411, such that the wall has an interior surface and an exterior surface, where the exterior surface tapers (in profile) from the larger bottom end 1410 to the smaller top end 1408. An axis C may extend through the body 1406, including the passage 1411.

In one example, the passage 1411 may extend entirely through the body 1406, while in other, it might only extend partially therethrough (such as where the top end 1048 is closed or capped).

The interior surface of the body 1406 may be threaded or include projections 1415 or other elements, such as for engaging the stud S, such as the threads thereon. For example, a plurality of generally circular ribs, upwardly projecting fingers or other elements might be located inside the body 1406 for engaging the threads, such as to oppose the removal of the mount 1402 from the stud S.

Similarly, the exterior surface of the body 1406 may include threads or projections 1413 or other elements, such as for engagement with a portion of a member which defines the aperture A. Once again, the projections might comprise circular ribs, fingers or other projections.

In one example, the cable retainer 1404 is connected to the mount 1402. The cable retainer 1404 may comprise an arm or projection that is connected to the mount 1402, such at the bottom end 1410 of the mount 1402. The cable retainer 1404 (and thus the arm) may have a first end which is connected to or is integral with the mount 1402 and may extend outwardly from one side or portion of the mount 1404. The cable retainer 1404 may have an opposing second end.

Between the first and second ends, the cable retainer 1404 may define or include a hinge 1422 and may, adjacent to the second end, define a generally “C-shaped” clip 1424. The hinge 1422 may comprise a portion of the retainer 1404 which facilitates bending or folding of the arm. For example, the hinge 1422 might be define by one or more grooves 1426 which are located in a surface of the retainer 1404, such as extending into a top surface of the retainer 1404.

In one example, the hinge 1422 permits the retainer 1404 to be moved between first and second positions. In a first position, the retainer 1404 may extend generally perpendicular to the axis C outwardly from the body 1406, such as illustrated in FIG. 14A In a second position, the retainer 1404 may extend generally perpendicular to the axis C, but in direction in which the retainer 1404 extends along or below the bottom 1410 of the body, such as illustrated in FIG. 14B.

The clip 1424 may comprise a bent or curved portion of the retainer 1404. The retainer 1404 may be bent between the first and second ends 1408,1410 so as to define a cable accepting loop 1428. The second end 1410 of the retainer 1404 may be located generally adjacent to a portion of the retainer 1404 between the first and second ends, so that the loop 1428 is generally closed.

Additional details of the clip 1400 will be appreciated from a description of the operation/use thereof. As illustrated in FIG. 14A, one or more cables C (or wires or similar elements) may be secured in position using the clip 1400. The one or more cables C may be routed through the loop 1428 thereof, such as by feeding the one or more cables C through the loop 1428 or by pressing them into the loop 1428 under the second end 1410 thereof.

The clip 1400, such as the retainer 1404, may include a stay 1430. The stay 1430 may comprise a projection which may engage an opening or aperture 1432 of the body 1406, for selectively maintaining the retainer 1404 in its second (fold back) position.

The entire clip 1400 may be secured in position by mounting the clip to another member or body. In one example, that may comprise either the stud S or an aperture A. For example, the mount 1402 may be connected to a stud S by pressing the body 1406 onto the stud S. This causes the stud S to be inserted into the passage 14A of the body 1406 at the bottom end 1410. The projections 1415 in the body 1406 preferably engage the stud S, opposing the removable of the mount 1402 from the stud S.

In this position, as illustrated in FIG. 14A, the retainer 1404 may be located in the first position, where it extends outwardly from the mount 1402. One or more cables C may be located in the loop 1428 and are thus secured by being contained in the retainer 1404, which is connected to the mount 1402, which is connected to the stud S.

On the other hand, the clip 1400 may be inserted into an aperture A (such as in the event a stud S to does not exist, or in spaces where, when the retainer 1404 is in the position illustrated in FIG. 14B, its length would cause it to interfere with another member. In this event, the body 1406 of the mount 1402 may be pressed into the aperture A. The projections 1413 thereon may engage the structure surrounding the aperture A, thus inhibiting the mount 1402 from being removed from the aperture A. In this position, the retainer 1402 may be moved to the second position. The retainer 1402 may be maintained in this position by engaging the stay 1430 with the mount 1402. One or more cables C may thus be retained in the loop 1428 below the mount 1402.

In one example, the clip 1400 might be made of durable but somewhat flexible or resilient material, such as rubber or a plastic/polymer. The clip 1400 might be formed in a molding process.

As indicated, in one example, retainer 1404 is movable between first and second positions, such as via a hinge 1422.

In one example, a hinge may not be required. For example, the retainer 1404 might be constructed of a sufficiently pliable material that the retainer 1404 can be moved between first and second positions by bending it. As one example, the retainer 1404 might comprise a generally thin, planar metal member which is coated with pliable rubber or plastic. The retainer 1404 may then be bent back and forth. In this example, a stay 1430 might not be required, in that once bent, the metal inside the retainer 1404 might retain its position until moved to a different position.

The clip 1400 has particular applicability to a gaming machine where cables are routed through the cabinet or other portions thereof, and it is desirable to retain the cables in fixed positions (such as to prevent them from moving and interfering with other elements of the gaming machine, etc.).

While in some examples, a gaming machine may have the features described herein, in other examples, a gaming machine or gaming machine cabinet may have individual ones of the features herein, or combinations of those features. In this regard, the features may be used individually, such as with gaming machines or cabinets which otherwise have different configurations than is described herein.

It will be understood that the above described arrangements of apparatus and the method there from are merely illustrative of applications of the principles of this disclosure and many other examples and modifications may be made without departing from the spirit and scope of the disclosure as defined in the claims.

What is claimed is:

1. A pivoting mount for a display of a gaming machine comprising:

a display mount connected to said gaming machine, said display mount comprising a first mounting portion and a second mounting portion spaced from said first mount, a first pin extending from said first mounting portion towards said second mounting portion and a second pin extending from said second mounting portion towards said first mounting portion; and a display device, said display device having a front and a rear and a bracket located at said rear, said bracket having a first end and a second end, a first slot located at said first end and a second slot located at said second end, said first slot having a first portion for accepting said first pin into said bracket and said second slot having a first portion for accepting said second pin into said bracket when said display device is in a first orientation relative to said display mount, and said first slot having a second portion for accepting said first pin and said second slot having a second portion for accepting said second pin when said display device is in a second orientation relative to said display mount.

2. The pivoting mount in accordance with claim 1, wherein said display mount is generally vertically extending and in said first orientation said display device is horizontal and in said second orientation said display device is vertical.

3. The pivoting mount in accordance with claim 1, wherein said bracket is mounted to a frame of said display device.

4. The pivoting mount in accordance with claim 1, wherein said display mount extends upwardly from a cabinet portion of said gaming machine.

5. The pivoting mount in accordance with claim 1, wherein said display mount comprises a topper extension which is connected to a main display mount of said gaming machine.

6. The pivoting mount in accordance with claim 1, wherein said gaming machine comprises a primary display and said display device comprises a secondary display.

7. The pivoting mount in accordance with claim 6, wherein when said secondary display is connected to said display mount, said secondary display is located above said primary display.

8. The pivoting mount in accordance with claim 1, wherein said first slot and said second slot each have a first portion, a second portion and a third portion, said first portion and said second portion extending perpendicular to one another and said second portion and said third portion extending perpendicular to one another.

9. The pivoting mount in accordance with claim 8, wherein said first pin is insertable into said first portion of said first slot and rests at an end of said third portion when said display device is in said second orientation and wherein said second pin is insertable into said first portion of said second slot and rests at an end of said third portion when said display device is in said second orientation.

10. The pivoting mount in accordance with claim 9, wherein in said second orientation of said display device, said display device is oriented vertically.

11. The pivoting mount in accordance with claim 10, wherein when said display device is oriented vertically, said third portion of each of said first and second slots is oriented vertically.

12. A method of connecting a display device to a gaming machine comprising the steps of:

aligning first and second pins associated with a display mount of a gaming machine with a first portion of each of a first slot and a second slot of a mounting bracket of said display device;

moving said display device relative to said display mount in a first direction to cause said first and second pins to move from said first portion to a second portion of each of said first and second slots; and moving said display device relative to said display mount in a second direction to cause said first and second pins to move from said second portion to a third portion of each of said first and second slots.

13. The method in accordance with claim 12, wherein said step of moving said display device in a first direction comprises orienting said display device horizontally and moving said display device laterally.

14. The method in accordance with claim 12, wherein said second direction is perpendicular to said third direction.

15. The method in accordance with claim 12, wherein said second direction is vertically downward.

16. A display mount for a gaming machine comprising:

a main display support extending upwardly from a housing of said gaming machine;

a secondary display mount connected to said main display support and extending upwardly therefrom, said secondary display mount comprising a first mount and a second mount spaced from said first mount, a first pin extending from said first mount towards said second mount and a second pin extending from said second mount towards said first mount; and a display device, said display device having a front and a rear and a bracket located at said rear, said bracket having a first end and a second end, a first slot located at said first end and a second slot located at said second end, each of said first and second slots having a first portion, a second portion extending generally perpendicular to said first portion, and a third portion extending generally perpendicular to said second portion;

wherein said first portion of said first slot is configured to accept said first pin into said bracket and said first portion of said second slot is configured to accept said second pin into said bracket, and whereby movement of said display device relative to said secondary display mount causes said first and second pins to move to an end of said third portion of said first and second slots, mounting said display device to said gaming machine.

17. The display mount in accordance with claim 16, wherein said movement comprises pivoting of said display device relative to said secondary display mount.

18. The display mount in accordance with claim 16, wherein said first and third portions of said first and second slots extend parallel to a plane containing said display device.

19. The display mount in accordance with claim 18, wherein said second portion of said first and second slots extends generally perpendicular to said plane containing said display device.

* * * * *